(12) United States Patent
Simkhai et al.

(10) Patent No.: US 12,537,882 B2
(45) Date of Patent: Jan. 27, 2026

(54) SYSTEMS AND METHODS FOR PROVIDING LOCATION-BASED CASCADING DISPLAYS

(71) Applicant: Grindr LLC, Los Angeles, CA (US)

(72) Inventors: Joel Joseph Simkhai, Los Angeles, CA (US); Scott Ryan Lewallen, Rancho Palos Verdes, CA (US); Morten Bek Ditlevsen, Denmark (DK)

(73) Assignee: Grindr LLC, Los Angeles, CA (US)

( * ) Notice: Subject to any disclaimer, the term of this patent is extended or adjusted under 35 U.S.C. 154(b) by 0 days.

(21) Appl. No.: 18/380,936

(22) Filed: Oct. 17, 2023

(65) Prior Publication Data
US 2024/0048636 A1 Feb. 8, 2024

Related U.S. Application Data

(63) Continuation of application No. 17/393,809, filed on Aug. 4, 2021, now Pat. No. 11,973,840, which is a continuation of application No. 16/889,925, filed on Jun. 2, 2020, now Pat. No. 11,102,310, which is a continuation of application No. 16/562,632, filed on Sep. 6, 2019, now Pat. No. 10,708,367, which is a continuation of application No. 16/272,174, filed on Feb. 11, 2019, now Pat. No. 10,447,791, which is a continuation of application No. 15/688,528, filed on Aug. 28, 2017, now Pat. No. 10,257,292, which is a continuation of application No. 14/101,070, filed on Dec. 9, 2013, now Pat. No. 9,749,429, which is a continuation of application No. 13/071,420, filed on Mar. 24, 2011, now Pat. No. 8,606,297.

(60) Provisional application No. 61/316,977, filed on Mar. 24, 2010.

(51) Int. Cl.
| | |
|---|---|
| H04L 51/046 | (2022.01) |
| H04L 65/403 | (2022.01) |
| H04L 67/52 | (2022.01) |
| H04W 4/02 | (2018.01) |
| H04W 4/029 | (2018.01) |
| H04W 4/21 | (2018.01) |

(52) U.S. Cl.
CPC ............ H04L 67/52 (2022.05); H04L 51/046 (2013.01); H04L 65/403 (2013.01); H04W 4/02 (2013.01); H04W 4/023 (2013.01); H04W 4/029 (2018.02); H04W 4/21 (2018.02)

(58) Field of Classification Search
CPC ..... H04L 67/52; H04L 51/046; H04L 65/403; H04W 4/02; H04W 4/023; H04W 4/029; H04W 4/21
See application file for complete search history.

(56) References Cited

U.S. PATENT DOCUMENTS

| | | | | |
|---|---|---|---|---|
| 8,606,297 B1 * | 12/2013 | Simkhai | ................... | H04L 67/52 |
| | | | | 455/456.2 |
| 9,749,429 B1 * | 8/2017 | Simkhai | ................... | H04W 4/02 |
| 10,257,292 B2 * | 4/2019 | Simkhai | ................ | H04L 51/046 |

(Continued)

*Primary Examiner* — Joseph E Dean, Jr.
(74) *Attorney, Agent, or Firm* — Bryan Cave Leighton Paiser LLP

(57) ABSTRACT

Systems and methods for facilitating user interaction such as within a social network are described. In one implementation, location-based display of images and/or other information associated with other users or entities may be provided. The information may be provided in association with mapping or other positional data or information such as personal interests.

16 Claims, 51 Drawing Sheets

Example Process for Providing Location Based Interaction From Client Application Based on Favorites

(56) References Cited

U.S. PATENT DOCUMENTS

| | | | |
|---|---|---|---|
| 10,447,791 B2 * | 10/2019 | Simkhai | H04W 4/02 |
| 10,708,367 B2 * | 7/2020 | Simkhai | H04L 65/403 |
| 11,102,310 B2 * | 8/2021 | Simkhai | H04L 51/046 |
| 11,973,840 B2 * | 4/2024 | Simkhai | H04W 4/029 |

* cited by examiner

Example Network Configuration with Multiple Users

*Example Splash and Cascade*

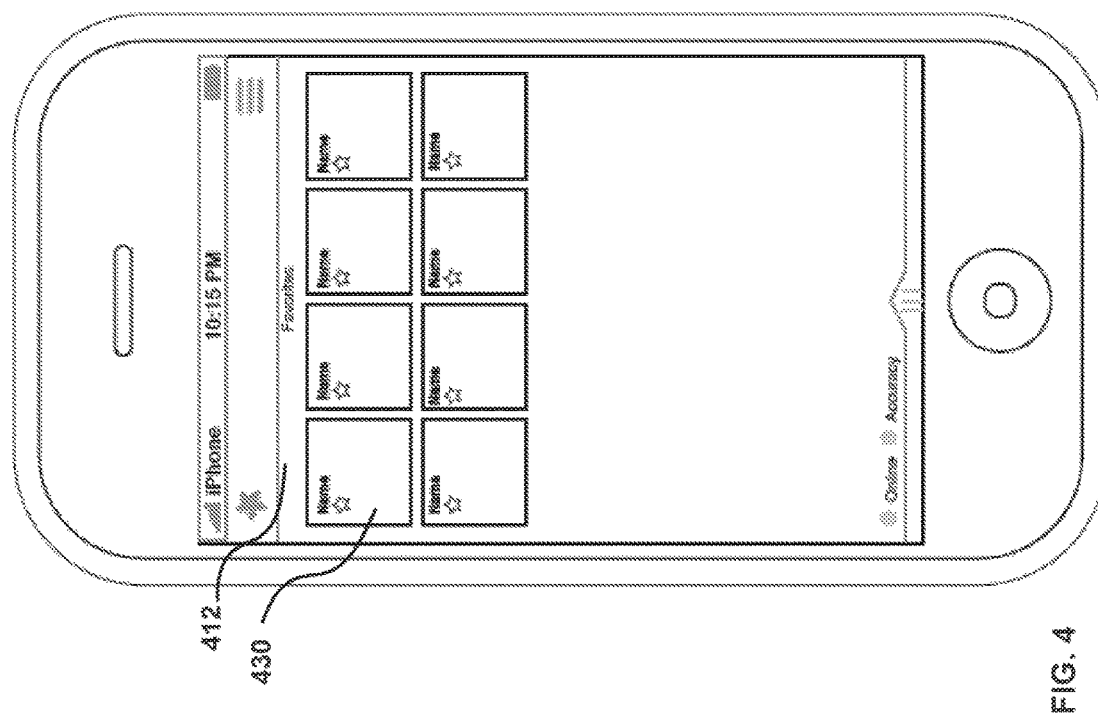
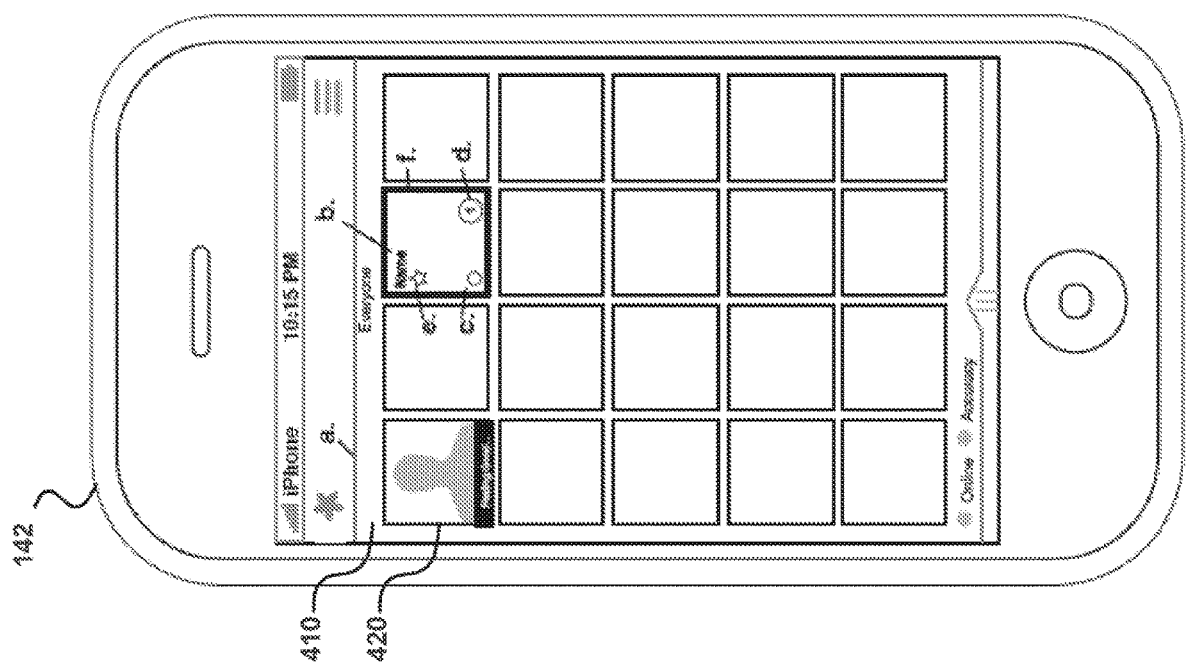
FIG. 4

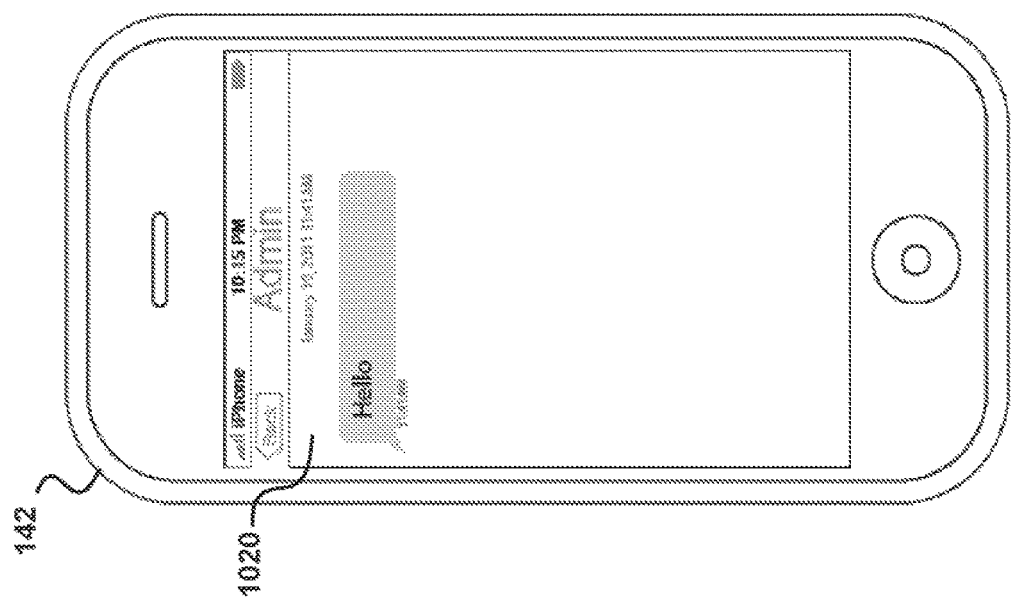
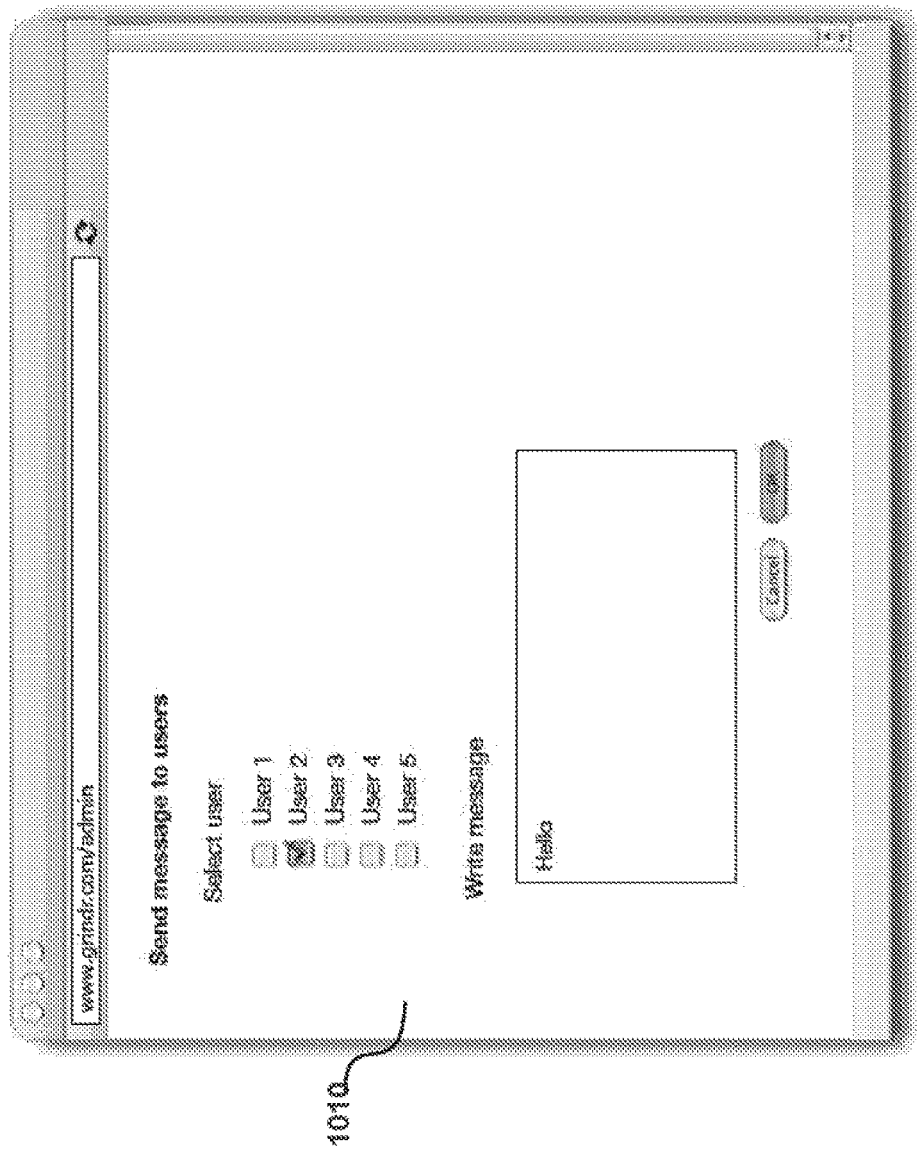
FIG. 10

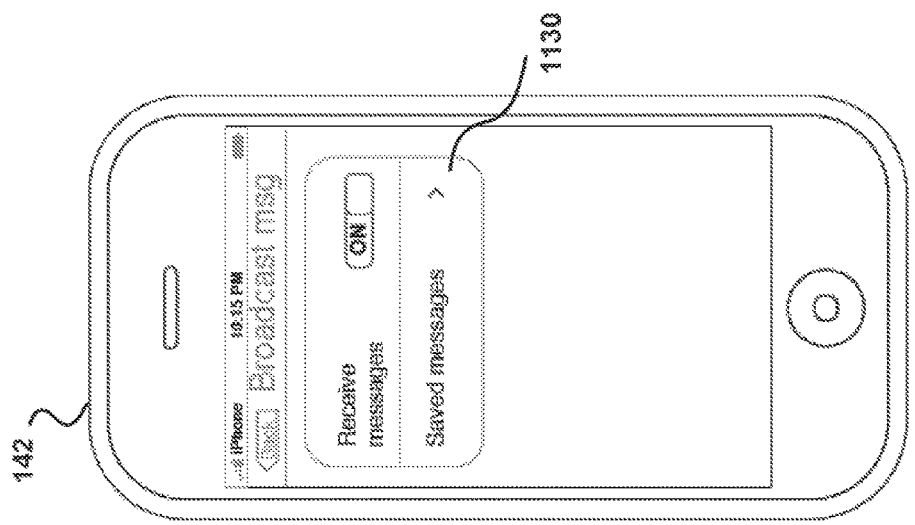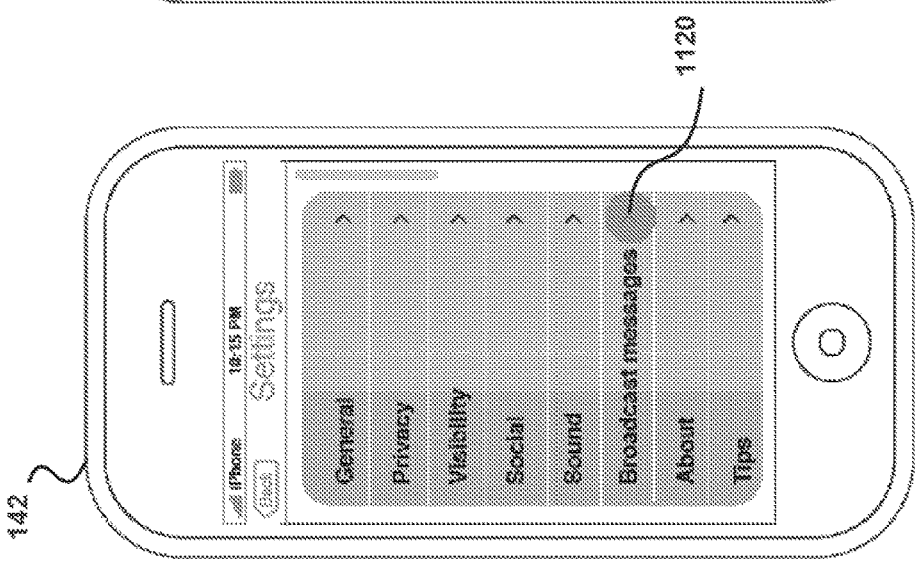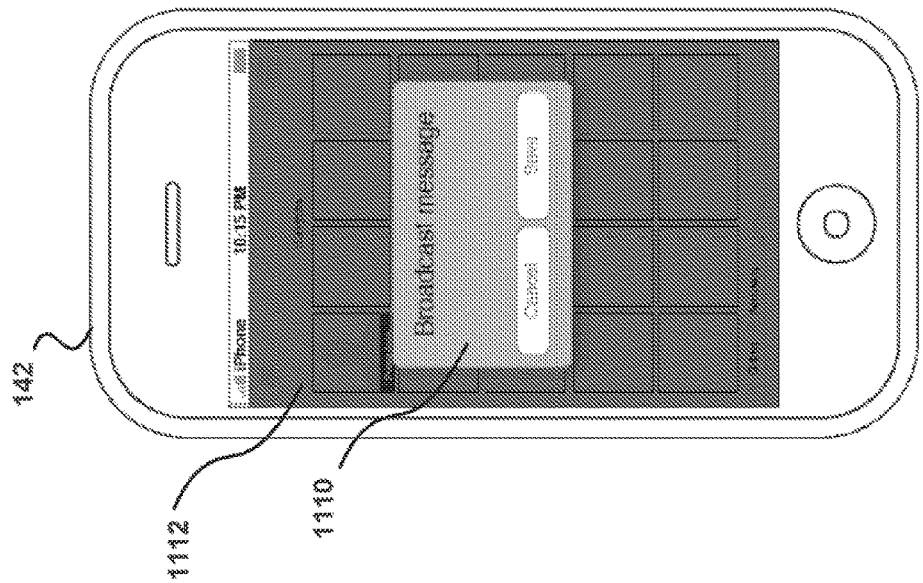
FIG. 11

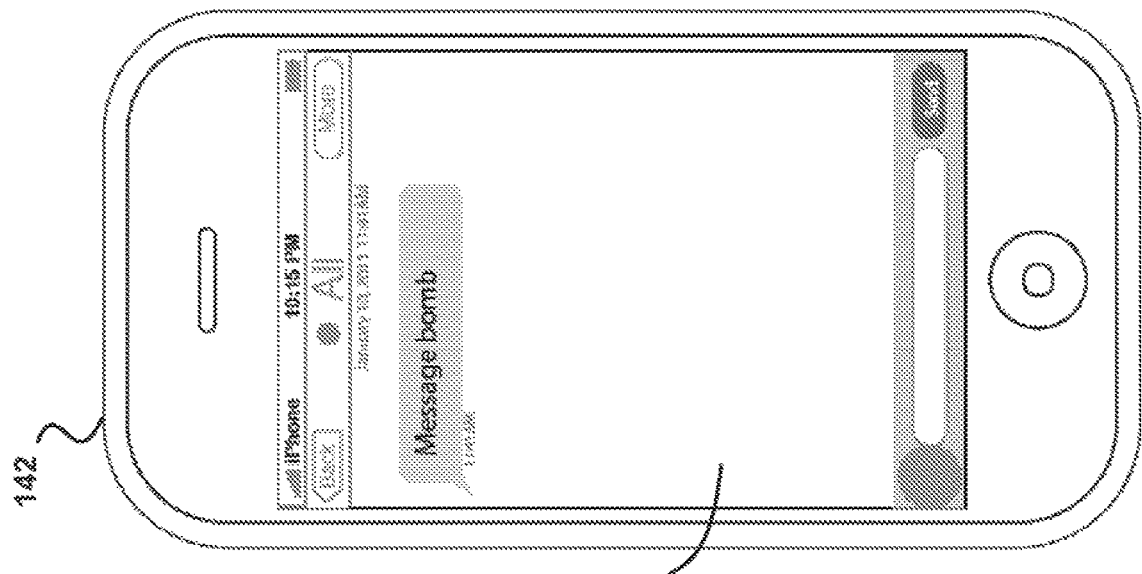
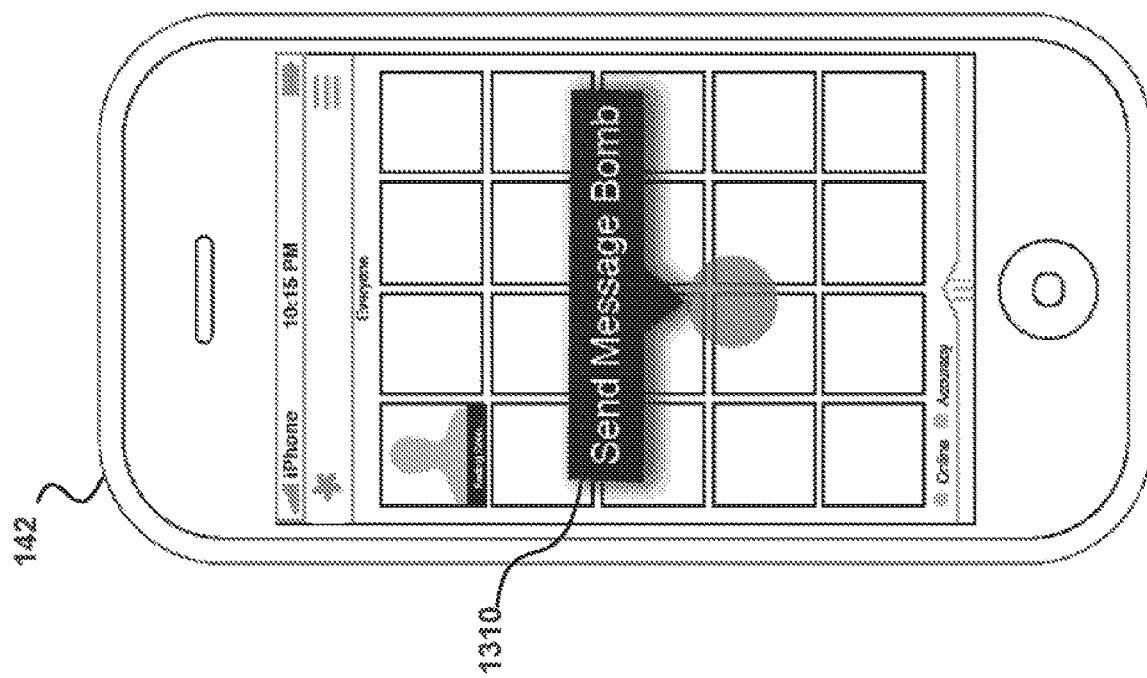
FIG. 13

1. Users can have control over how accurate their location is on other user views. This can be used to protect the user.

Example Cascade Process with Filters

Example Network of Data Stores and Relationships

Example of Cascade Generation by Interests

Example of Cascade Generation by Distance AND Interests

*Example Process for Providing Broadcast Notifications*

Example Process for Providing Notifications

| Notification | |
|---|---|
| Model: Notification Related to One: Profile | |
| Title | String |
| Body | String |
| User | Key |
| Source | String |
| Type | String |
| Created_At | Float |
| To_Delete | Boolean |

4210

| Archive Notification | |
|---|---|
| Model: Archive Notification Related to One: Profile | |
| Title | String |
| Body | String |
| User | Key |
| Source | String |
| Type | String |
| Created_At | Float |

*Example Notification Data Structures*

Example Process for Providing Location Based Interaction at Server System

Example Process for Providing Location Based Interaction From Client Application Example Process for Providing Location Based Interaction From Client Application Based on Recent Interaction Example Process for Providing Location Based Interaction From Client Application Based on Favorites

*Example Process for Providing Location Based Interaction From Client Application Based on Favorites*

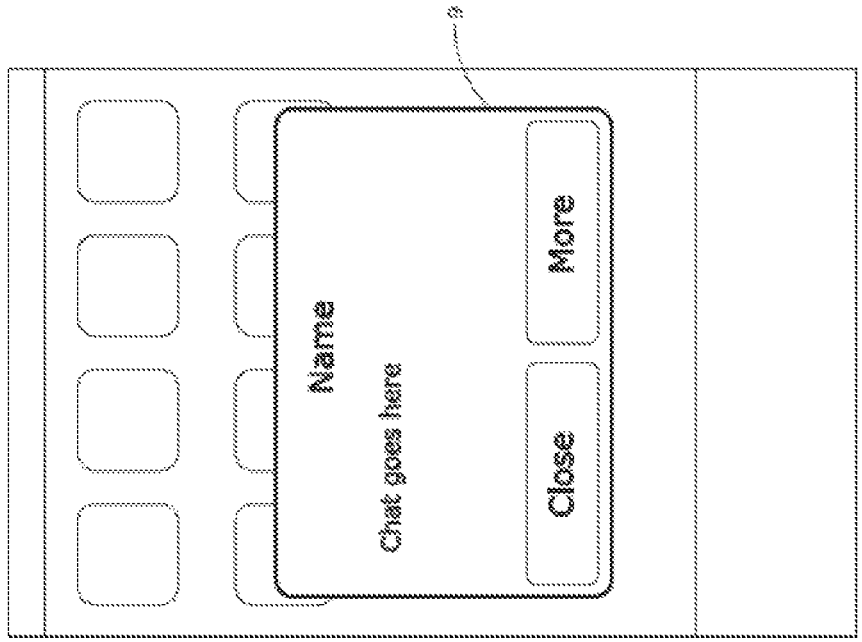
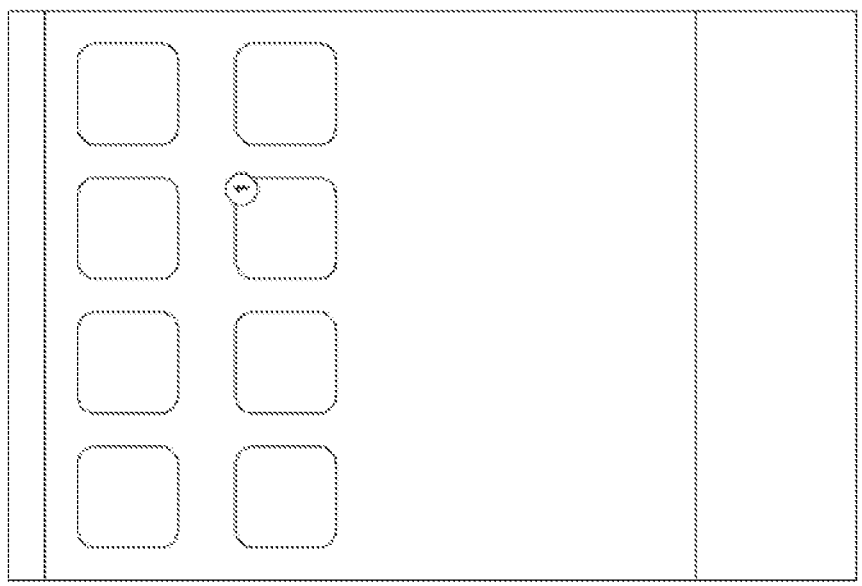
FIG. 49

SYSTEMS AND METHODS FOR PROVIDING LOCATION-BASED CASCADING DISPLAYS

CROSS-REFERENCE TO RELATED APPLICATIONS

This application is a continuation of U.S. patent application Ser. No. 17/393,809, entitled "SYSTEMS AND METHODS FOR PROVIDING LOCATION-BASED CASCADING DISPLAYS," filed on Aug. 4, 2021, which is a continuation of U.S. patent application Ser. No. 16/889,925, entitled "SYSTEMS AND METHODS FOR PROVIDING LOCATION-BASED CASCADING DISPLAYS," filed on Jun. 2, 2020 (now, U.S. Pat. No. 11,102,310), which is a continuation of U.S. patent application Ser. No. 16/562,632, entitled "SYSTEMS AND METHODS FOR PROVIDING LOCATION-BASED CASCADING DISPLAYS," filed on Sep. 6, 2019 (now, U.S. Pat. No. 10,708,367), which is a continuation of U.S. patent application Ser. No. 16/272,174, entitled "SYSTEMS AND METHODS FOR PROVIDING LOCATION-BASED CASCADING DISPLAYS," filed on Feb. 11, 2019 (now, U.S. Pat. No. 10,447,791), which is a continuation of U.S. patent application Ser. No. 15/688,528, entitled "SYSTEMS AND METHODS FOR PROVIDING LOCATION-BASED CASCADING DISPLAYS," filed on Aug. 28, 2017 (now, U.S. Pat. No. 10,257,292), which is a continuation of application of U.S. patent application Ser. No. 14/101,070, entitled "SYSTEMS AND METHODS FOR PROVIDING LOCATION-BASED CASCADING DISPLAYS," filed on Dec. 9, 2013 (now, U.S. Pat. No. 9,749,429), which is a continuation of U.S. patent application Ser. No. 13/071,420, entitled "SYSTEMS AND METHODS FOR PROVIDING LOCATION-BASED CASCADING DISPLAYS," filed on Mar. 24, 2011 (now, U.S. Pat. No. 8,606,297), which claims priority under 35 U.S.C. § 119(e) to U.S. Provisional Patent Application Ser. No. 61/316,977, entitled "LOCATION-BASED CASCADING PHOTOGRAPH DISPLAY," filed on Mar. 24, 2010, the contents of each of which are hereby incorporated by reference in their entirety for all purposes.

FIELD

This application is related generally to facilitating interaction among users of a web or other site to exchange information. More specifically, but not exclusively, the application relates to methods and apparatus for providing location-based display of images and/or other information associated with users.

BACKGROUND

Social networking sites have become a popular way for people and organizations to interact using the Internet. Such interaction may occur through a variety of modalities including, for example, through online chat, instant messaging, and the sharing of media content (e.g., photographs and videos).

Heretofore the interaction among users of social networking sites has been generally independent of the location of such users. That is, such social networking sites have generally not tended to offer features or services premised upon the real-time locations of the users of such sites. For example, although social networking sites may facilitate the creation of relationships or links between users and the sharing of information among such users, the interaction between users of such sites has generally been independent of physical location.

BRIEF DESCRIPTION OF THE DRAWINGS

The present application may be more fully appreciated in connection with the following detailed description taken in conjunction with the accompanying drawings, wherein:

FIGS. 3A, 3B, and 4-27 illustrate details of various embodiments of display screens in accordance with aspects of the invention which may be provided on a client device such as shown in FIG. 2B in conjunction with a host server, such as shown in FIG. 2A;

FIG. 42 illustrates details of an embodiment of a notifications data structure in accordance with aspects of the present invention;

FIG. 49 depicts an exemplary manner in which a chat conversation may be initiated.

DETAILED DESCRIPTION OF EMBODIMENTS

Figure 1:
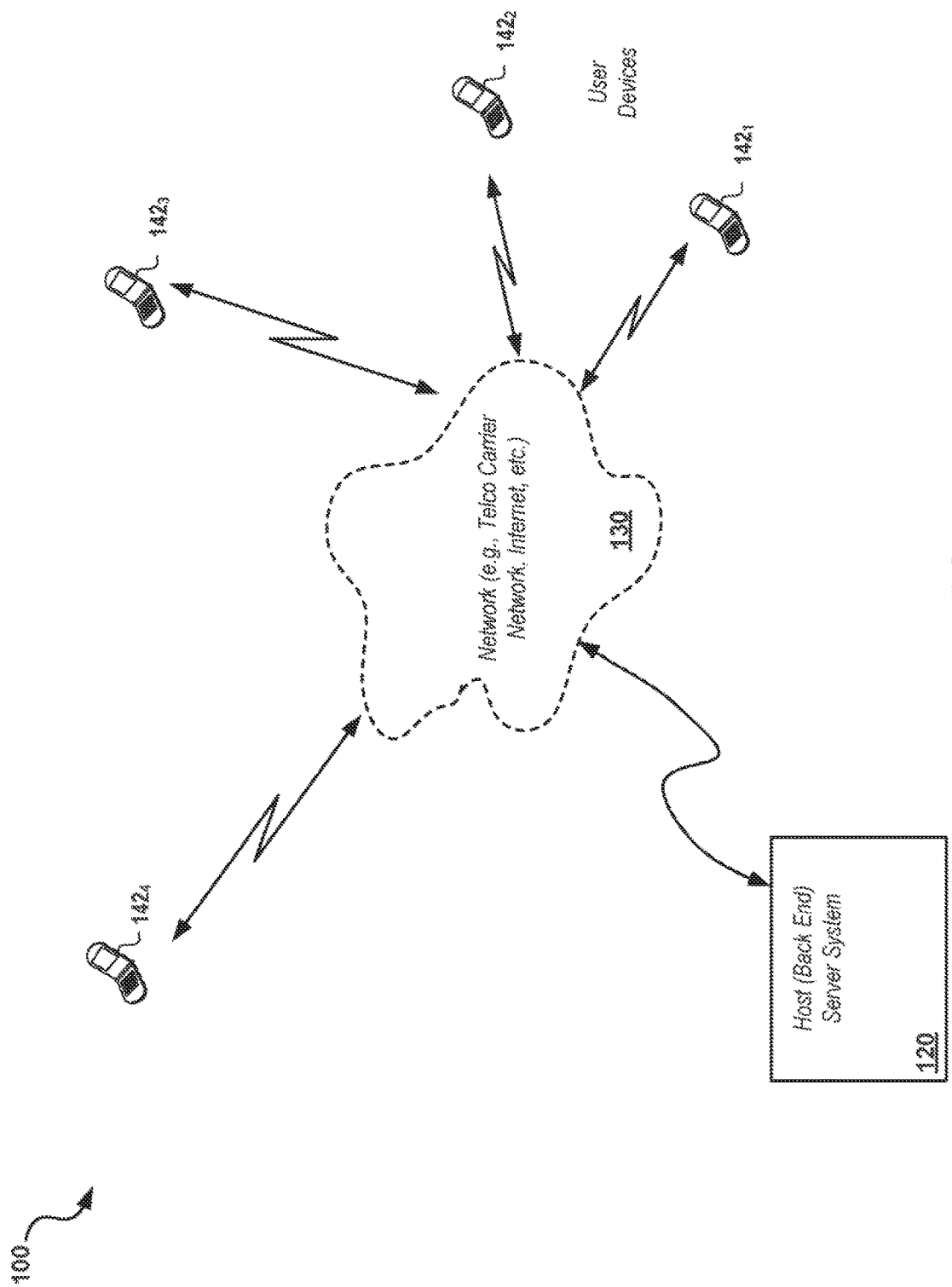
FIG. 1 illustrates details of a system on which embodiments may be implemented.

Various embodiments are described below with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

In one aspect, the disclosure relates to a method for facilitating location-based social interaction. The method includes receiving, from a portable electronic device of a requesting user, a request for information concerning other users wherein the request includes information relating to a location of the requesting user. A list of the other users located within a range of the location is generated. The method further includes filtering, based upon filtering criteria, the list in order to create a filtered list of the other users. Profile information relating to the filtered list of the other users is then transmitted to the portable electronic device.

In another aspect the disclosure relates to a method for facilitating location-based social interaction. The method includes receiving, from a portable electronic device of a requesting user, a request for information concerning other users wherein the request includes information relating to a location of the requesting user. The method further includes identifying a first list of the other users located within a range of the location. The first list is then filtered based upon a filtering criteria other than interests associated with the requesting user. A second list of the other users located within the range of the location is then generated by filtering the first list in accordance with the interests associated with the requesting user. The method further includes transmitting, to the portable electronic device, profile information relating to the second list of the other users.

In yet another aspect the disclosure pertains to a method for facilitating location-based social interaction. The method includes transmitting, from a portable electronic device of a requesting user, a request for information concerning other users wherein the request includes information relating to a first location of the requesting user. The method further includes receiving, at the portable electronic device, profile information relating to selected other users located within a first predefined range of the first location wherein each of the selected other users possess one or more characteristics consistent with a filtering criteria. Representations of the selected other users may then be displayed upon a user interface of the portable electronic device.

The disclosure also relates to a method for facilitating location-based social interaction. The method includes receiving, at a portable electronic device of a user, information relating to other users located within a predefined range of a location of the portable electronic device. Representations of the other users are then displayed upon a user interface of the portable electronic device. The method further includes updating, in response to user input, the user interface to display only those of the representations associated with ones of the other users having one or more interests consistent with interests of the user.

In another aspect the disclosure pertains to a method for facilitating location-based social interaction. The method includes receiving, at a portable electronic device of a user, information relating to other users located within a predefined range of a location of the portable electronic device. Representations of the other users are then displayed upon a user interface of the portable electronic device. The method further includes updating, in response to user input, the user interface to display only those of the representations associated with ones of the other users with which the user has recently interacted.

In yet another aspect the disclosure relates to a method for facilitating location-based social interaction. The method includes receiving, at a portable electronic device of a user, information relating to other users located within a predefined range of a location of the portable electronic device. Representations of the other users are then displayed upon a user interface of the portable electronic device. The method further includes updating, in response to user input, the user interface to display only representations of those other users identified as favorites by the user.

A further aspect of the disclosure concerns a method for facilitating location-based social interaction. The method includes displaying, upon a user interface of a portable electronic device of a user, representations of other users located within a predefined range of a location of the portable electronic device. The method further includes initiating a first chat session with a first communication device associated with a first of the representations and a second chat session with a second communication device associated with a second of the representations. First information relating to the first chat session and second information relating to the second chat session may then be alternately displayed on the user interface.

The disclosure also relates in another aspect to a computer program product for facilitating location-based social interaction. The computer program product includes a computer-readable medium including codes for causing a computer to:

receive, from a portable electronic device of a requesting user, a request for information concerning other users wherein the request includes information relating to a location of the requesting user;

generate a list of the other users located within a range of the location;

filter, based upon filtering criteria, the list in order to create a filtered list of the other users; and transmit, to the portable electronic device, profile information relating to the filtered list of the other users.

In a further aspect, the disclosure concerns a computer program product for facilitating location-based social interaction, the computer program product comprising a computer-readable medium including codes for causing a computer to:

receive, from a portable electronic device of a requesting user, a request for information concerning other users wherein the request includes information relating to a location of the requesting user;

identify a first list of the other users located within a range of the location;

filter the first list based upon a filtering criteria other than interests associated with the requesting user;

generate a second list of the other users located within the range of the location by filtering the first list in accordance with the interests associated with the requesting user; and transmit, to the portable electronic device, profile information relating to the second list of the other users.

In another aspect the disclosure relates to a computer program product for facilitating location-based social interaction, the computer program product comprising a computer-readable medium including codes for causing a computer to:

receive, at a portable electronic device of a user, information relating to other users located within a predefined range of a location of the portable electronic device;

display representations of the other users upon a user interface of the portable electronic device; and update, in response to user input, the user interface to display only those of the representations associated with ones of the other users having one or more interests consistent with interests of the user.

In a further aspect, the disclosure relates to a computer program product for facilitating location-based social interaction, the computer program product comprising a computer-readable medium including codes for causing a computer to:

receive, at a portable electronic device of a user, information relating to other users located within a predefined range of a location of the portable electronic device;

display representations of the other users upon a user interface of the portable electronic device; and update, in response to user input, the user interface to display only those of the representations associated with ones of the other users with which the user has recently interacted.

In one exemplary embodiment, aspects of the present invention may be implemented as a software application (also denoted herein as an "app" for brevity) running on a mobile device such as a smartphone, cell phone, personal digital assistant, laptop computer, portable navigation device (GPS), and the like. For example, embodiments may be implemented as apps running on any mobile device. One skilled in the art will recognize, however, that embodiments may be implemented on many other electronic devices capable of providing communication, processing, memory storage, and display functionality, including, for example, desktop or notebook computers, tablet devices, kiosks, and the like.

Various additional aspects and details are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

The word "exemplary" is used herein to mean "serving as an example, instance, or illustration." Any aspect and/or embodiment described herein as "exemplary" is not necessarily to be construed as preferred or advantageous over other aspects and/or embodiments.

System Overview

According to various embodiments of the invention, techniques are provided for a location-based display of photographs and/or other information describing various users of a service. According to various embodiments, location-based online chatting and location-based broadcasting can also be provided. As will be apparent to one skilled in the art, these functions can be provided separately, or in combination with the location-based display.

In one embodiment, the system of the present invention is implemented as a software application ("app") running on a mobile device such as a smartphone, cell phone, personal digital assistant, laptop computer, portable navigation device (GPS), or the like. For example, it may be implemented as an application running on an Apple iPhone 3GS, available from Apple Computer of Cupertino, California. One skilled in the art will recognize, however, that the system can be implemented on any electronic device, including a desktop computer, kiosk, or the like.

Attention is now directed to FIG. 1, which illustrates details of a system 100 in which embodiments disclosed herein may be implemented. The system 100 includes a host server system 120 in communication via a network 130 with a plurality of user devices 142. The network 130 may comprise any wide area or other network (e.g., a telecommunications network in conjunction with the Internet) capable of supporting bidirectional communication between the host server system 120 and the plurality of user devices 142.

Figure 2A:
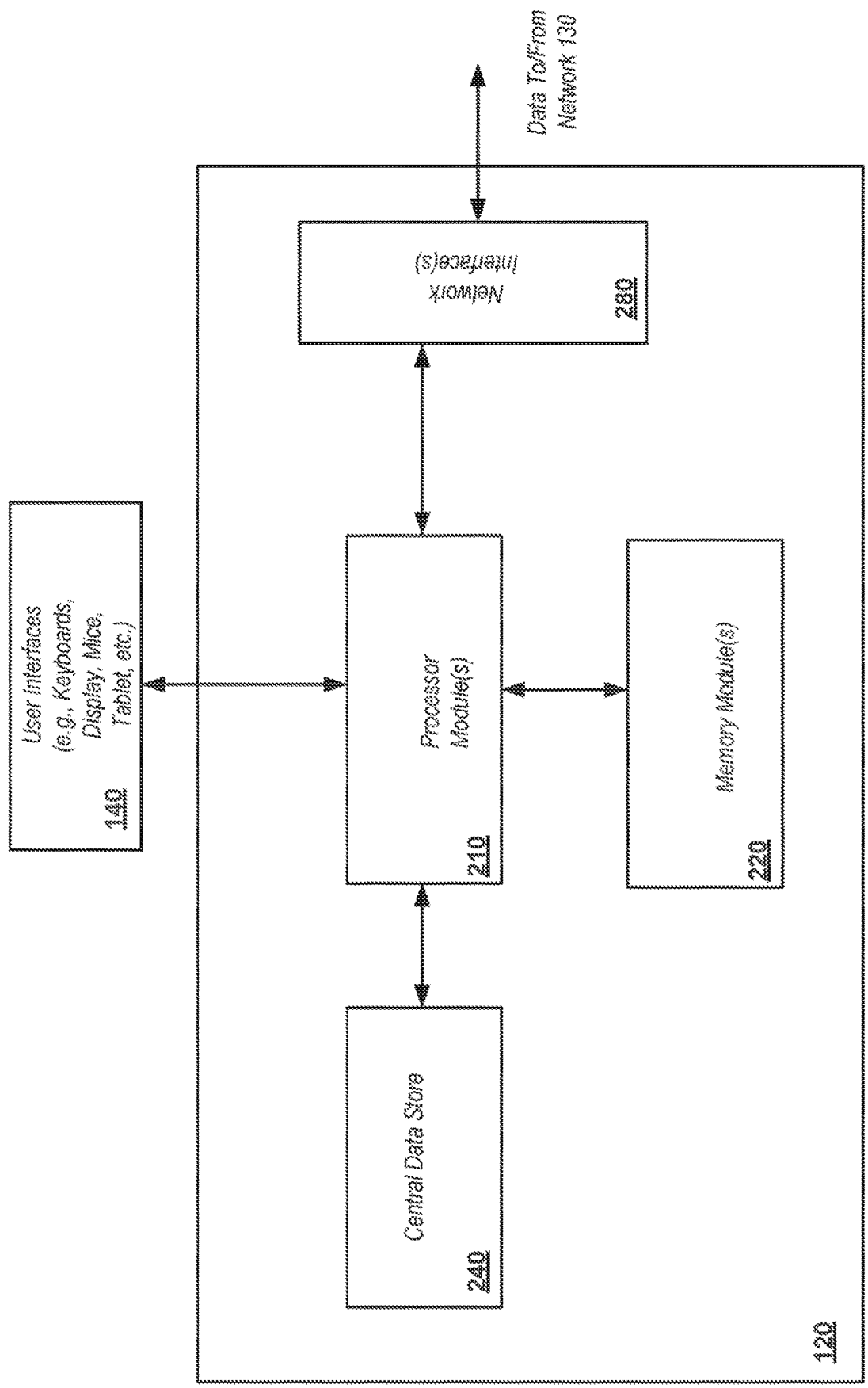
FIG. 2A illustrates details of an example host server system on which embodiments may be implemented.

FIG. 2A illustrates details of an exemplary implementation of host server system 120. As shown in FIG. 2A, the host server system includes one or more processor modules 210 in communication via a system bus or the like with one or memory modules(s) 220. The memory module(s) 220 will typically include code executable by the processor modules 210 to effect the location-based social interaction described herein. The host server system 120 further includes a central data store 240 containing information concerning or otherwise relating to users of the devices 142. The exchange of information between the central data store 240 and the user devices 142 is facilitated by one or more network interfaces 280 in communication with elements of network 130. Administrative personnel or system operators may interact server system 120 by way of user interface elements 140 and/or remotely via network interface 280.

Figure 2B:
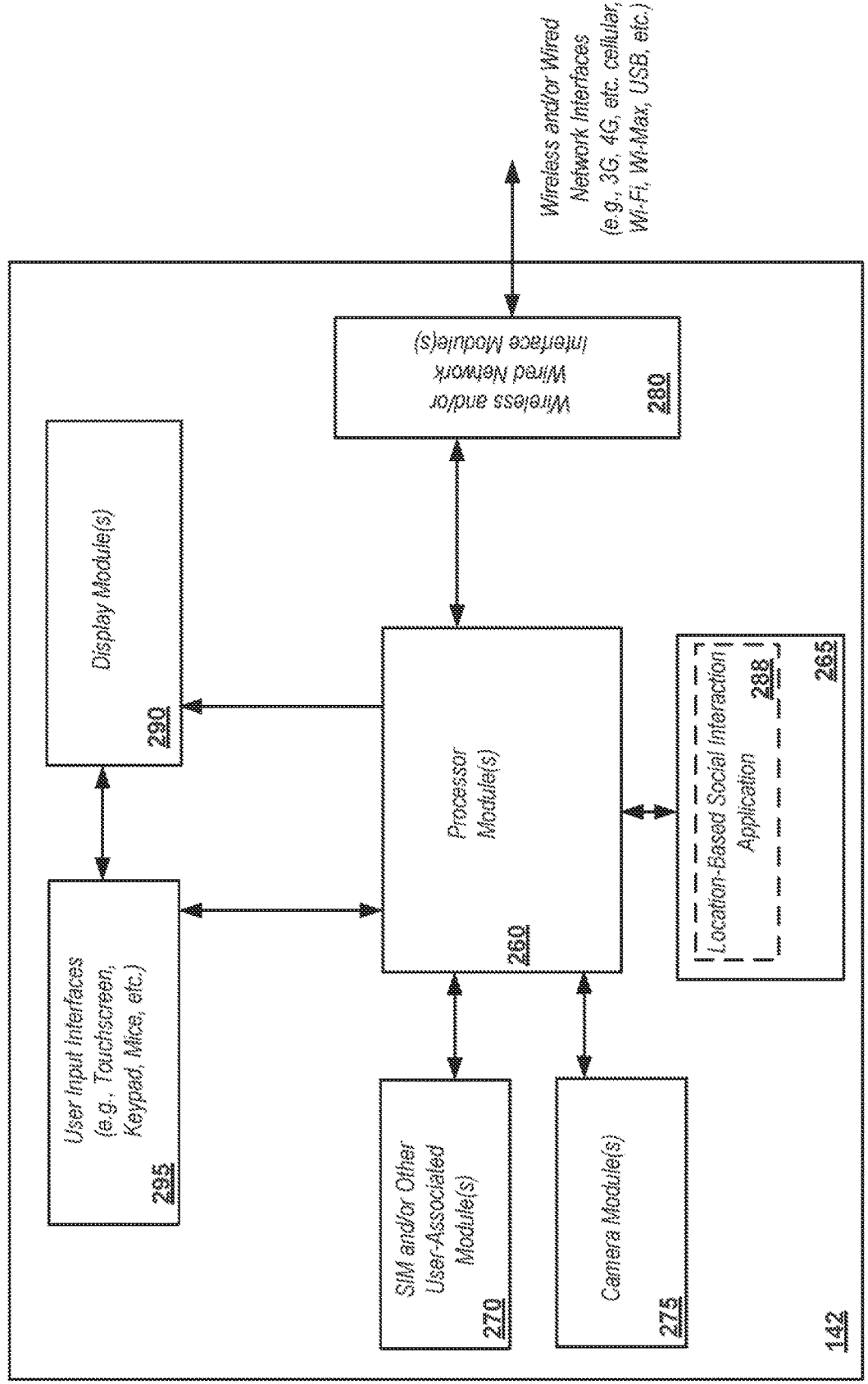
FIG. 2B illustrates details of an example client device on which embodiments may be implemented.

Turning now to FIG. 2B, there is illustrated details of an exemplary client device 142. As mentioned above, each client device 142 may comprise, for example, smartphone, cell phone, personal digital assistant, laptop computer, portable navigation device (GPS), or the like. Accordingly, the representation of FIG. 2B is intended to illustrate various components common to certain of such devices; however, those skilled in the art will appreciate that particular client devices will vary in component configuration and functional capability.

As shown in FIG. 2B, the exemplary client device 142 includes one or more processor modules 260 in communication via a system bus or the like with one or memory modules(s) 265. The memory module(s) 265 contain data as well as program code for a location-based social interaction application 288 executable by the processor modules 210. Such execution by the processor modules 210 results in, for example, generation of the user interface screens facilitating the location-based social interaction described herein. The exemplary client device 142 is configured to send information to, and receive information from, the network 130 via a network interface module 280. In embodiments in which the client device 142 comprises a wireless device, the network interface module 280 may include, for example, a wireless transceiver capable of communicating with corresponding elements within the network 130. The processor module(s) 260 may also interface with camera module(s) 275 and a SIM or other user-associated module 270. Users may interact with the client device via one or more user input interfaces 295 and a display module 290.

Location-Based Photograph Display

Figure 48:
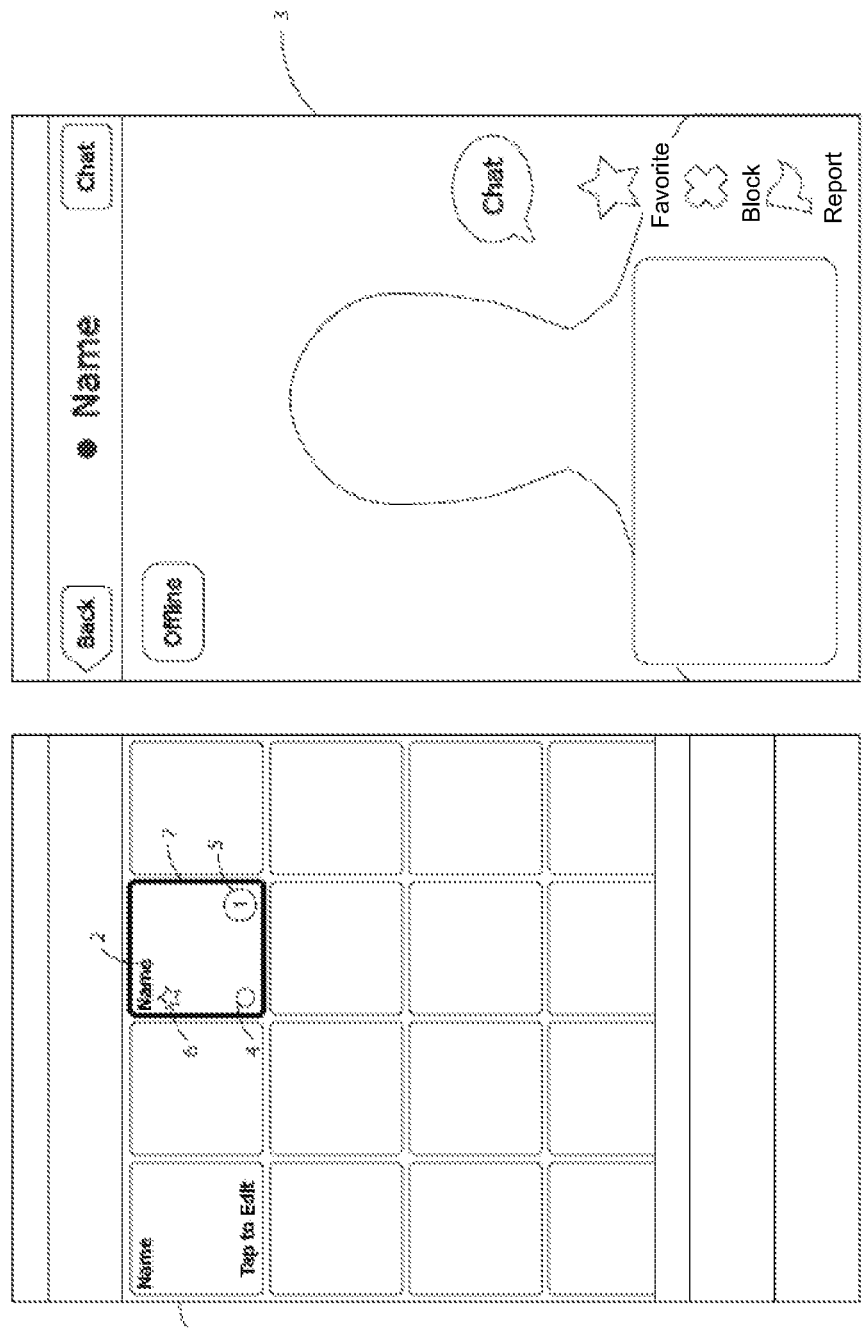
FIG. 48 shows an example of a user interface including a display of photographs as may be shown on a screen of a mobile device according to aspects of one embodiment of the present invention.

Referring now to FIG. 48, there is shown an example of a user interface including a display of photographs as may be shown on a screen of a mobile device 142 according to one embodiment of the present invention. A user activates the software application, and is presented with a set of photographs representing other users ("subjects"). In one embodiment, identifying information (such as name, email address, handle, and/or the like) for each of the subjects is presented in addition to or instead of the photographs. For example, in FIG. 48 each photograph is accompanied by a name. In one embodiment, the user can tap or click on a photograph to see additional information about the subject. A user can double tap on a photograph and directly enter into a conversation. In one embodiment, the display is scrollable. As shown in FIG. 48, the display can be presented in a grid-based arrangement; however, other arrangements are possible, such as a one-dimensional list or map-based arrangement.

In one embodiment, the photographs are arranged according to subject location. The mobile device 142 determines a current location of the user, and selects subjects based on that location. Photographs for the selected subjects are shown, arranged for example by proximity to the user.

In one embodiment, selection and arrangement of subject photographs is performed as follows. Once the mobile device 142 has determined a current location of the user, it consults host server system 120 in order to obtain information from central data store 240 associated with subjects located near a user of the device 142. The central data store 240 contains profiles of subjects who have may have submitted their photographs and have registered with the system; each profile can include a photograph, name, age, background, and other identifying and/or descriptive information about the subject. The data store 240 also contains indicia for identifying a mobile device associated with each subject, so that the current location of the subject can be determined. In one embodiment, a processor module 210 or other dedicated component of server system 120 periodically determines the current locations of registered subjects, and updates the data store 240 with such information. In this manner, the user's device 142 is able to determine the current locations of subjects and to select particular subjects for display based on their proximity to the user. Once subjects have been selected, their photographs and/or profile are retrieved from the data store 240 and displayed on the user's device 142 as shown in FIG. 48.

Current locations for the user and for subjects can be determined using any known means for location detection, including, for example, GPS functionality, cell phone tower triangulation, SkyHook database of wireless routers, and/or the like. In some embodiments, some combination of these techniques may be used. Many currently available mobile devices, such as smartphones, include location detection technology and provide an API for software developers to develop applications that access and use such location information.

In one embodiment, the system of the present invention uses a device identifier to uniquely identify each user device 142; in this manner, a user (or subject) can be identified without having to enter any information him- or herself. Thus, no user name, password, or other authentication information is needed.

In another embodiment, each user (or "subject") is uniquely identified, for example in situations where more than one user may share the same user device 142. In such an embodiment, a user may identified by any known means, such as for example entering a login ID and password to identify him- or herself when activating the user device 142 or when signing on to a service associated with the present invention.

The identifier may be used to retrieve the user's profile from the data store 240. As mentioned above, each profile contains any number of items, including for example a photograph, text description, and the like.

In one embodiment, under the direction of the software of the present invention, a user device 142 periodically contacts the server 120 in order to keep track of the user's location. Such communication can take place over any wireless communications network, over the Internet, over some other network, or over some combination thereof which are individually and collectively represented by the network 130. Thus, the user device 142 periodically initiates a call to the server 120 to inform the server 120 of its location. In one embodiment, the handset requests data describing subjects that may be suitable for display on the user's device given the user's location and given the locations of the subjects.

In response to a request from a user device 142, the server 120 retrieves data records from the data store 240 for selected subjects, and transmits the data to the user device 142. The software application running on the user device 142 arranges the data for presentation to the user on the screen of the mobile device. As described above and as depicted in the example of FIG. 48, in one embodiment the presented data is a grid of photographs depicting those subjects that are currently near the user's location. The photographs can be arranged, for example, in increasing order of distance. This display arrangement is referred to as a "local cascade."

In one embodiment, each photograph is an activatable user input element. For example, in one embodiment the user can initiate communication with a subject by tapping on a photograph; this may open a chat window, call the person, initiate a text message or email message, or the like. Thus, the grid arrangement of photographs can become a user interface for initiating communication with subjects. In one embodiment, tapping on or otherwise activating a photograph (or other descriptive element) can bring up a menu allowing a user to select among several forms of communication, or to perform other actions such as saving a profile for the subject, adding the subject to contacts list, or the like.

In one embodiment, the local cascade presented by the user device 142 can include two (or more) sets of subjects: favorites and nearby users. The user can designate certain subjects as "favorites", so that they will continue to appear in the display regardless of their current location with respect to the user. In one embodiment, favorites appear in the display only if they are logged in; in another embodiment they appear whether or not they are logged in (a status indicator can show whether or not they are logged in). In one embodiment, a user can add or remove subjects to/from the favorites list at any time. In one embodiment, subjects designated as favorites appear in the same display (such as a grid) as other subjects, and can be intermixed according to proximity and/or other factors. Favorites can be designated by a colored border or other distinctive visual element. In another embodiment, subjects designated as favorites are presented in a separate area of the display screen.

In one embodiment, the local cascade includes subjects that are within a particular distance of the user. In another embodiment, a predetermined maximum number of subjects may be shown, in order of increasing distance. In one embodiment, the local cascade omits some subjects from the display based on certain criteria, such as for example:

Subjects who are already in a separate "favorites" section of the display
Subjects who have not logged in within a certain amount of time In addition, the user may indicate that some subjects should be blocked from display.

Blocked subjects are omitted from the local cascade.

In addition, a subject may indicate that he or she should not appear on a user's display, either based on specific identification of the user or on some condition or parameter associated with the user (for example, "do not include me on a display for a user under the age of 21"). If such a condition applies, the subject is omitted from the user's display.

In one embodiment, the central data store 240 maintains information for users, including locations, last-seen timestamps, favorite lists, and block lists. When a mobile device 142 requests a local cascade, the server 120 retrieves data from the data store 240 for candidate subjects using the above-listed criteria, beginning from regions nearest the user's location and iteratively searching through larger geographical regions until a sufficient number of subjects are found for the cascade.

The display of subject information can take any desired form. For example, in one embodiment, the displayed information includes user generated content, text and a photo. As shown in the example of FIG. 48, status indicators and other information associated with a give subject can be shown superimposed over the subject's photo. For example, in FIG. 48 a green dot superimposed on a subject's photograph indicates that the subject is currently online. Numbers in circles indicate that the subject has sent the user one or more messages (such as text message, email messages, voicemail messages, or the like); in one embodiment, the user can tap on an image to retrieve the messages. Stars indicate subjects that have been designated as favorites. Blue frames denote those subjects with whom the user has recently chatted. One skilled in the art will recognize that other types of status indicators can be implemented.

In one embodiment, the display is updated dynamically in response to changes in user and/or subject locations, profile information, block lists, and the like.

Location-Based Chatting

In one embodiment, the local cascade display can be used as a launch point for initiating online chats with subjects. Thus, a user need not join a chat "room" to initiate a chat with another user, but can initiate chat with any unblocked subject in the local cascade display. In one embodiment, users can thereby initiate chat with other nearby users (subjects); in turn, each of those nearby users (subjects) has a different set of nearby users (subjects) with which he or she can chat. Generally speaking, since users have different locations and different block lists, each user has a unique set of users with which he can chat, with the sets of users increasingly overlapping for nearby users.

In one embodiment, users cannot initiate chat with those subjects who have been indicated as blocked, or who have indicated that the user should be blocked. In another embodiment, users can specify that certain subjects should be blocked from chat but should still appear in the local cascade display. In one embodiment, blocked subjects are omitted from the display; in another embodiment, an icon or other designation can indicate that the subject is blocked from chat.

In one embodiment, a user initiates a chat by selecting a subject from the local cascade. The subject's profile is displayed, along with a form for sending a chat message to the subject. Chat messages can be private between users (subjects), or they can be public to users (subjects) within a predefined distance of the chatter. By permitting location-based public chats, in one embodiment the present invention facilitates an environment in which chat messages can be read by some individuals but not others, depending on their current proximity to the person chatting. The proximity threshold can be set to any desired distance, in a sense defining how close one needs to be, in order to be within "earshot" of the chatter. Movement of the chatter or other individuals with respect to one another can cause individuals to drift into and out of "earshot" with each other in real-time.

FIG. 49 depicts an example of a chat conversation that can be initiated using the above-described mechanism. In one embodiment chat messages may be sent "in application" between user devices to the extent that location-based applications are executing and online on each such device. In other embodiments, chat messages may be conveyed by, for example, push, SMS, offline notifications, email or other modes.

Location-Based Broadcasting

In one embodiment, the location information maintained by the central data store 240 can be used by program administrators to send messages to users in geographical regions. The target recipients for such messages can be based on any appropriate parameters as defined by the sender of the message. Such messages can be used, for example to communicate administrative information, or to advertise, or for any other purpose.

In one embodiment, the sender of the message defines the broadcast message region by specifying a central location and a radius. Other techniques and/or methods can also be used, such as for example specifying a ZIP code, longitude and latitude, area code, or the like. Additional parameters can also be provided: for example, the message can be sent to those users who purchased a particular product, or who belong to a particular demographic, or the like.

The message and the defined broadcast message region are stored within central data store 240, which is a part of, or is capable of being accessed by, the central server 120. Then, when a mobile device reports its current location to the server 120, the server 120 checks whether that location falls within any existing broadcast message regions and/or whether the specified parameters apply to the user of the device 142. If so, the server 120 sends all broadcast message content to mobile device for display to the device's owner.

In one embodiment, broadcast messages may contain additional data such as a hypertext link enabling access to further information. In one embodiment, a reply button may be provided, for initiating a response to the broadcast message.

Figure 50:
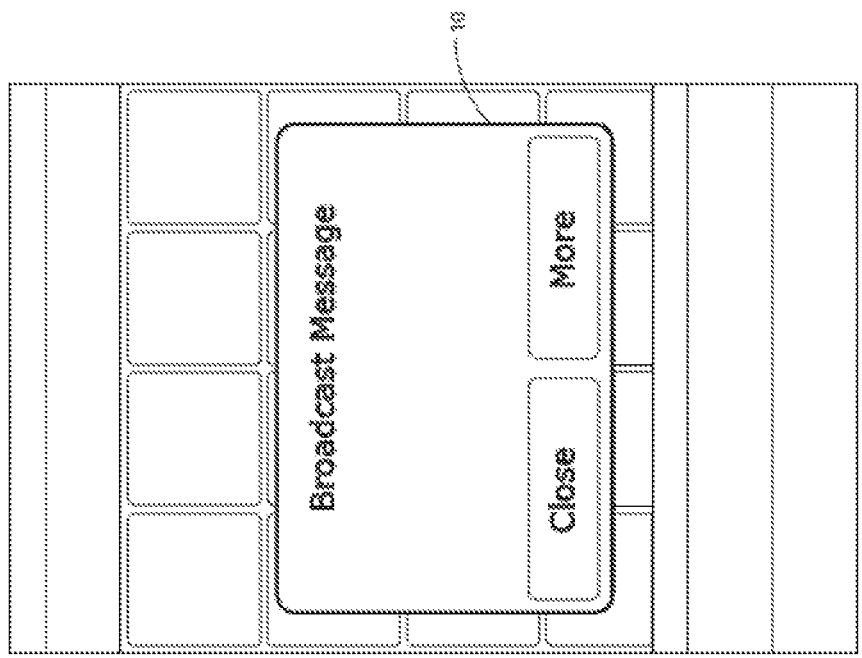
FIG. 50 depicts an example of a broadcast message as it is displayed on a mobile device for a user falling within the broadcast region.

FIG. 50 depicts an example of a broadcast message as it is displayed on a user device 142 for a user falling within the broadcast region. As indicated in FIG. 50, the message can be displayed in a dialog box that the user can then dismiss after reading. One skilled in the art will recognize that messages can be displayed in other ways. For example, In one embodiment broadcast messages may be sent "in application" to user devices to the extent that location-based application is executing and online. In other embodiments, broadcast messages may be conveyed by, for example, push, SMS, offline notifications, email or other modes.

Exemplary User Interfaces for Location-Based Social Interaction and Other Activities FIGS. 3-27 illustrate details of various embodiments of display screens which may be rendered by a client device 142 in conjunction with the host server system 120.

Figure 3A:
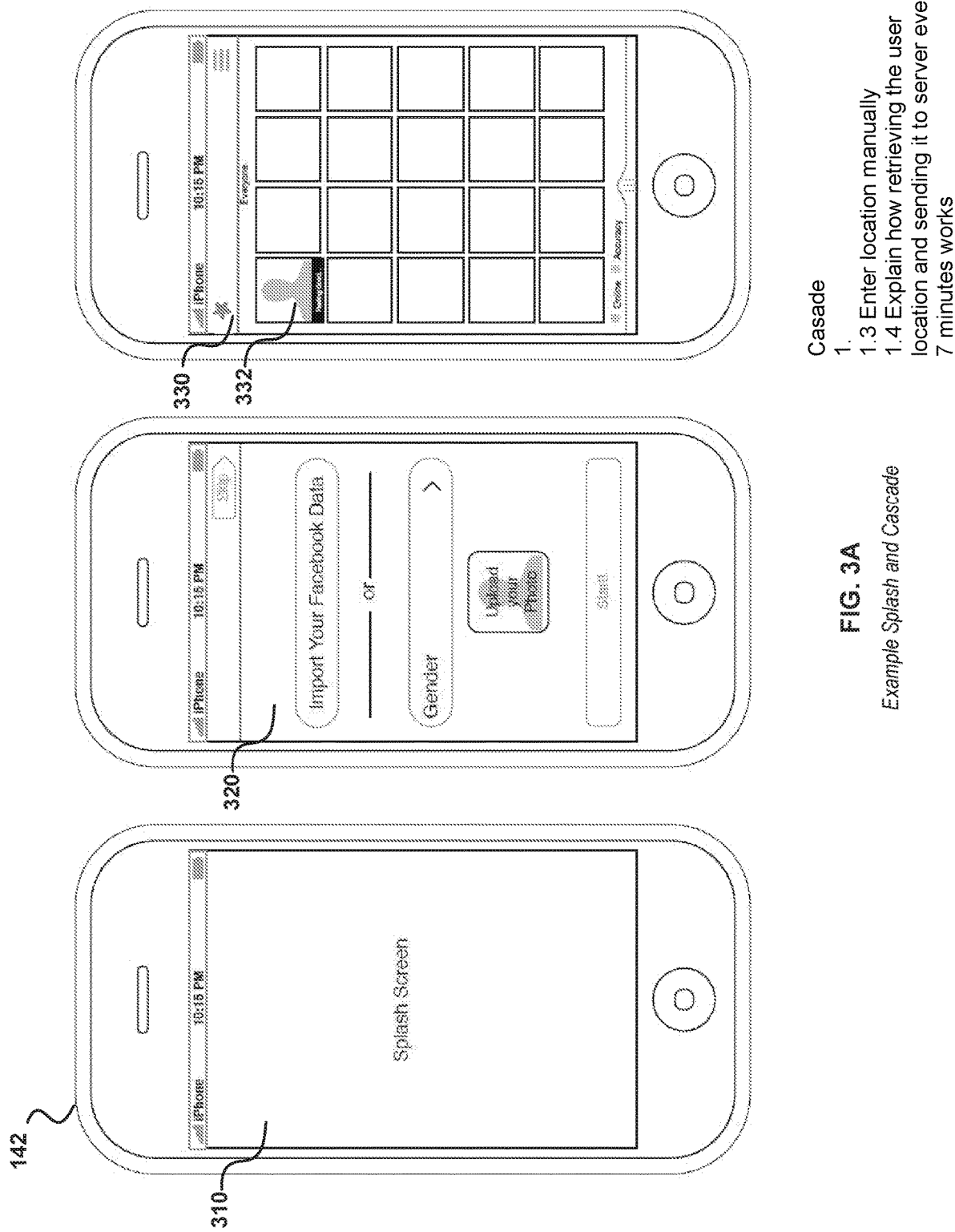
Figure 3B:
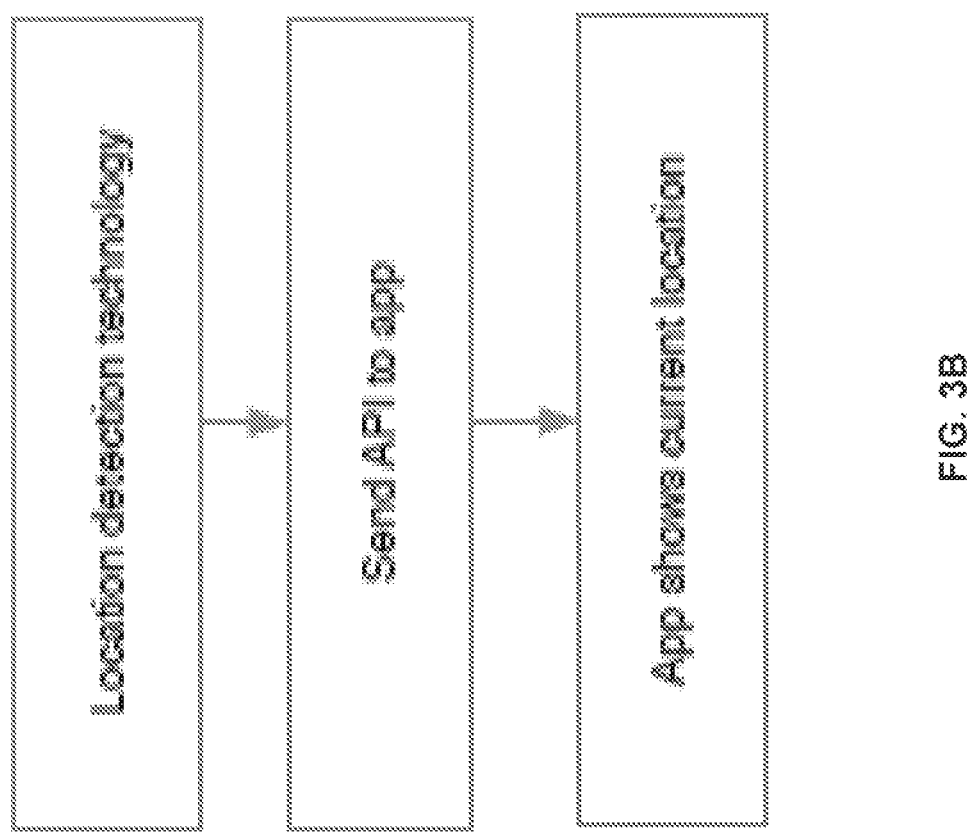

Attention is directed to FIG. 3A, which depicts splash 310 and cascade screens rendered by a user device 142 upon opening of an exemplary social interaction application executing on such device 142. In one embodiment, the first time the social interaction application is opened the screen 320 will appear to facilitate gathering general user information. As an initial operation, the user will be able to, for example, select a Import/Link Your Facebook Data option button. Alternatively or in addition, the user can specify a gender through selection of a Gender option button. Selection of the Upload Your Photo option button permits the user to upload a photograph and begin using the application. The cascade screen 330 shows users 332 in a near location. As is illustrated by FIG. 3B, location from the user is retrieved by a location detection system and provides an API to access this information.

FIG. 4 depicts an exemplary manner in which the display 290 of a user device 142 may transition from showing representations of all users of potential interest to a user of the device 142 to depicting only representations of favorites of a user associated with such device 142. For example, display 290 may render a first screen comprised of a cascade 410 of thumbnail representations 420 (e.g., photographs) of other users having similar interests to the user of the device 142 (and/or currently located nearby such device) and favorites of such user. Each thumbnail representation may include a representation of, for example, name 420b, online status 420c, waiting messages 420d, favorite star icon 420e and blue border 420f. When a favorites view is selected in the manner discussed below, the display 290 may filter the cascade 410 and transition to a screen containing a new cascade 412 comprised of thumbnail representations 430 of only the favorites of the user of the device 142.

Figure 5:
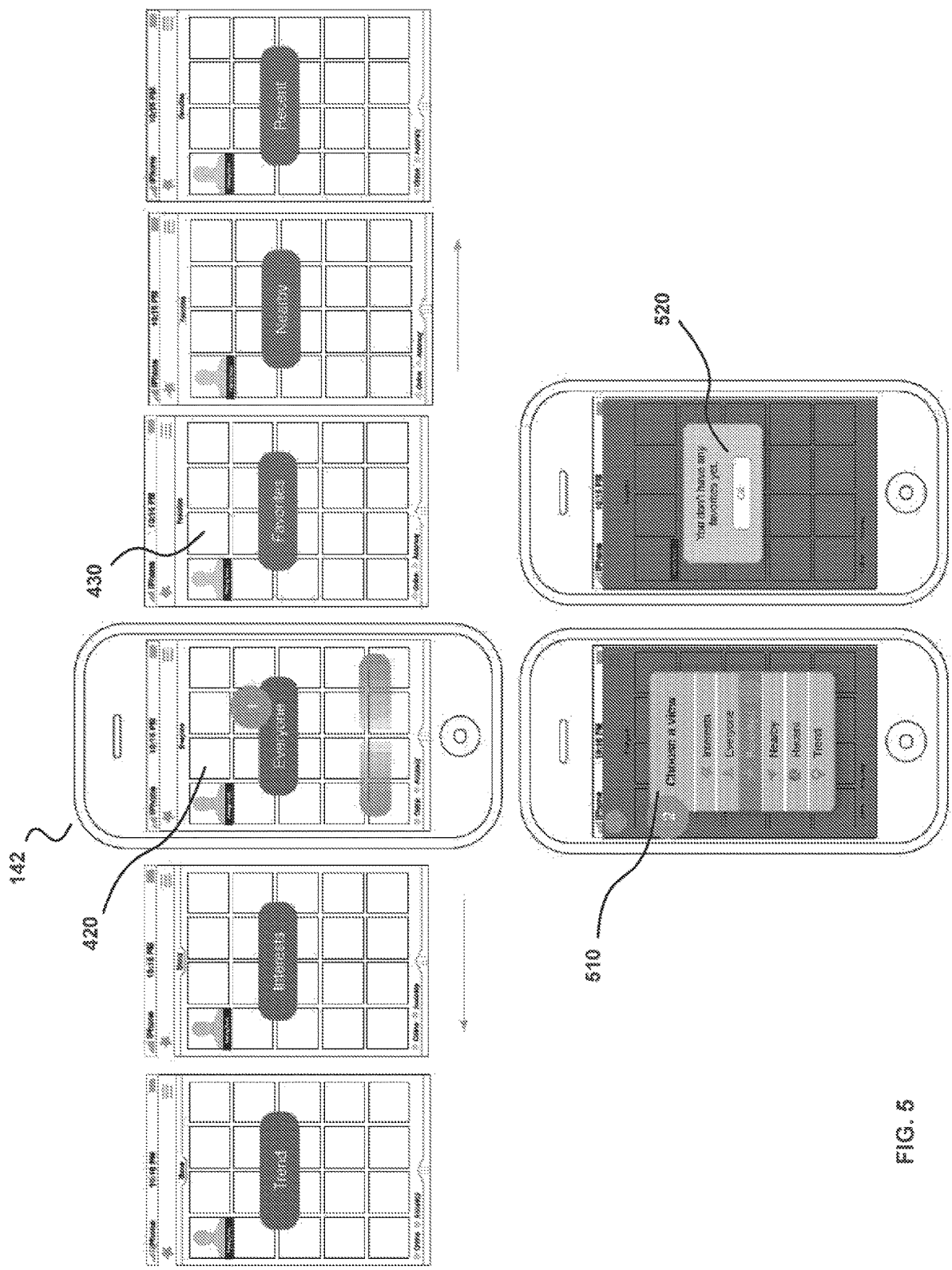

Attention is now directed to FIG. 5, which illustrates swiping between various views capable of being rendered by a display 290 of a user device 142. In one embodiment, the user may scroll or swipe horizontally in order to swipe or otherwise change between views. Upon commencing operation, the social interaction application executing on the device 142 may present an initial view comprised of both users having interests similar to that of the user of the device and favorites of such user. In one embodiment, when a scrolling action is initiated by the user a title representative of the new screen view will slowly fade in and become visible. Upon selection of the view, the cascade thumbnails will be refreshed and the titles will fade out. In order to scroll completely to the next view, in one embodiment the user is required to drag at least a predefined portion of the view title to a border of the screen pane; otherwise, the title will move or snap back to its original position and the current view will be maintained. When the user taps on the quick view button at the left of the navigation bar, a panel 510 will display the list of the views the user is able to access. User can also tap and hold down anywhere on the screen and the panel will appear. If a view has not yet been enabled, in one embodiment the applicable view button will be grayed out and a notification 520 will be provided to the user in order to indicate that some action need be taken to enable the view.

Figure 6:
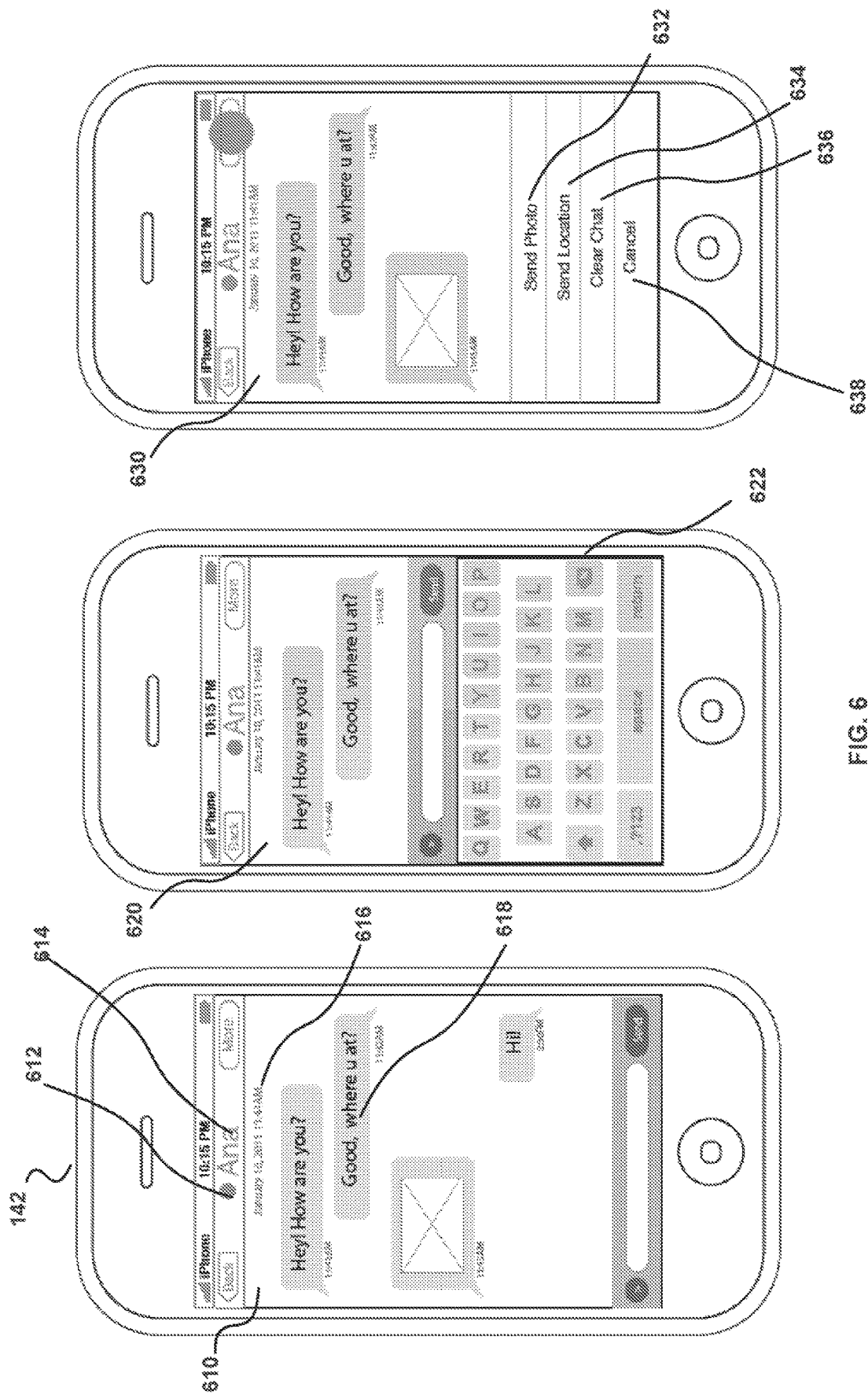

FIG. 6 illustrates of chat-related user interface screens which may be rendered by the display 290 a user device 142. In particular, a first exemplary chat screen 610 depicts an exchange between a user of the device 142 and a user of another device 142. A second exemplary chat screen 620 containing a representation of a keyboard 622 is also depicted. Finally, a third exemplary chat screen 630 depicts various actions associated with chat-related functionality. For example, a Send Photo button 632 may be selected in order to send a selected photograph to a chat partner via server system 120. Similarly, a Send Location button 634 may be selected in order to cause the user device 142 to request that the server 120 send the location of the device 142 to the device 142 of the chat partner. A chat session may be cleared by selecting a Clear Chat button 636, and a chat session may be cancelled by selecting a Cancel button 638.

In one embodiment, an indicator 612 is associated with the username 614 of the chat partner in order to indicate the partner's online status. A date and time stamp 616 may also be presented at a top of a chat screen. Alternatively, such stamp may be presented when a chat session begins and/or a time stamp may be displayed below each text bubble 618. In one embodiment tapping and holding, or double taping, on text bubbles 618 will copy text from the bubble. In like manner tapping over a photo or a map will expand it.

Figure 7:
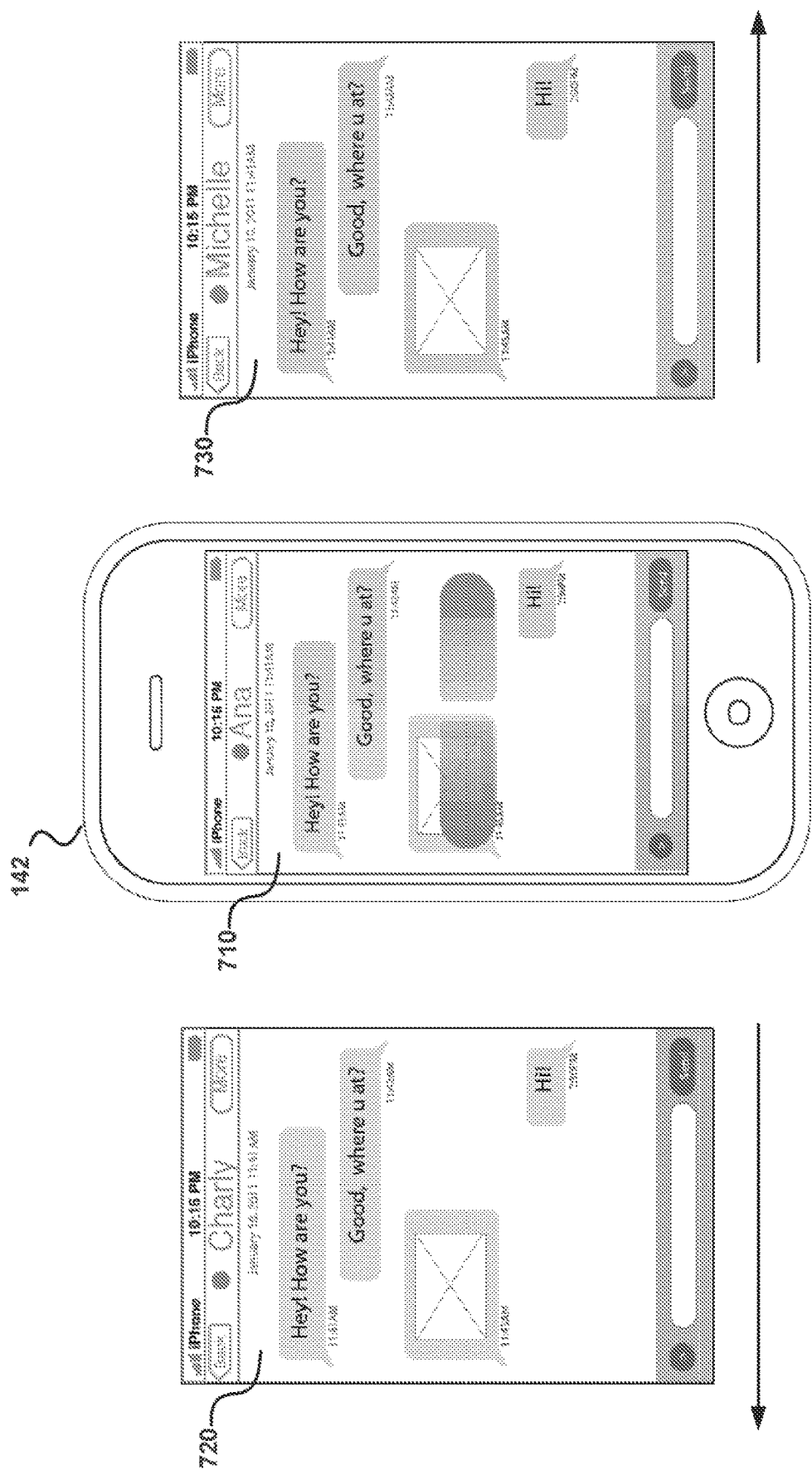

FIG. 7 illustratively represents an exemplary manner in which a user may swipe between active chat sessions. In particular, a user may scroll horizontally to swipe to another conversation and thereby swipe between active chat sessions. In the embodiment, the user of device 142 is seen to be scrolling among a first chat screen 710 displayed in connection with a chat session involving a user having the username "Ana", a second chat screen 720 displayed in relation to a chat session with a user having the username "Charly", and a third chat screen 730 associated with a chat session involving a user having the username "Michelle".

Figure 8:
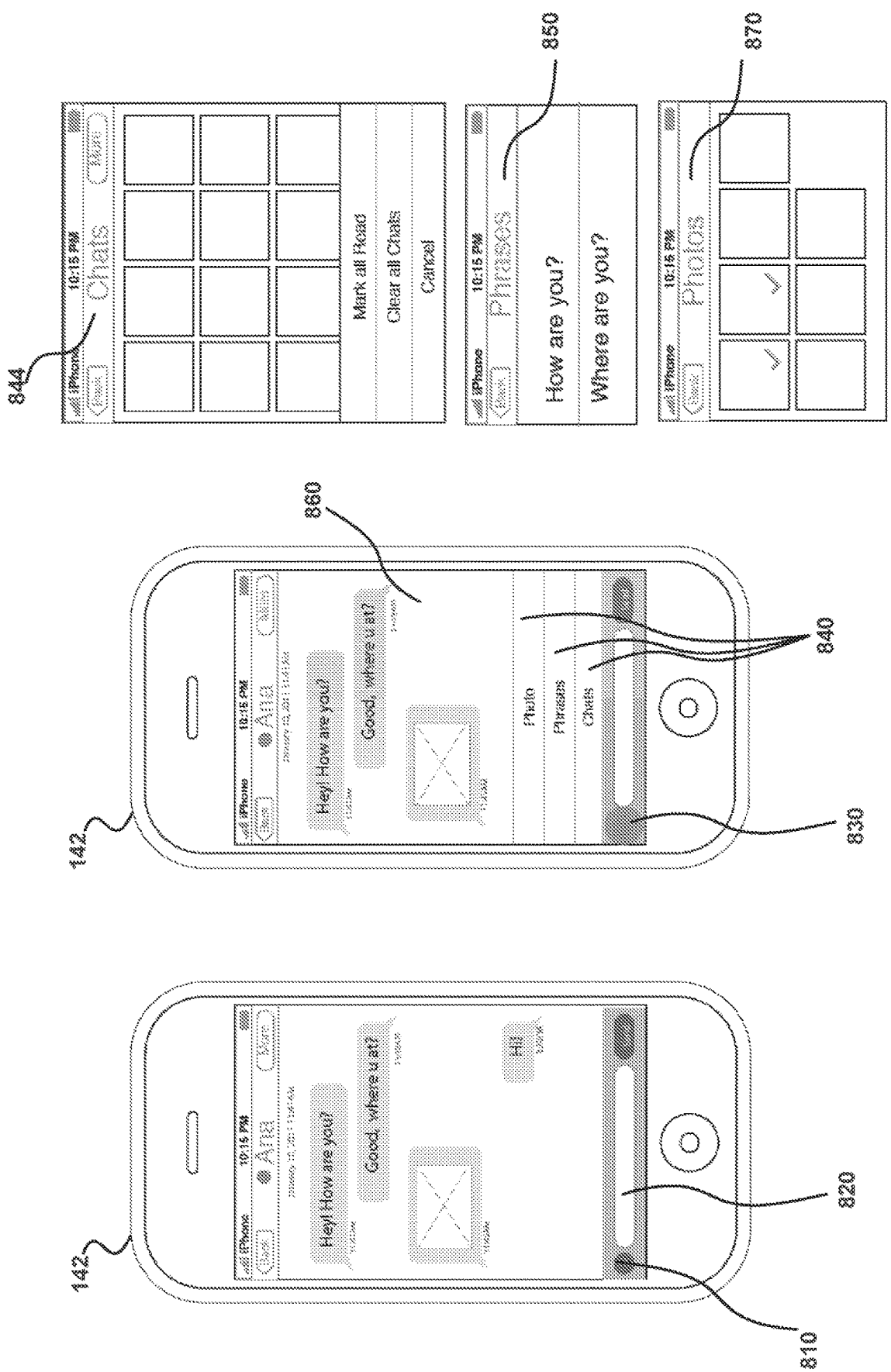

Attention is now directed to FIG. 8, which illustrates various quick action operations which may be effected during active chat sessions. In one embodiment a quick actions menu 830 may be expanded by selecting a quick actions icon 810 at a left side of text field 820. An active chats panel 844 may be accessed via the menu 839 or through performing a predefined action (e.g., tap and hold, or double tap of touchscreen 295 associated with display 290) with respect to a background portion of the chat screen. A menu displays options for Mark all Read so chat notifications disappear. Upon selecting a Clear all Chats button, all chat history stored in the user device 142 will be erased. A pop-up message may then be displayed and solicit confirmation that the ask the user desires to perform the requested action. A Quick Phrases menu pane 850 includes a list of most-used phrases. In one embodiment a phrase may be added to the pane through performing a predefined action (e.g., a tap and hold via touchscreen 295) over a phrase or word in the active chat screen 860. In order to delete phrases, the user can swipe in a predefined direction and will be presented with a delete option.

A Quick Photos menu pane 870 may be utilized to re-send photographs previously sent using the social interaction application 288 executing on the user device 142. In one embodiment photographs sent using the application 288 will be stored such that the user of device 142 may quickly resend all or a selected number of previously-sent photographs.

Figure 9:
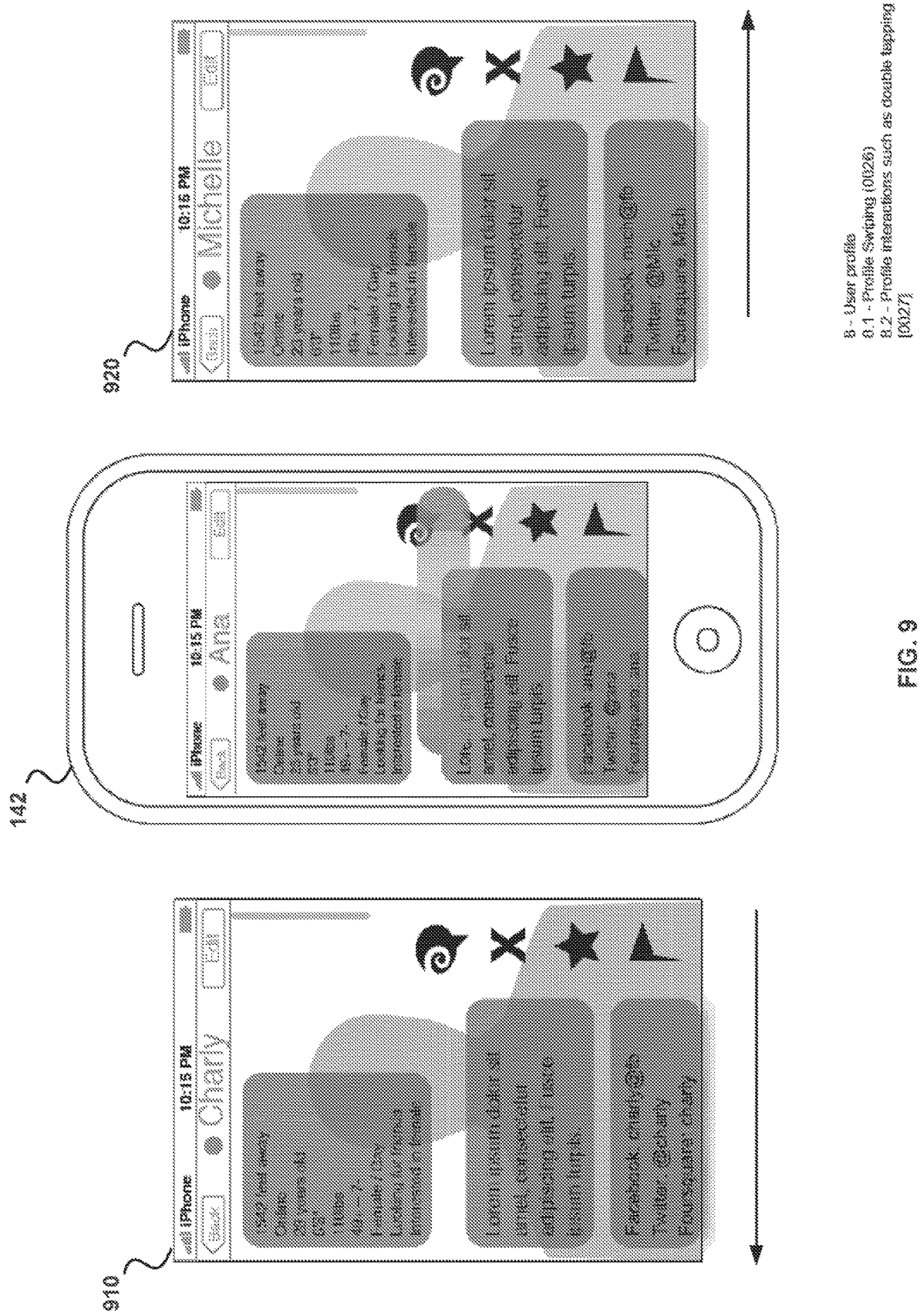

Referring to FIG. 9, there are illustrated various actions performed with respect to a user profile. Such actions may include, for example, profile swiping and profile interactions such as single or double tapping. Single or double tapping hides all text and icons and just shows the photo.

FIG. 10 illustrates an exemplary approach for sending administrative messages to one or more devices 142. In particular, pane 1010 illustrates a screen displayed by a device through which an administrator accesses server 120. As shown, the administrator may select one or more users and type a message to be distributed to such users. Screen pane 1020 illustrates the display of such message by display 290 of the user device 142 associated with one of the users selected by the administrator. In one embodiment the pane 1020 may have various distinguishing features (e.g., a blue border) and displays the username "Admin" and is "read only"; that is, the user is precluded from replying to the administrative posting conveyed by screen pane 1020.

Referring now to FIG. 11, there are shown various user interface screens to which reference will be made in describing the management of broadcast messages within the system 100. As shown, a user of a device 142 may be notified of an incoming broadcast message by a pop up window 1110 in the cascade screen 1112. Through a setting screen 1120 a user may choose whether or not to receive broadcast messages. As shown, the user may also select a saved messages menu option 1130 in order to review any broadcast messages saved on the user device 142.

Figure 12:
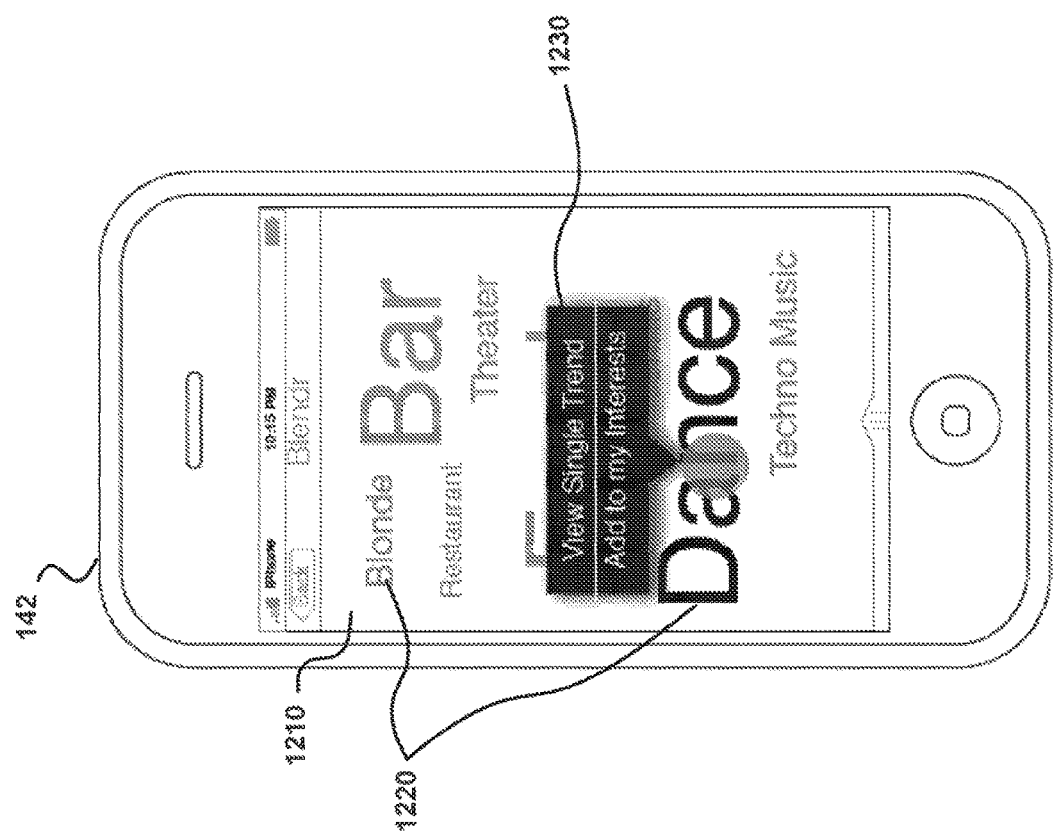

FIG. 12 displays a geo-located tag cloud 1210 user interface screen displayed by a device 142. As shown, the geo-located tag cloud 1210 includes a number of tags 1212 representative of interests popular among other users proximate the device 142. A user of the device may select 1230 an interest to be associated with such user by selecting a tag 1212 from the tag cloud 1210.

FIG. 13 depicts an exemplary manner in which a user may send a message "bomb" to all users in a cascade. In particular, the user taps and holds over the cascade until a pop-up 1310 appears. A chat screen 1320 then appears in which the user may type the desired message. In one embodiment an individual chat session will then be opened for each one of the users.

Figure 14:
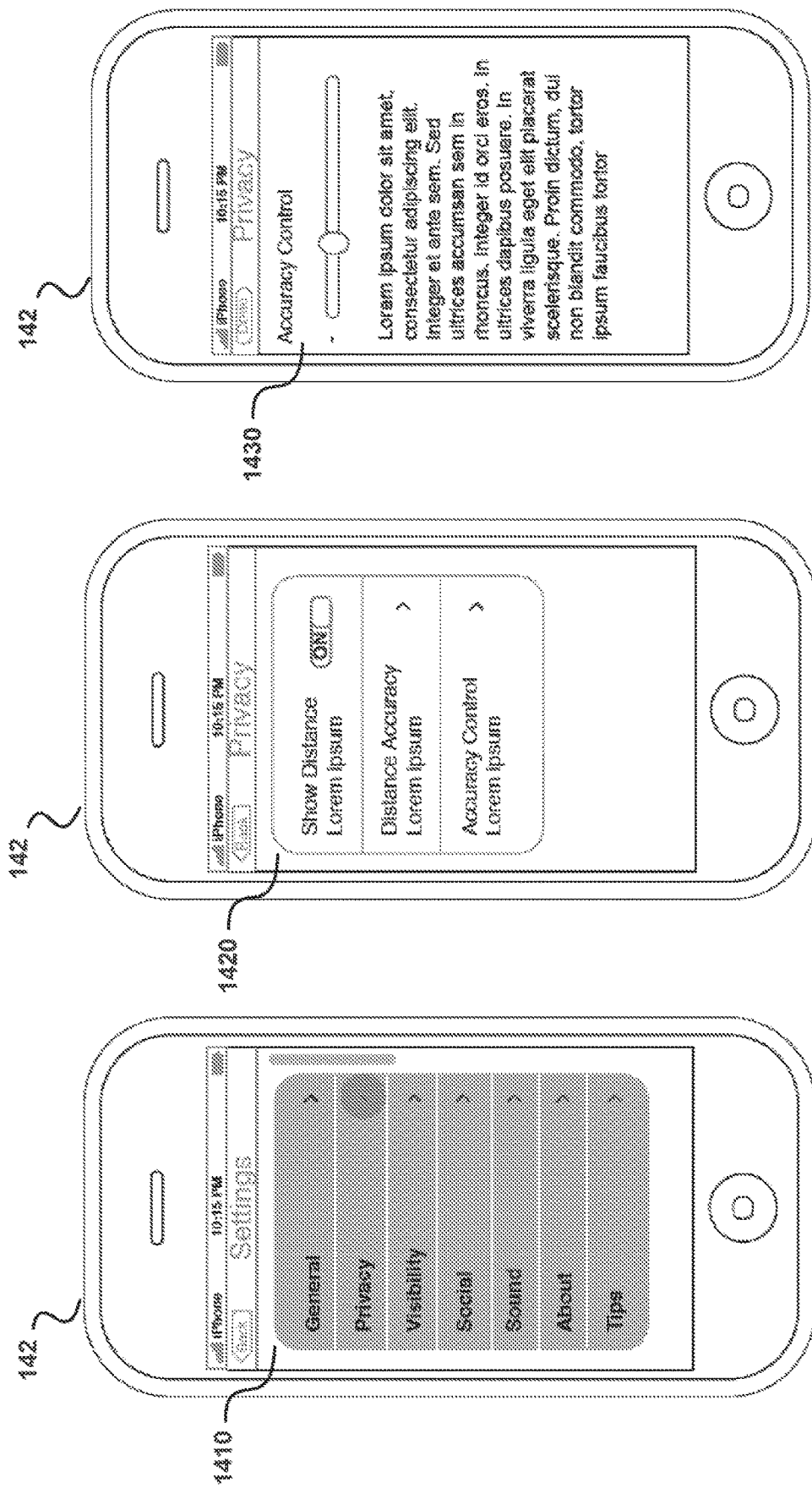

FIG. 14 illustrates a set of user interface screen showing an exemplary way in which users may control the accuracy with respect to which their location is displayed to other users.

Figure 15:
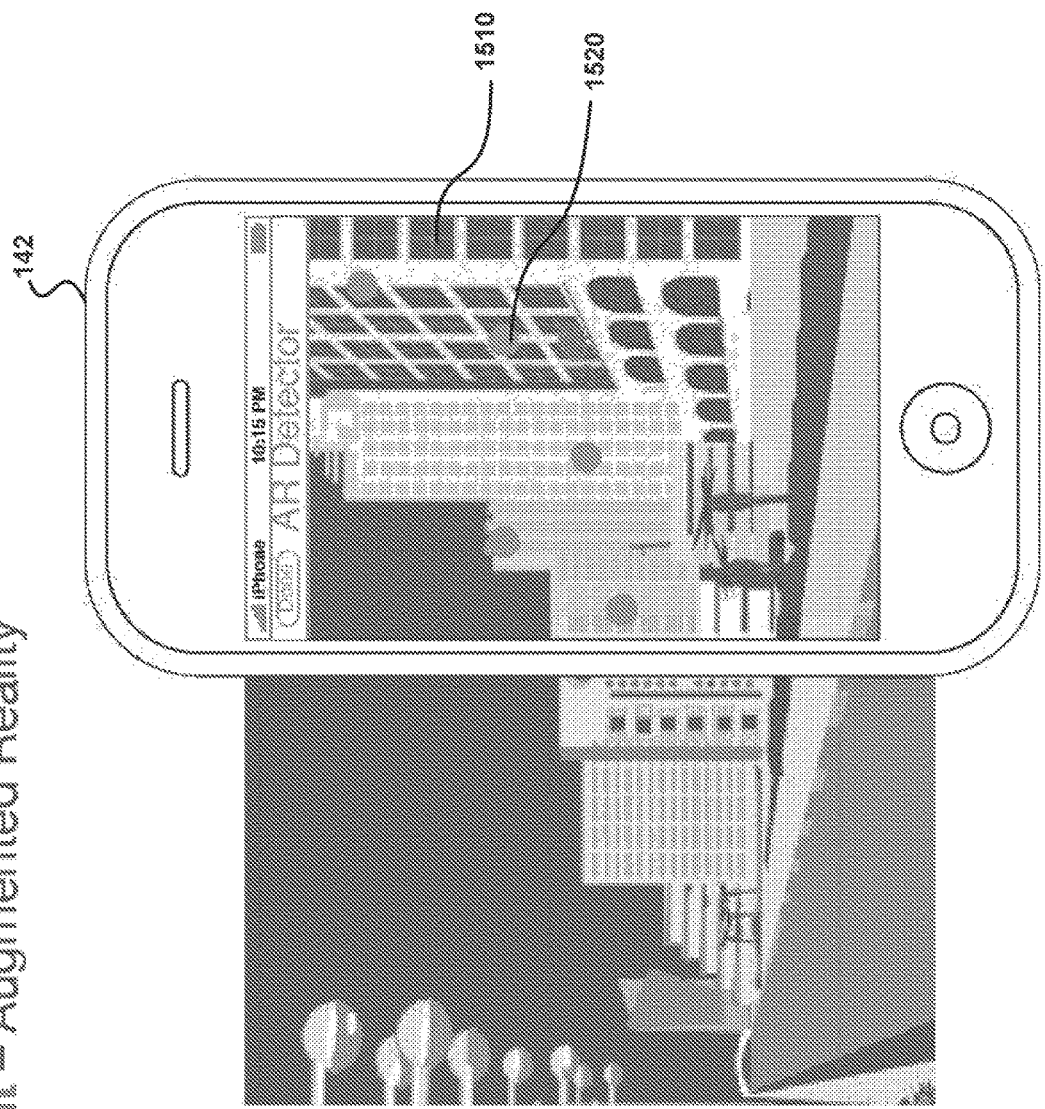

Referring now to FIG. 15, a user interface screen 1510 displayed by a device 142 is seen to provide representations 1520 of the locations of other users relative nearby the user of device 142. Upon tabbing over one such representation 1520, a profile of the detected user may be displayed.

Figure 16:
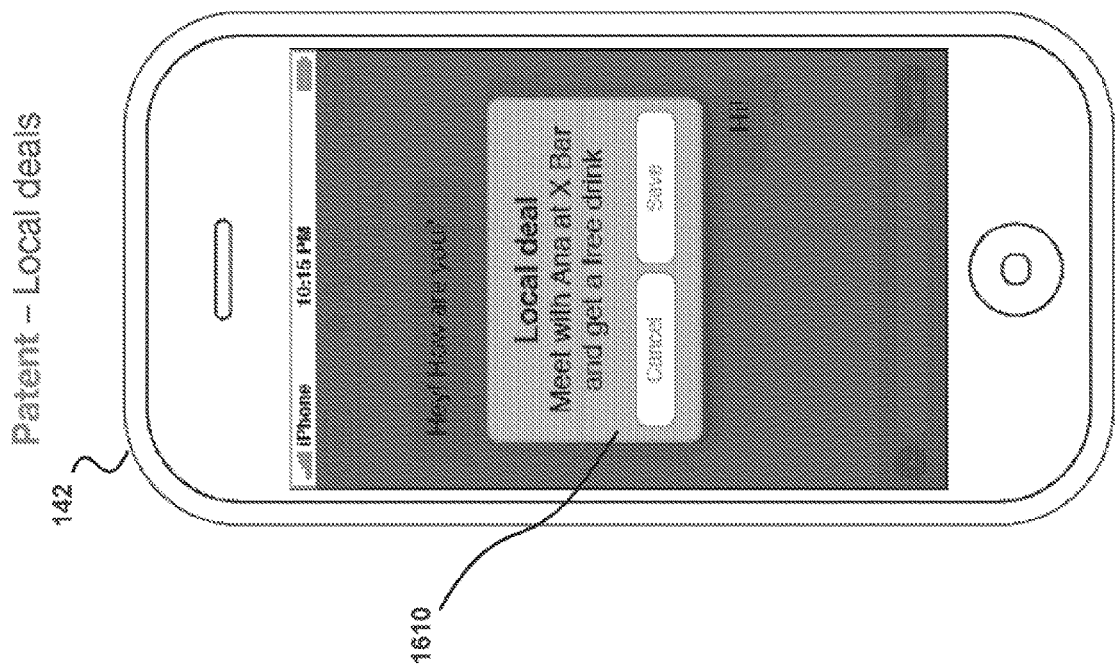

Turning now to FIG. 16, an illustration is provided of a method of conveying commercial promotions to the users of the devices 142. For example, after a pair of users of the devices 142 have engaged in a chat session for some period of time, both users may receive a notification 1610 of a deal for a bar or restaurant inviting them to meet at the venue.

Figure 17:
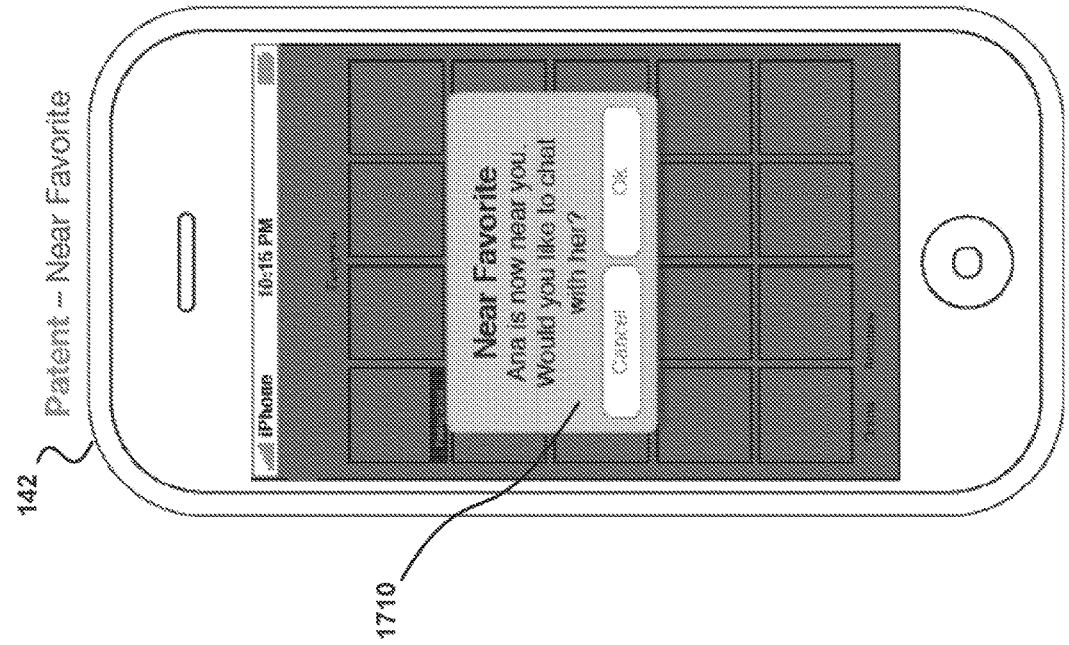

FIG. 17 illustrates that a push/notification message 1710 may be sent to a device 142 whenever a favorite of a user of the device 142 is within a predefined distance of such device 142.

Figure 18:
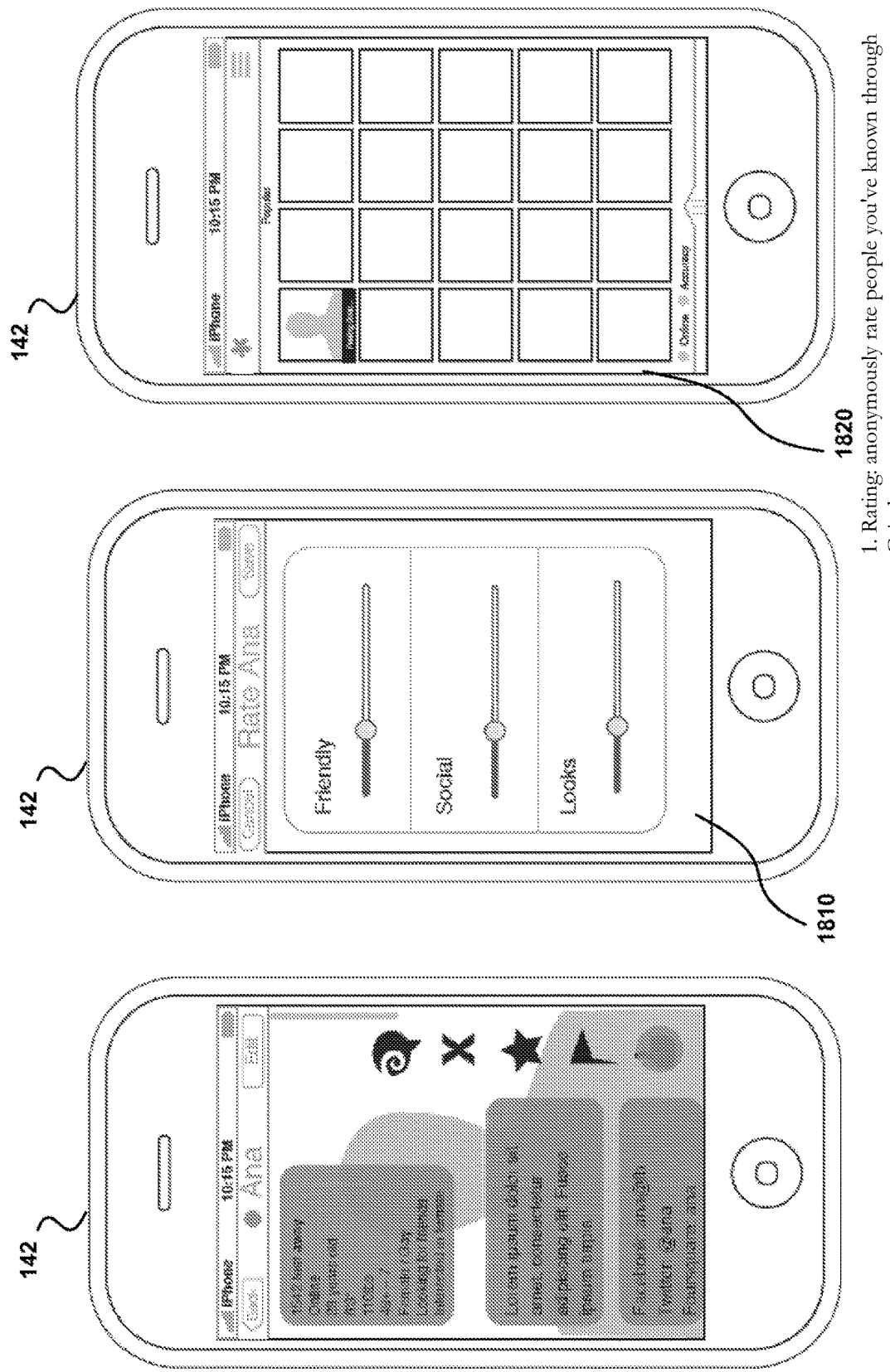

Turning now to FIG. 18, there are illustrated various user interface screens of the type which may be displayed by a user device 142 in connection with an anonymous process by which a user of the device 142 rates or otherwise evaluates other users of the system 100 with which such user has interacted. In particular, the user of the device 142 may specify ratings in various categories by way of user interface screen 1810. Cascades 1820 of representations of proximately-located popular users with respect to each category may then by displayed.

Figure 19:
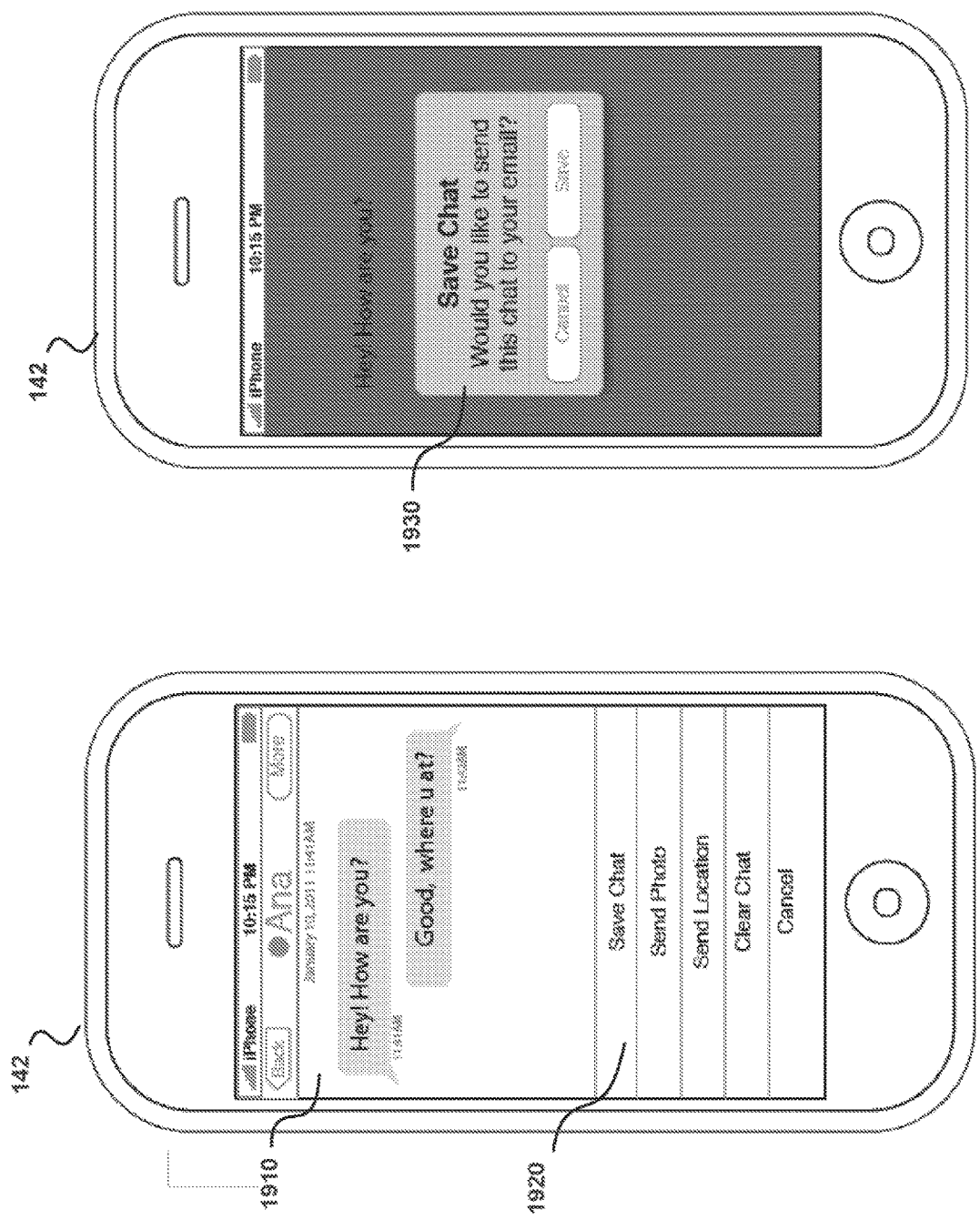

FIG. 19 depicts an exemplary in which the text exchanged during a chat session may be saved. In particular, a user of a device 142 may take some predefined action with respect to a chat screen 1910 in order to cause chat menu 1920 to appear. The user then selects a Save Chat menu option, which results in a pop-up window 1930 inquiring as to whether the user desires to send the exchanged text through a mail operation.

Figure 20:
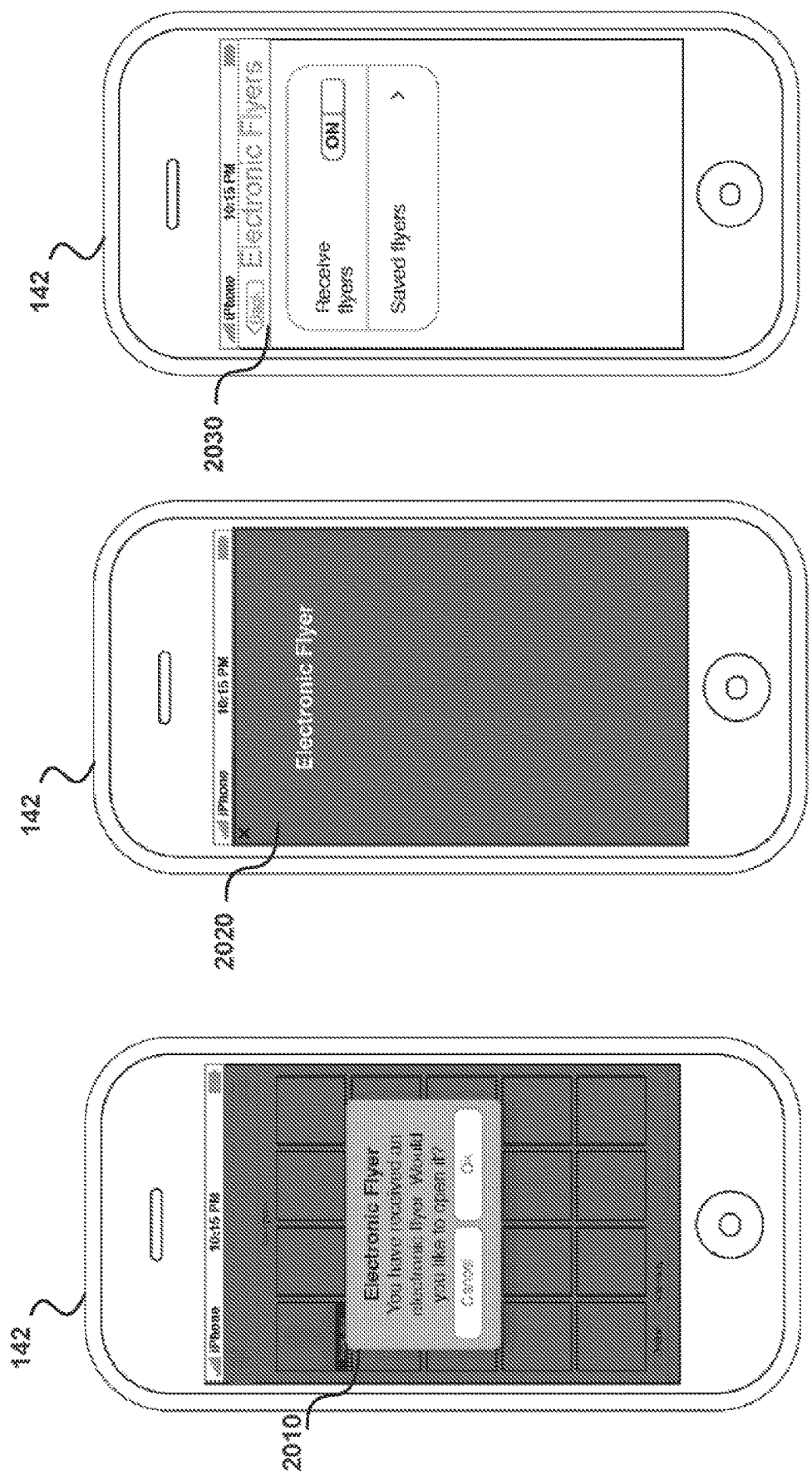

Referring to FIG. 20, "electronic flyers" for events, coupons, invitations and the like may be broadcasted to a user device 142 based upon knowledge (e.g., via GPS coordinates) of the location of device 142. Upon being notified of receipt of such an electronic image asset through a pop-up window 2010, the user of the device 142 may open and save the electronic image asset 2020 for use in connection with a corresponding event (e.g., a coupon may be saved on the device 142 and shown in a checkout line to obtain a discount). In this way the system 100 advantageously enables the distribution of customized, geo-targeted rich media notifications to the users of particular devices 142. Upon closing the representation of the electronic image asset 2020, a pop-up window (not shown) prompts the user to either save or discard such asset 2020. As shown by screen pane 2030, the user of device 142 may can choose whether or not to receive electronic image assets and may review and retrieve those that have been previously saved. Alternatively, such electronic image assets may be received by push/notification, SMS or the like.

Figure 21:
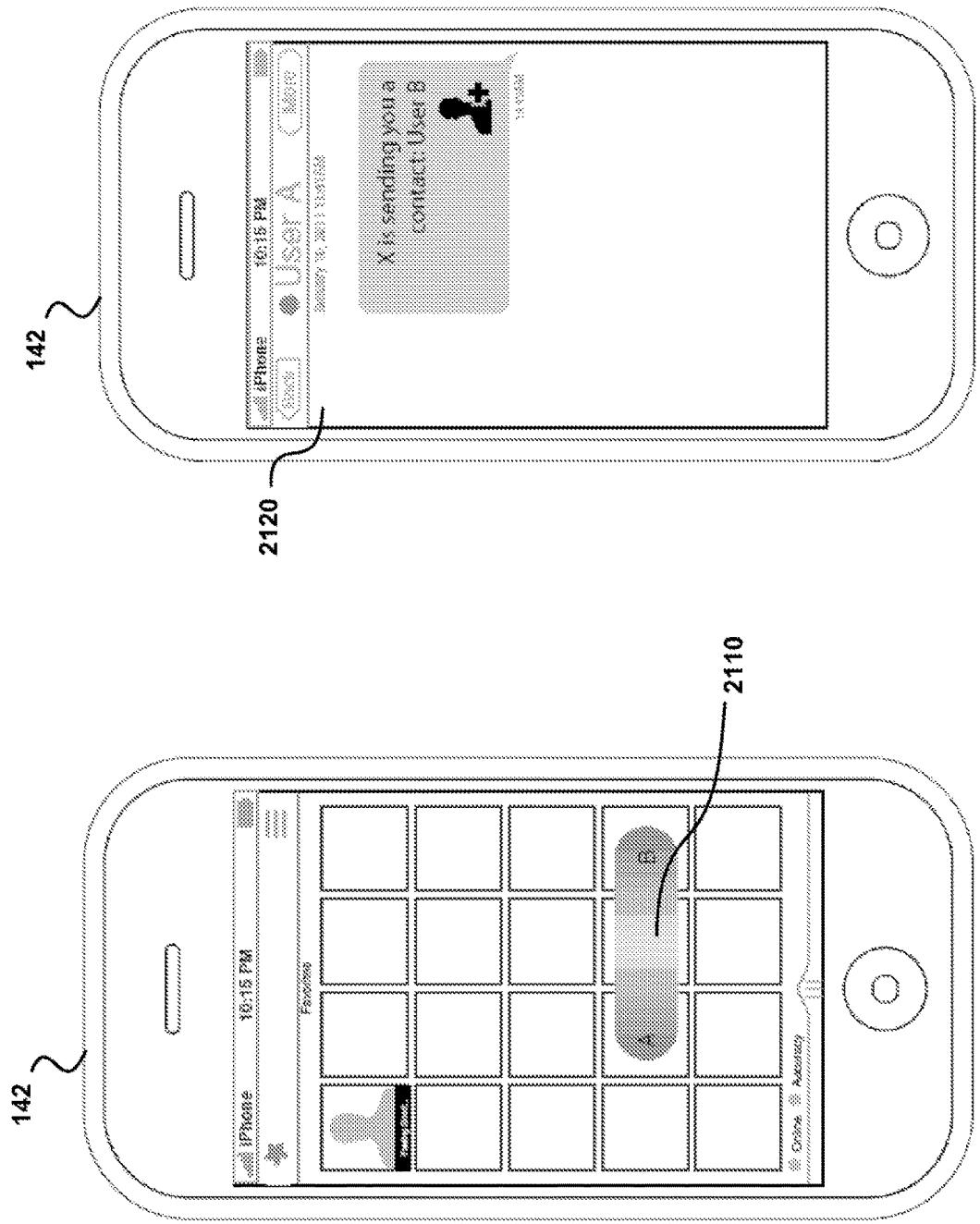

FIG. 21 illustrates an exemplary process for user sharing. In particular, a user of a device 142 may initiate a sharing operation with a first user ("User A") by "dragging and dropping" 2110 a thumbnail representation of a second user ("User B") onto the thumbnail representation of User A. A chat-based user interface 2120 will be opened to permit User A to accept the contact with User B.

Figure 22:
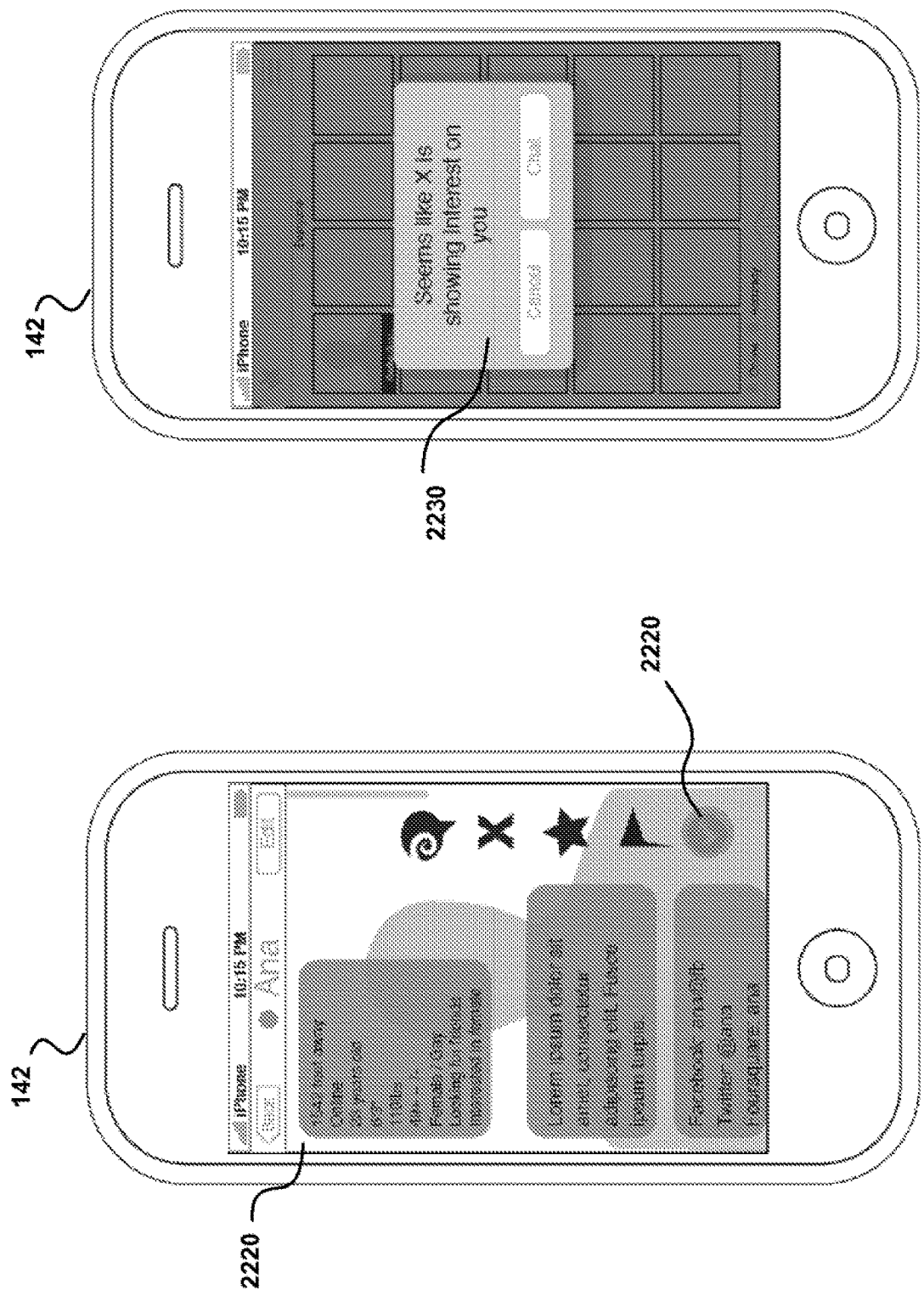

Referring to FIG. 22, a user may show interest in another user by tapping on a checkmark 2210 on a user interface screen 2220 profiling such other user. In one embodiment the other user will receive a pop window 2230 providing notification of such interest.

Figure 23:
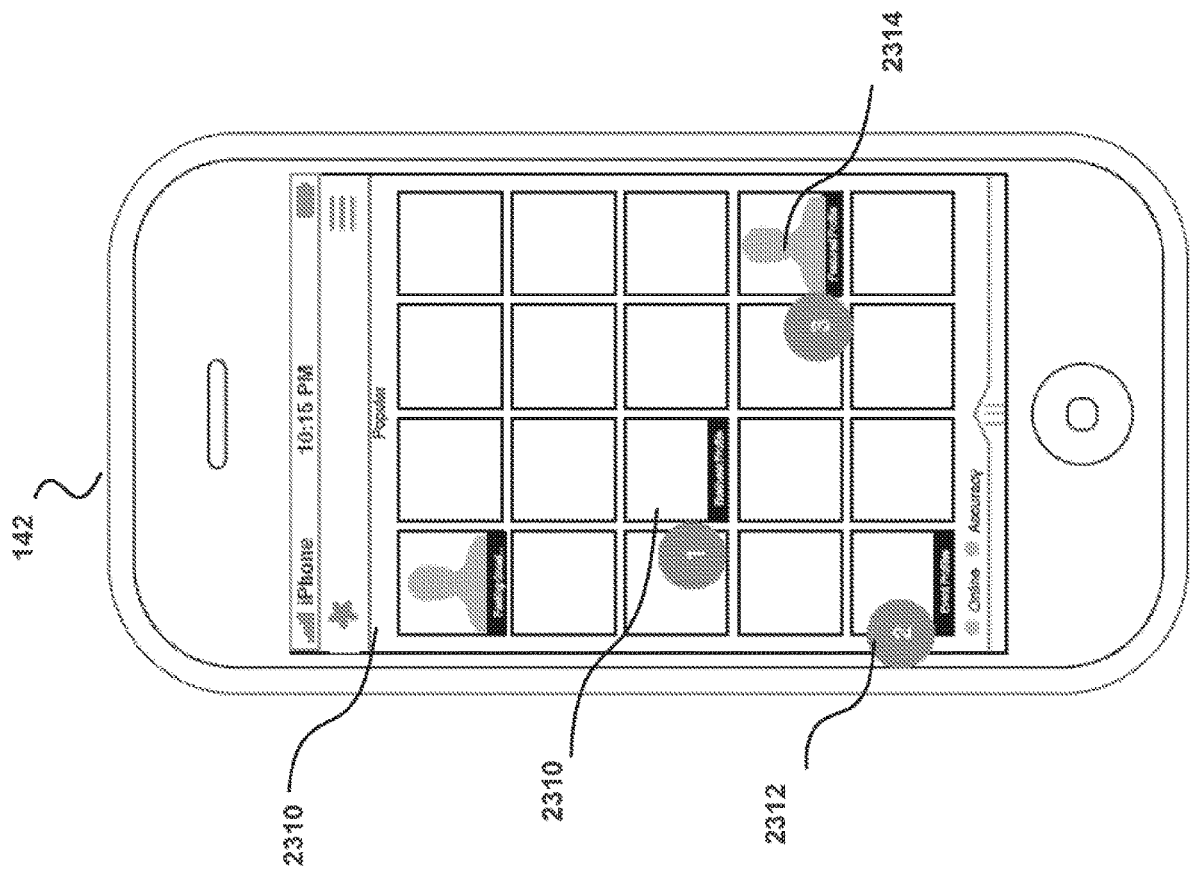

Attention is now directed to FIG. 23, which illustrates one manner in which profiles of commercial businesses (e.g., bars, restaurant, or retail stores) and other entities may be utilized within the system. In one embodiment a logo or ad is associated with each business profile 2310. Each business establishing a profile will pay a monthly fee in order to be permitted to place advertisements or business information within their profile. Similar to business profiles, event profiles 2312 may include information pertaining to a specific event but will include an expiration data associated with the date of the event. In one embodiment the entity organizing the event will pay a fee to post an advertisement or other information in association with the event profile. In addition, users may pay a fee to the operator of the system 100 in order to be presented as featured profiles 2314 within the cascade 2310. Venues and events can also engage in a chat, display coupons in their profile, send coupons in chat.

Figure 24:
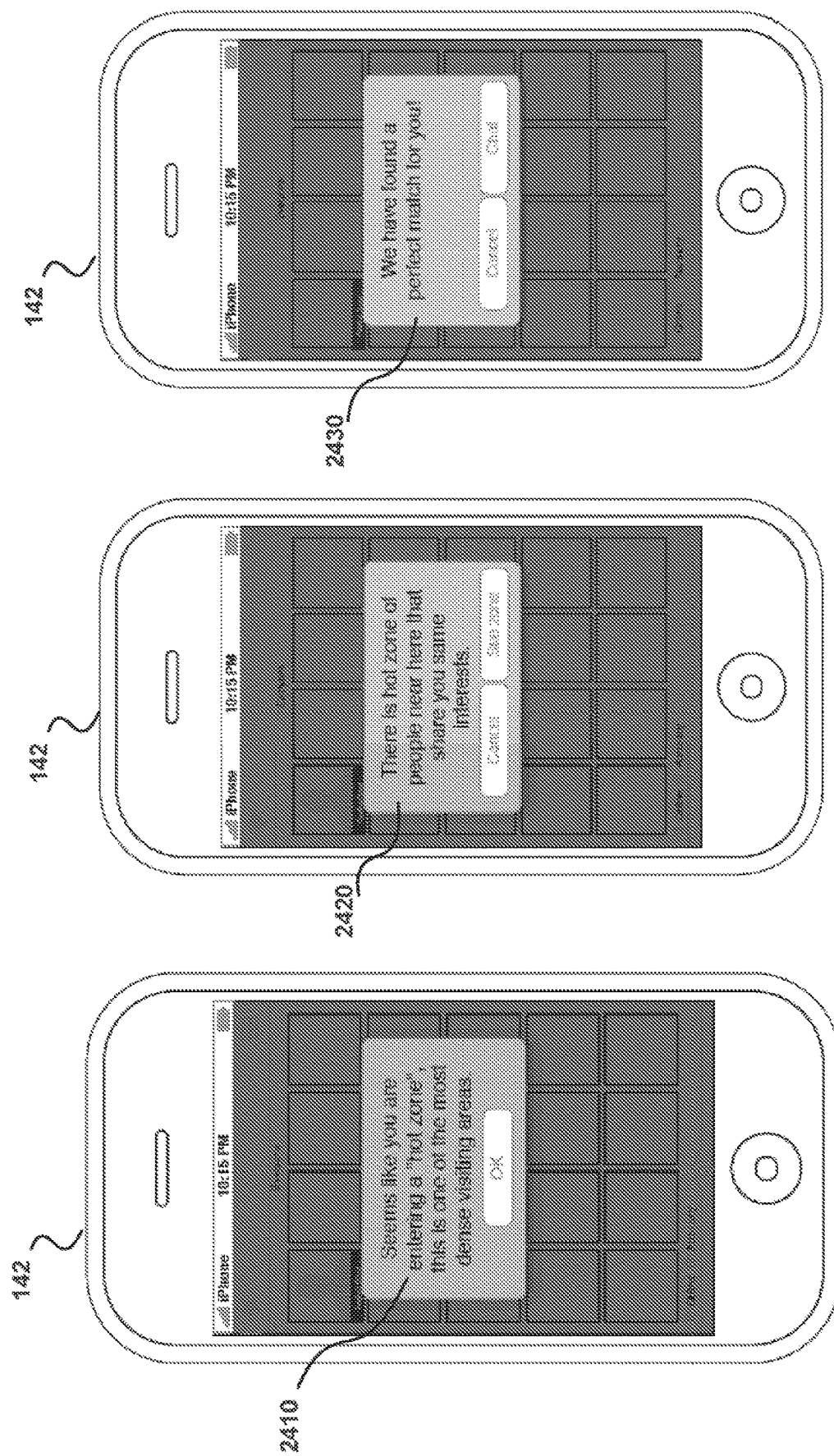

Turning now to FIG. 24, the server 120 may be configured to mine zones with dense information and name them as "hot zones". When a user of a device 142 approaches such a zone, the user may be notified 2410 of the popularity of such zone among other users. The user of the device 142 may also be notified of a specific venue that has been targeted as popular among other users.

Based upon location and interests, a user may be notified 2420 of a specific area in users having similar or the same interests are grouped together. In one embodiment the user could be presented with a map providing the location of such a grouping. As is also shown in FIG. 24, a user of a device 142 may request to be informed 2430 by the server 120 if a match to another user is identified based upon the same or similar interests within the range of user-defined settings. Users may be listed based on an algorithm then that takes into account shared interests and distance, so its ranked using those two factors.

Figure 25:
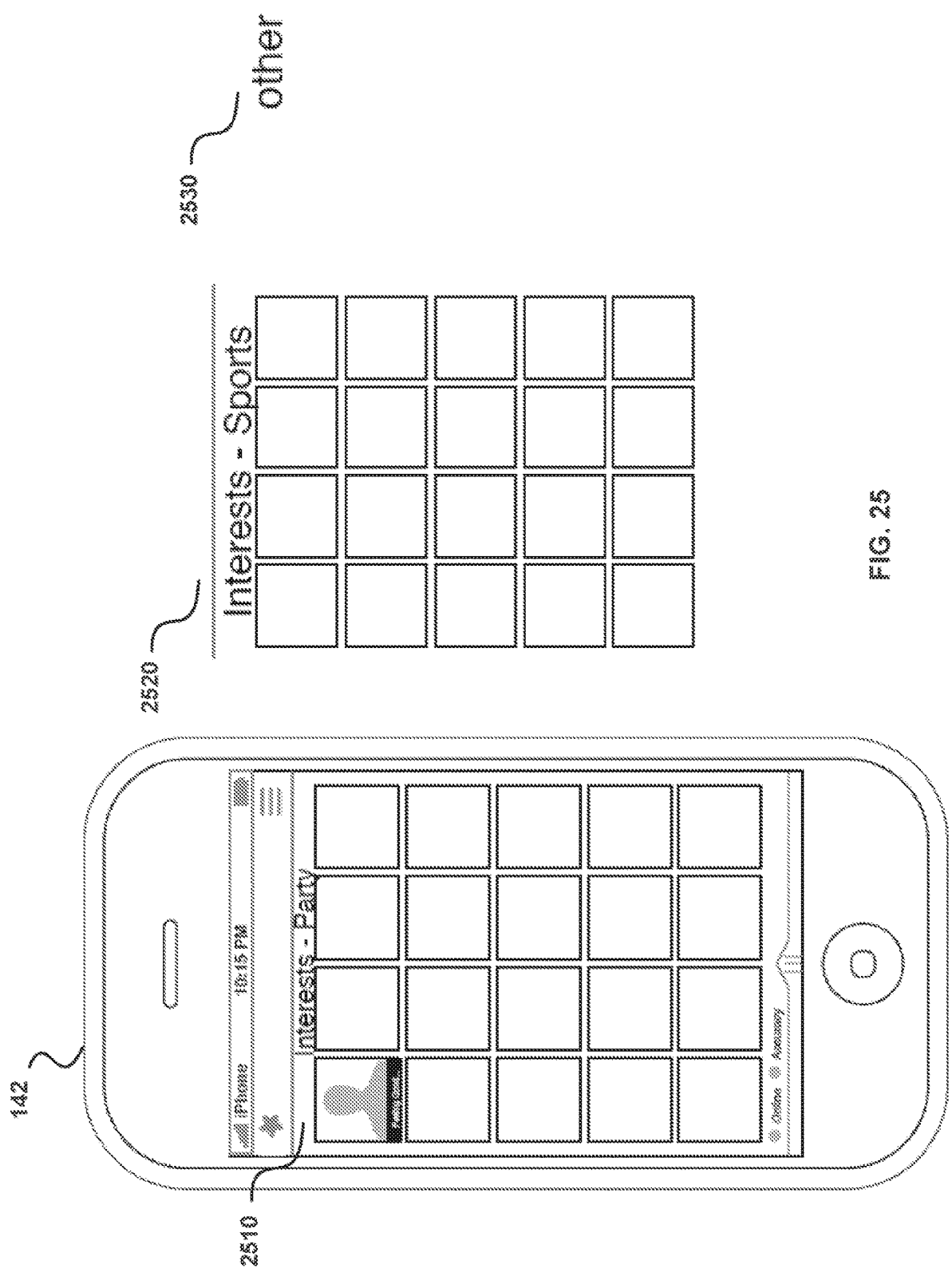

FIG. 25 depicts a view that provides the user of a device 142 with all the nearby users that have interests the same or similar to those specified by such user. In one embodiment the user may have different group of interests set up, each of which may be considered an "interests profile". Accordingly, the user may select a particular interest profile when such user desires to socialize or "party", another when the user is interested in participating in sports, and yet other profiles in the case the user is interested in reading, business, dating or other activity. The user may easily access such stored profiles in order to identify nearby buddies matching the interests characterizing the user's respective interest profiles.

Figure 26:
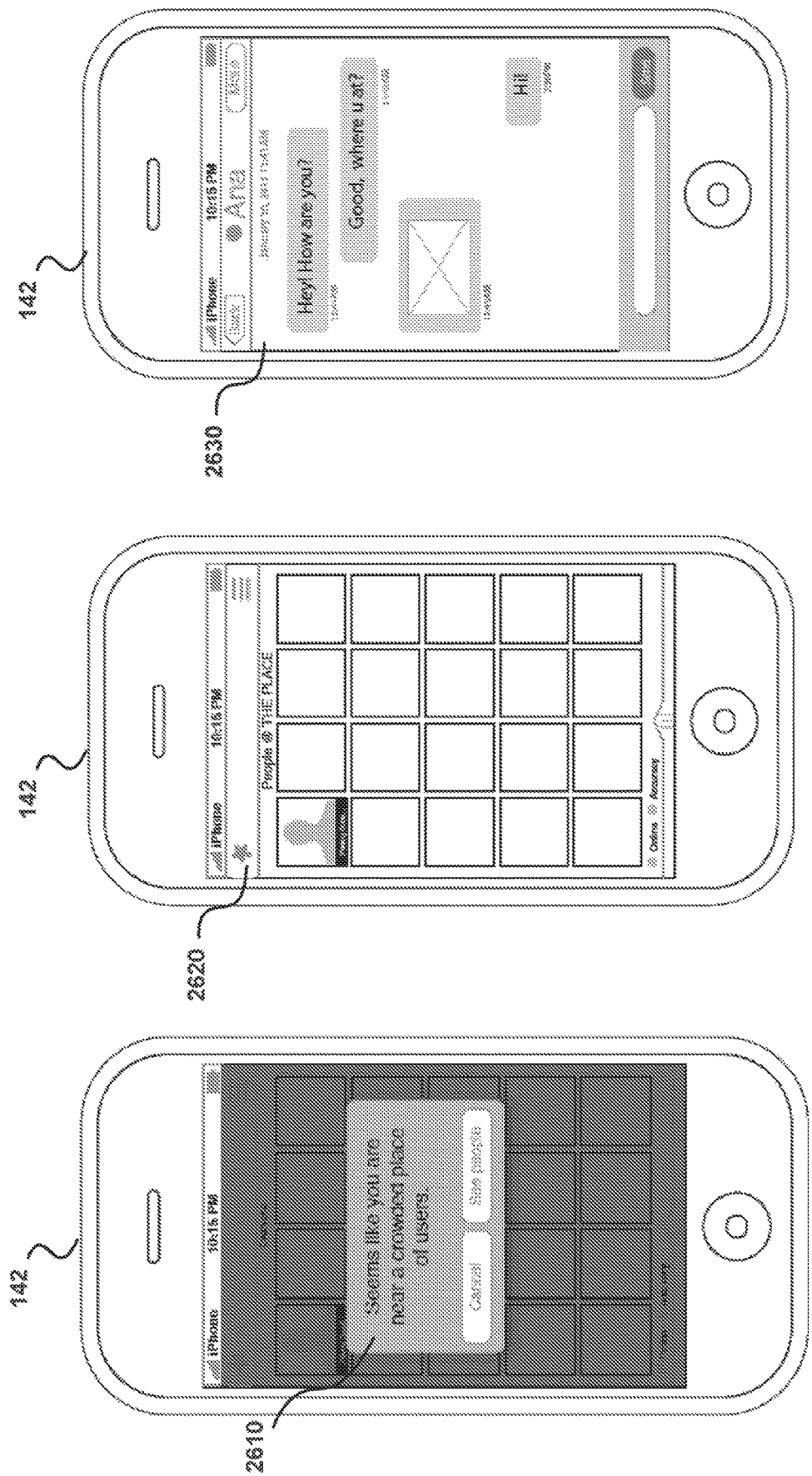

Referring to FIG. 26, a user may, for example, be notified 2610 when the user's device 142 becomes nearby a known venue. Alternatively, the user may be presented with information concerning venues in the areas proximate the location of the user's device 142. In one embodiment the user is presented with a view 2620 of the other users of the system 100 at a specific venue. In other embodiments the user may engage in real-time chats 2630 with users in such venues.

Figure 27:
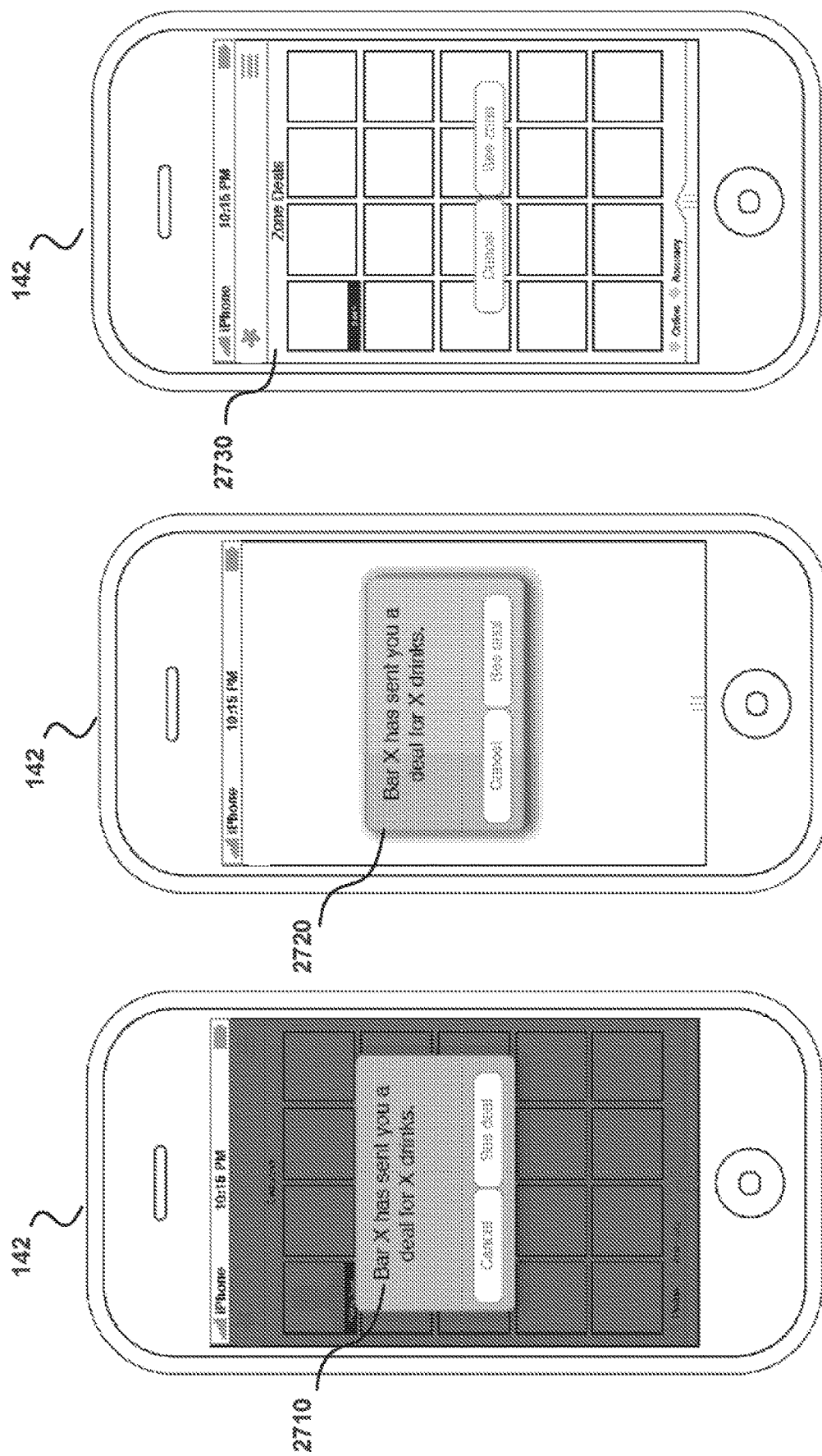

Turning now to FIG. 27, a local business may desire to offer a deal (e.g., a discount or a coupon) to users of the system 100. In one embodiment all users within a predefined area defined by the business establishment offering the deal are notified 2710 by an in-application message. The user may then can access the coupon or other indicia of the deal and redeem it at such business establishment. In one embodiment the business then pays the operator of the system 100 either for each user receiving the deal promotion message, a percentage of the relevant sales price or, for example, a set amount per new customer acquired by such establishment. As shown in FIG. 27, notification 2720 of the deal can be also sent to the device 142 via a push notification (when the user is not using the application). Users can also have access to deals around their location, and in one embodiment are enabled to view deals which are the same as those offered to nearby buddies.

System Architecture and Operation

Figure 28:
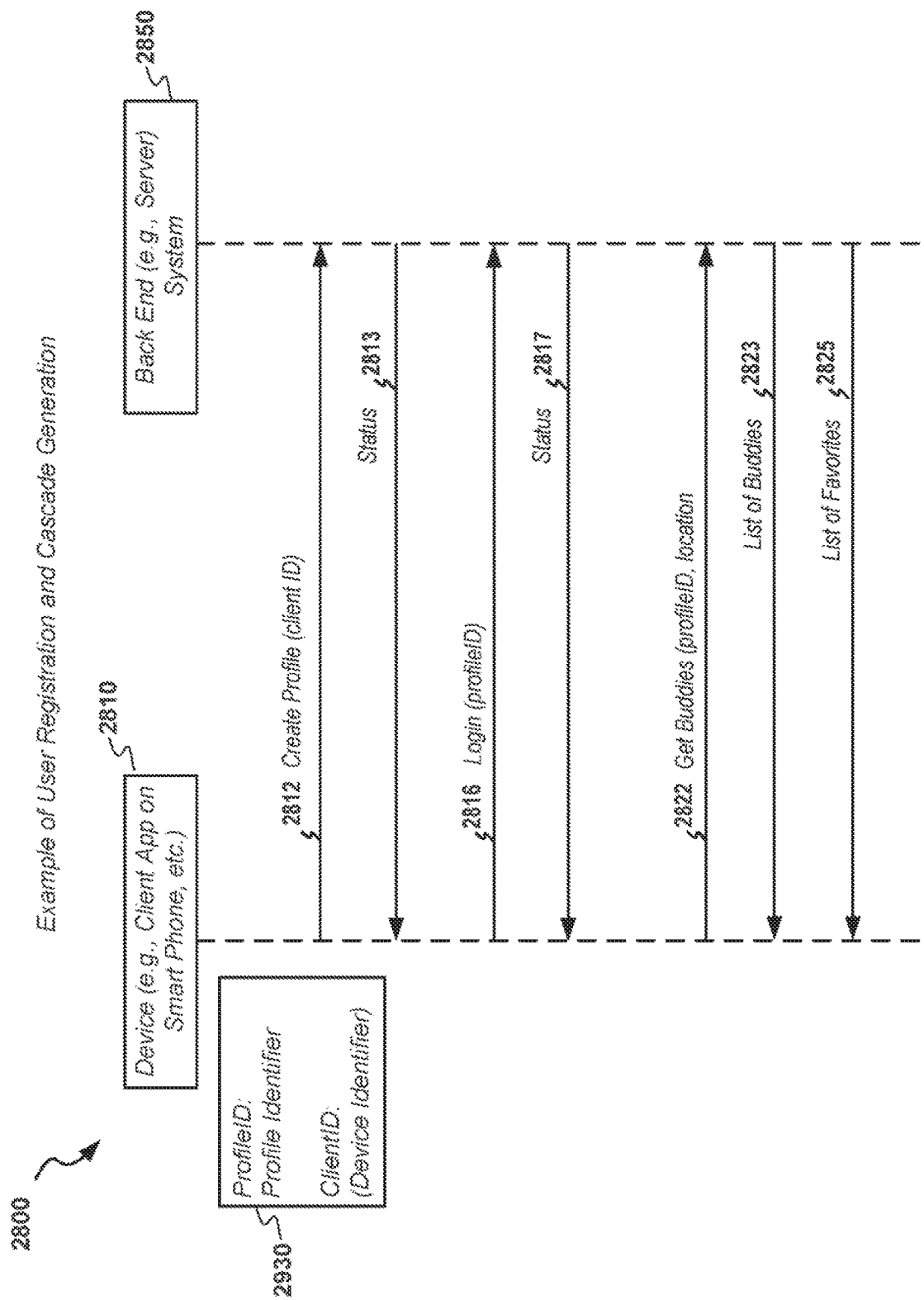
FIG. 28 illustrates details of an embodiment of a signaling workflow in accordance with aspects of the present invention between a client device such as shown in FIG. 2B and a host server, such as shown in FIG. 2A.

FIG. 28 illustrates details of an embodiment of a signaling workflow in accordance with aspects of the present invention between a user device 142 and the server system 120. As shown in FIG. 28, upon a user opening the application on a device 142 for the first time, the device 142 sends the server 120 the clientID (device identifier) in order to enable creation of a new user profile. The server 120 returns to the client the profileID (profile identifier). The profile identifier will then be used in subsequent communications between the device 142 and the server 120. In one embodiment the device 142 should login or otherwise submit the profile to the host server system 120. Next, the device 142 requests the server to provide cascade-related information. In response, the server 120 returns a list of buddies and favorites ordered by location relative to a location of the device 142.

Figure 29:
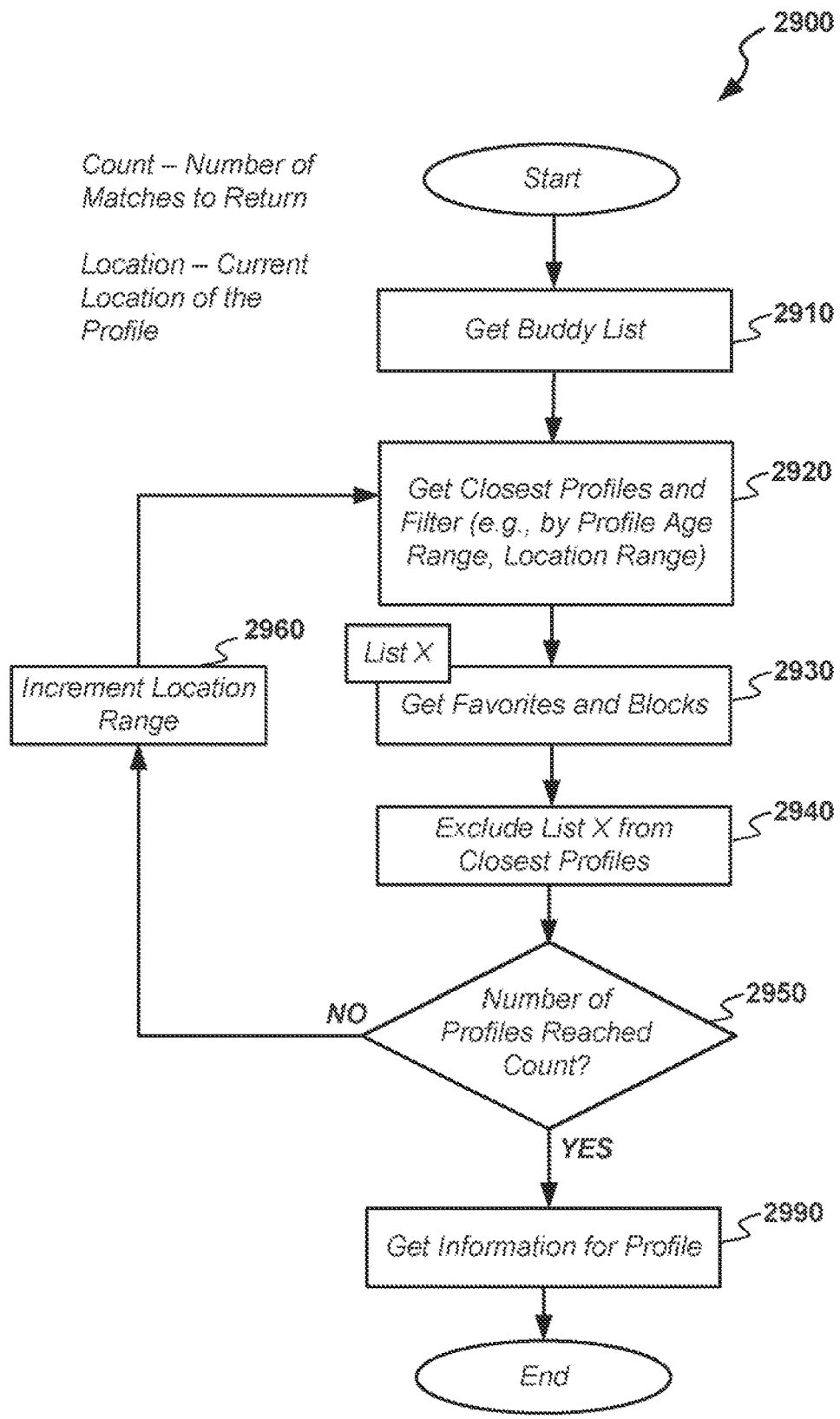
FIG. 29 illustrates details of an embodiment of a process for providing information associated with favorites in accordance with aspects of the present invention.

FIG. 29 is a flowchart of a process 2900 performed by the server system 120 in connection with providing information sufficient to enable a user device 142 to generate a cascade of thumbnail representations of other users of potential interest. As shown, the server 120 generates an initial buddy list in response to receipt of a request from a user device 142 (stage 2910). In one embodiment a set of closest profiles is then generated by filtering the initial buddy list based upon, for example, location range relative to a known position of the user device 142 and/or age range (stage 2920). Next, a "List X" of the user's favorites and blocks (i.e., other users which the user does not wish to appear in any user interface cascade) may then be compiled (stage 2930). The user profiles on the List X are then excluded from the set of closest profiles (stage 2940). If the number of profiles in the set of closest profiles has reached a predefined count (stage 2950), then information concerning the profiles is retrieved from the central data store 240 (stage 2990); otherwise, a filtering parameter such as, for example, location range is incremented or broadened (stage 2960) in order to increase the number profiles within the set of closest profiles produced by the filtering stage 2920. Stages 2930, 2940, 2950 and 2960 (to the extent necessary) are then repeated in the manner described above until the profile count condition (stage 2950) is satisfied.

In one embodiment the user device 142 sends location information to the host server system 120 at predefined intervals (e.g., every 7 minutes) unless a user of the device 142 has manually refreshed the cascade of thumbnail representations (and thereby restarted the applicable counter) during the preceding 7 minute period. In one embodiment information relating to the set of favorites associated with the user device are retrieved from the central data store 240 when retrieving the initial buddy list. Since in this embodiment thumbnail representation of such favorites are the first to be displayed in the cascade, such favorites information is provided to the user device 142 as part of the cascade information.

Figure 30:
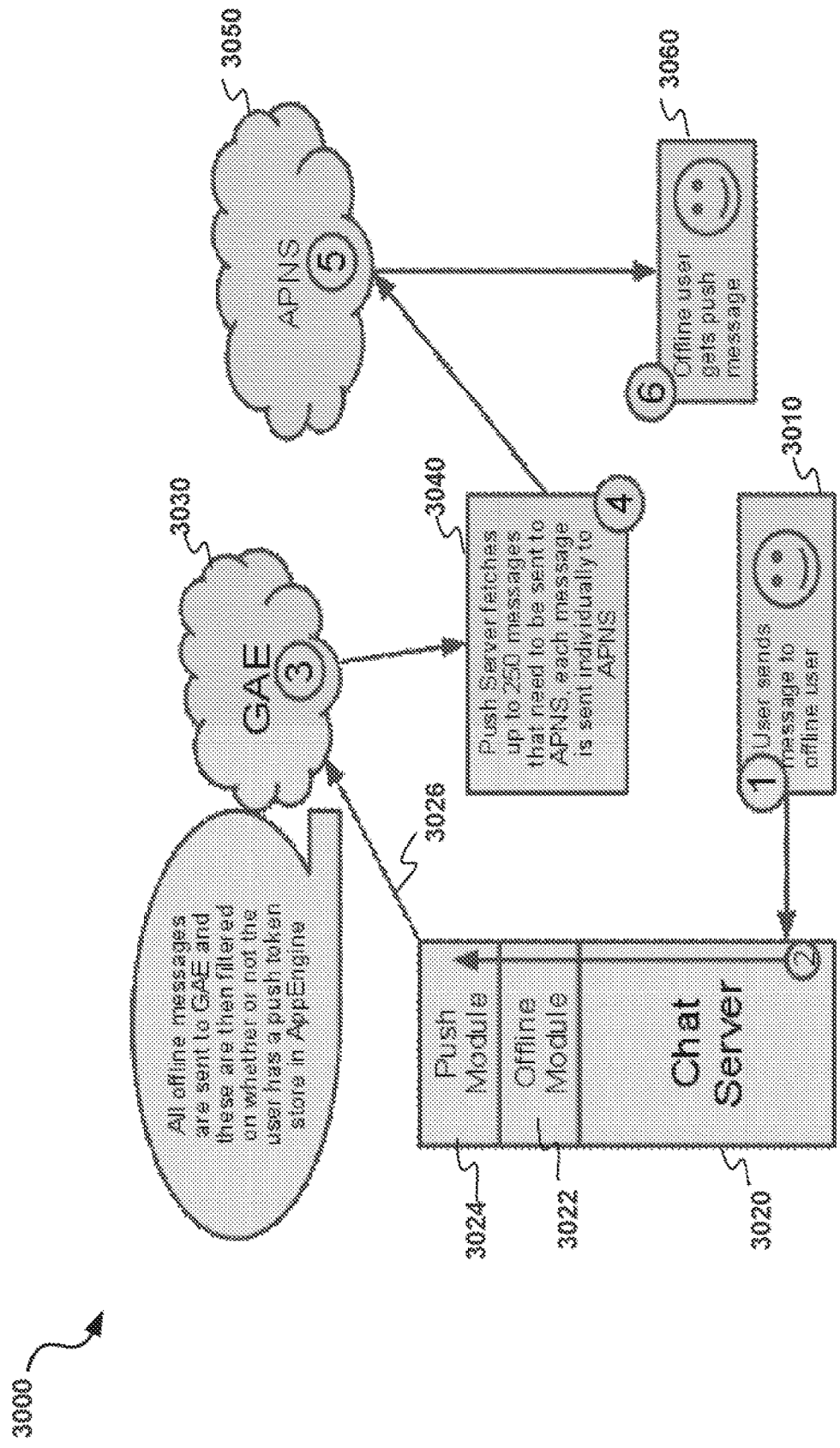
FIG. 30 illustrates an exemplary data flow associated with the central server system 120.

Attention is now directed to FIG. 30, which illustrates an exemplary data flow 3000 associated with the central server system 120. As shown, when a user device 142 sends a message to an offline user via the server system 120 (stage 3010), an offline message hook is processed by both an offline message module 3022 and an offline push module 3024 of a chat server 3020 executing within the server system 120. The processing results 3026 are sent from the chat server 3020 to an application engine (App-Engine 3030) hosted by the server system 120. The App-Engine 3030 discards messages having a recipient ID not matching a user having an APNS token stored in the datastore 240. In a stage 3040, a push daemon running in an EC2 instance fetches batches of messages to be pushed (e.g., up to 250 messages). In one embodiment each of the messages to be pushed comes with, for example, an Apple Push Notification Service ("APNS") token or the equivalent. Although certain embodiments described herein contemplate use of the APNS, it should be understood that those skilled in the art will be aware of other techniques for providing push services.

Referring again to FIG. 30, the messages are then constructed into a push stream and individually sent to, for example, the Apple Push Notification Service (stage 3050). Next, the Apple Push Notification Service relays each message to a user of the Apple Push Notification Service ("APNS") (stage 3060).

The APNS uses push technology through a constantly-open IP connection to forward notifications from third party application providers to Apple devices such as, for example, the iPhone, iPod Touch and iPad. Each device establishes an encrypted IP connection with the APNS and receives notifications over the persistent connection. If a notification for an application arrives when that application is not running, the device alerts the user that the application has data waiting for it.

The APNS also provides store-and-forward capabilities. Specifically, if the APNS attempts to deliver a notification but the target device is offline, the notification is stored (only one notification per application on a device is typically stored). When the offline device later connects to the network, the stored notification is forwarded to the device.

Each provider composes a notification package that includes the device token for a client application and the payload. The provider sends the notification to the APNS, which in turn pushes the notification to a device. The device token contains information that enables the APNS to locate the device on which the client application is installed.

Figure 31:
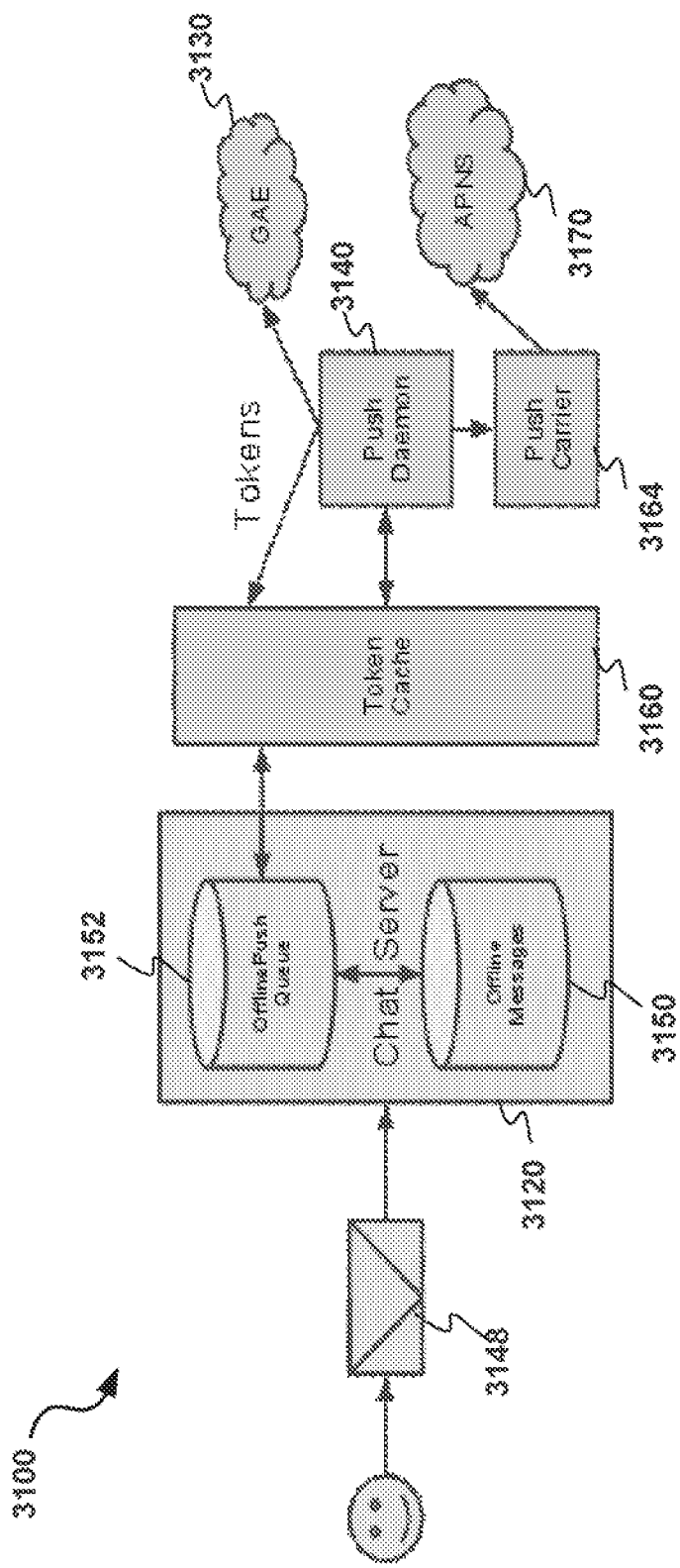
FIG. 31 illustrates an alternative push notification process in accordance with the invention.

Turning now to FIG. 31, there is illustrated an alternative push notification process 3100 in accordance with the invention. In particular, in the approach of FIG. 31 a message queue is created within a chat server 3120. In particular, offline messages 3122 are all immediately sent to an App-Engine 3130. However, the efficacy of this process may be limited by the performance of the App-Engine 3130, any delay in posting, and any problems associated with the offline thread responsible for pushing these messages to the App-Engine 3130.

Accordingly, in one embodiment a buffer is created in the database for the chat server 3120. Each time a new offline message 3148 is received and stored in the chat server 3120 (stage 3150), a copy of that message is also stored in the offline push queue 3152. In addition, a push daemon 3140 is modified to perform processing in three stages. In a first stage, a user database within the central data store 240 is modified to include a column that stores the APNS token corresponding to each device application. In one embodiment the push daemon 3140 is constantly searching for users missing tokens, and fetches them in batches from the appropriate column of the user database.

In a second stage, the push daemon 3140 fetches a batch of messages and obtains the user's token information for each such message. In one embodiment these tokens are stored in the token cache 3160 for a predetermined amount of time (e.g., 1 hour), at which point the push daemon 3140 sends the messages out to the push carrier 3164 in anticipation of a third stage of the process. Meanwhile a fetcher module within the push daemon 3140 continues to store APNS tokens. If a message for a particular user is stored within the offline push queue 3152 for greater than a predefined time period and has not been pushed out (due to the unavailability of a token for the user device application), the now-expired message is then discarded. In this way the push queue is pruned of old messages no longer needing to be pushed. In one embodiment a check is performed to determine if a message is delivered (i.e., an offline message is retrieved) before it is pushed; if so, the message is deleted in order to prune the queue 3152 of unwanted pushes.

In a third stage, messages are handed off by the push carrier 3164 to the APNS 3170, and control over the delivery of such messages to the appropriate device application is ceded to the APNS.

Figure 32:
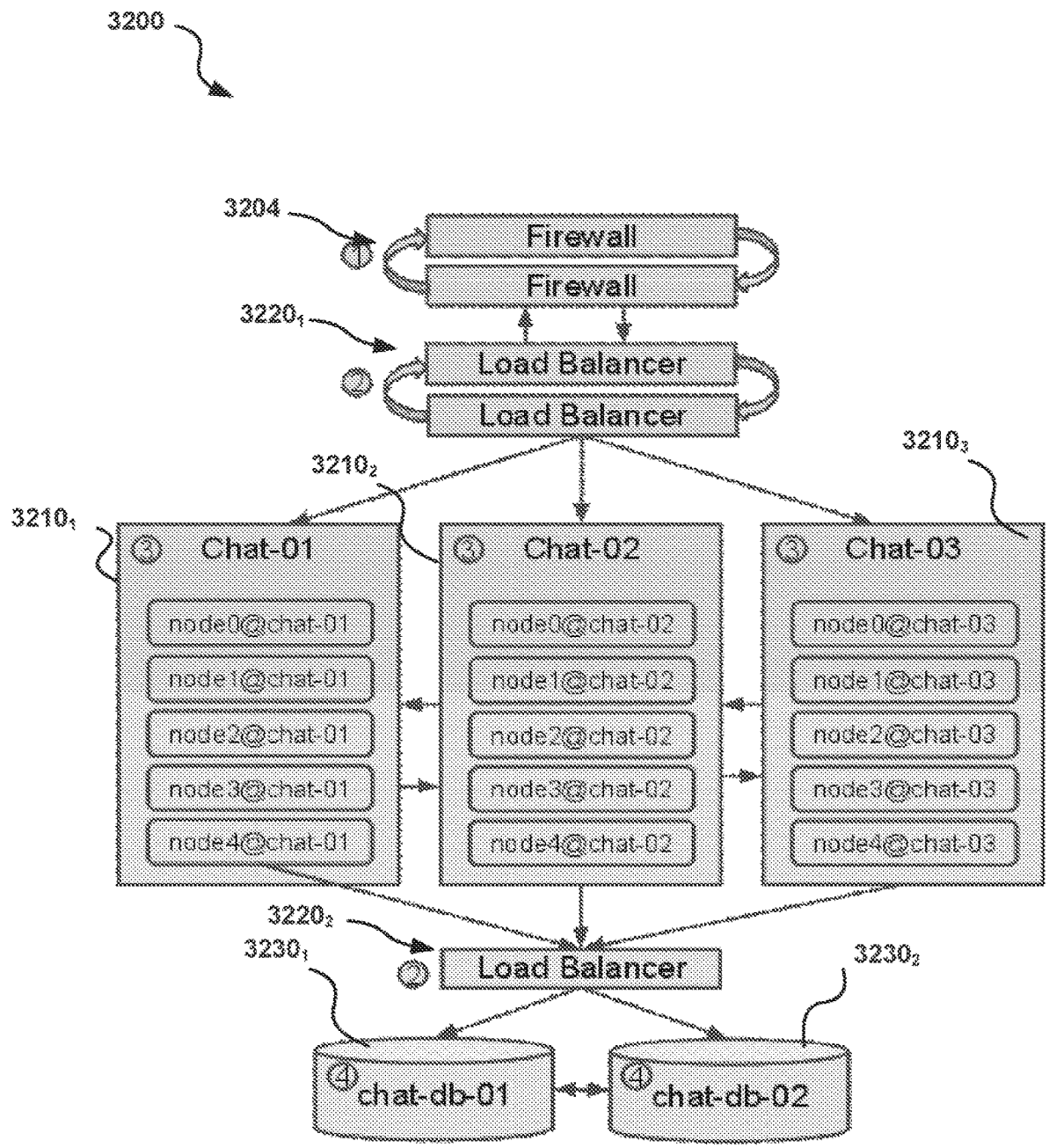
FIG. 32 illustrates a cluster arrangement of chat servers disposed in the host server system 120.

Attention is now directed to FIG. 32, which illustrates a cluster arrangement 3200 of chat servers 3210 disposed in the host server system 120. In one embodiment the highly available chat cluster tier 3200 comprises an ejabberd 2.0.5 implementation of a cluster including a load balancing tier 3220. The load balancing tier 3220 is designed to spread out the load in multiple parallel installations in the same server using native mnesia replication.

The cluster arrangement 3200 includes a firewall tier 3204 configured to handle all connections to and from user devices 142, as well as to handle network address translation and security, packet filtering, and similar functions.

As mentioned above, the load balancing tier 3220 is responsible for distributing the connections to any active chat servers 3210. The load balancer front end 3220 also distributes the database connections that are being requested from the chat servers to database servers 3230. In one embodiment the same set of devices within the load balancing tier 3220 effect load balancing with respect to both the pool of chat servers 3210 and the pool of database servers 3230.

In one embodiment a password service is provided by customizing the ejabberd via a python web-service that exposes the user's password based on a right request of the username. Every request that comes in through the API merits the API to check and fetch the latest chat password to serve it to the user.

This service checks to see if there is an entry for the user and, if so, the service serves the entry back to the API. In the case in which the user entry is not in the chat server database 3230, the user gets created and the service returns the password within the same request.

Figure 33:
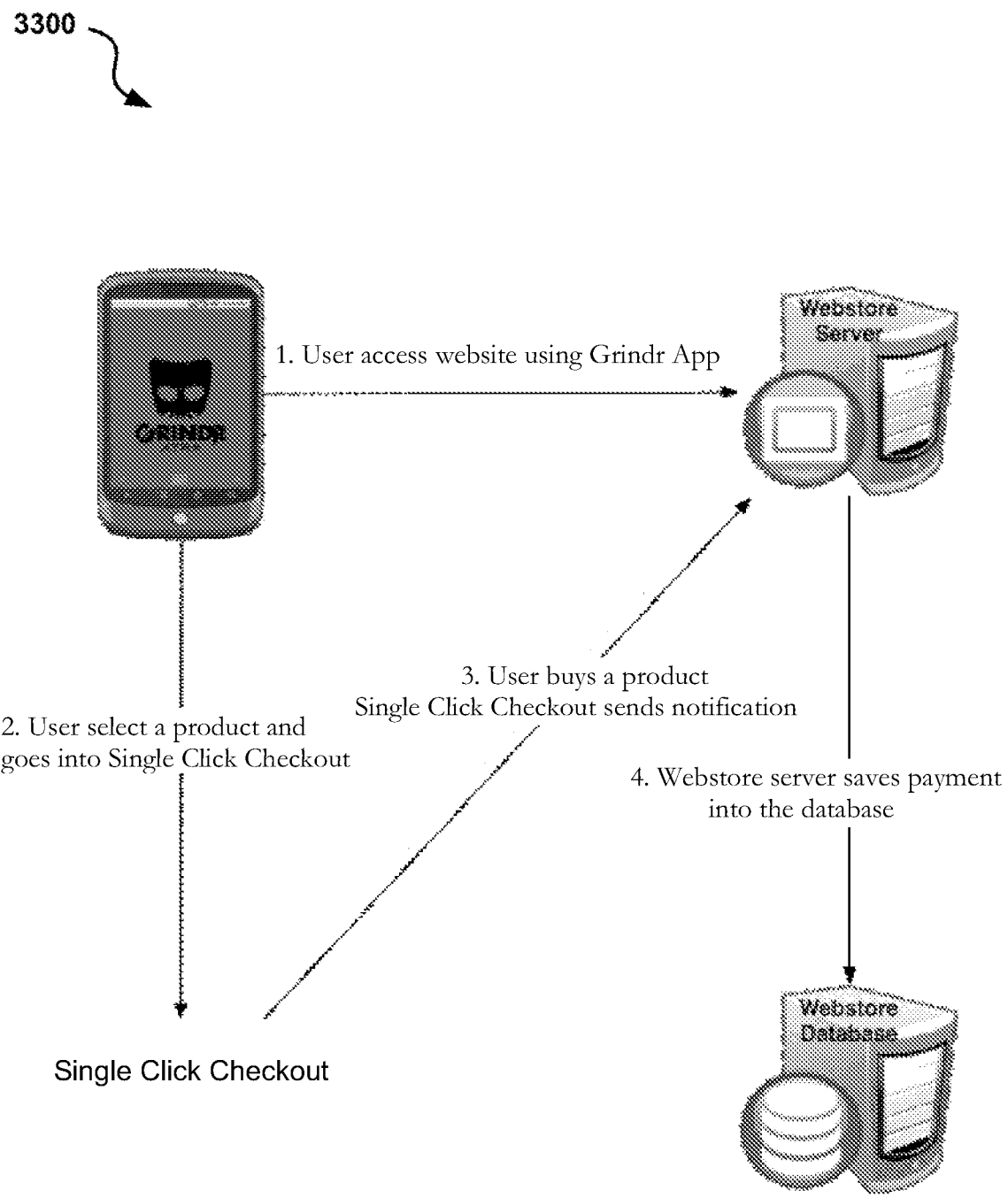
FIG. 33 shows a diagrammatic representation of the various entities associated with an exemplary webstore data flow.

Turning now to FIG. 33, there is shown a diagrammatic representation of the various entities associated with an exemplary webstore data flow associated with, for example, Android and Blackberry devices.

Figure 34:
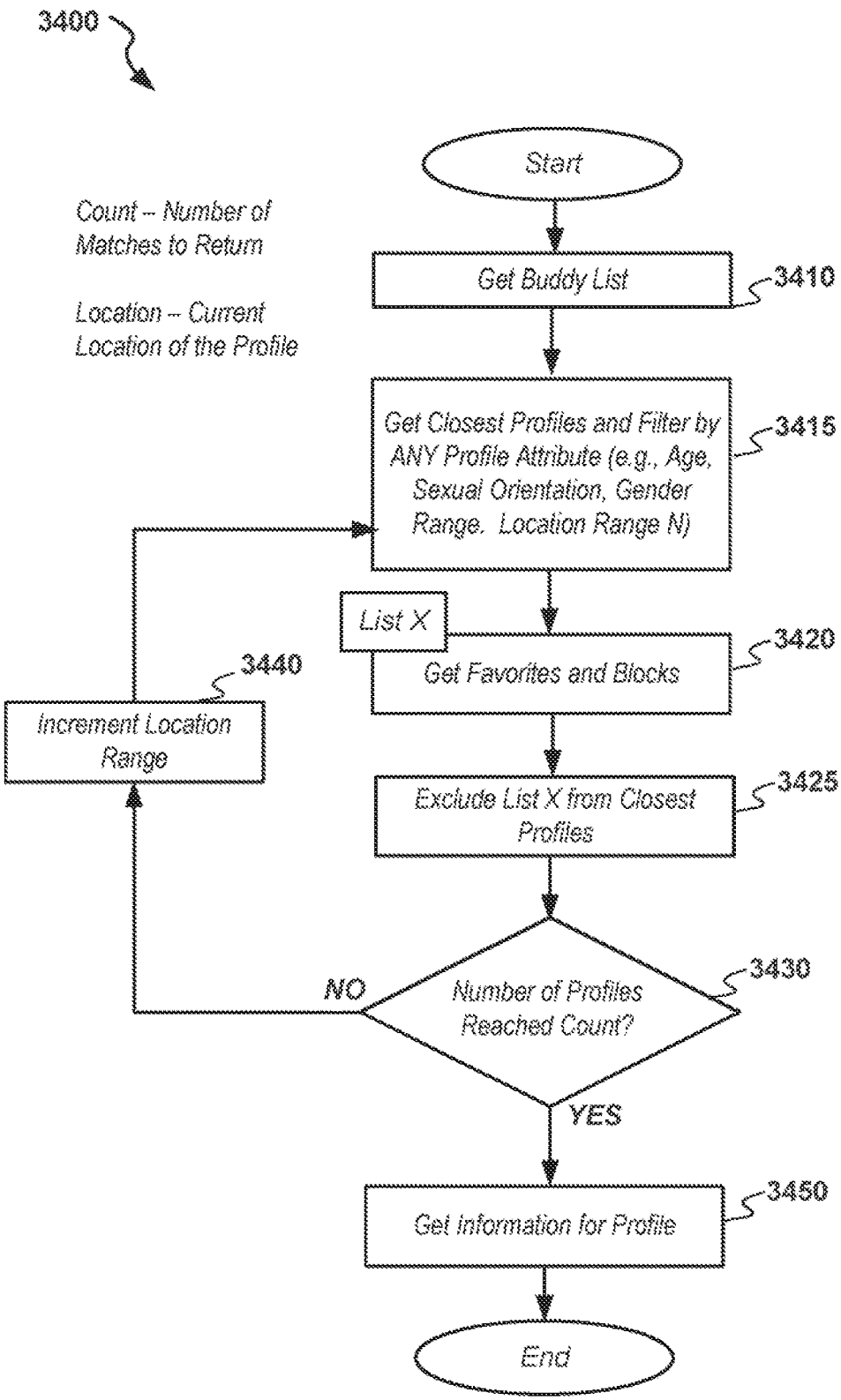
FIG. 34 illustrates details of an embodiment of a process for providing information associated with location in accordance with aspects of the present invention.

FIG. 34 is a flowchart of a process 3400 performed by the server system 120 in connection with providing information sufficient to enable a user device 142 to generate a cascade of thumbnail representations of other users of potential interest. As may be appreciated with reference to FIGS. 29 and 34, the process 3400 is similar to the process 2900 but differing filtering criteria may be employed in the process 3400.

As shown in FIG. 34, the server 120 generates an initial buddy list in response to receipt of a request from a user device 142 (stage 3410). In one embodiment a set of closest profiles is then generated by filtering the initial buddy list based upon any selected profile attribute including, for example, location range relative to a known position of the user device 142, sexual orientation, gender and/or age range (stage 3415). Next, a "List X" of the user's favorites and blocks (i.e., other users which the user does not wish to appear in any user interface cascade) may then be compiled (stage 3420). The user profiles on the List X are then excluded from the set of closest profiles (stage 3425). If the number of profiles in the set of closest profiles has reached a predefined count (stage 3430), then information concerning the profiles is retrieved from the central data store 240 (stage 3450); otherwise, a filtering parameter such as, for example, location range is incremented or broadened (stage 3440) in order to increase the number profiles within the set of closest profiles produced by the filtering stage 3415. Stages 3420, 3425, 3430 and 3440 (to the extent necessary) are then repeated in the manner described above until the profile count condition (stage 3430) is satisfied.

Figure 35:
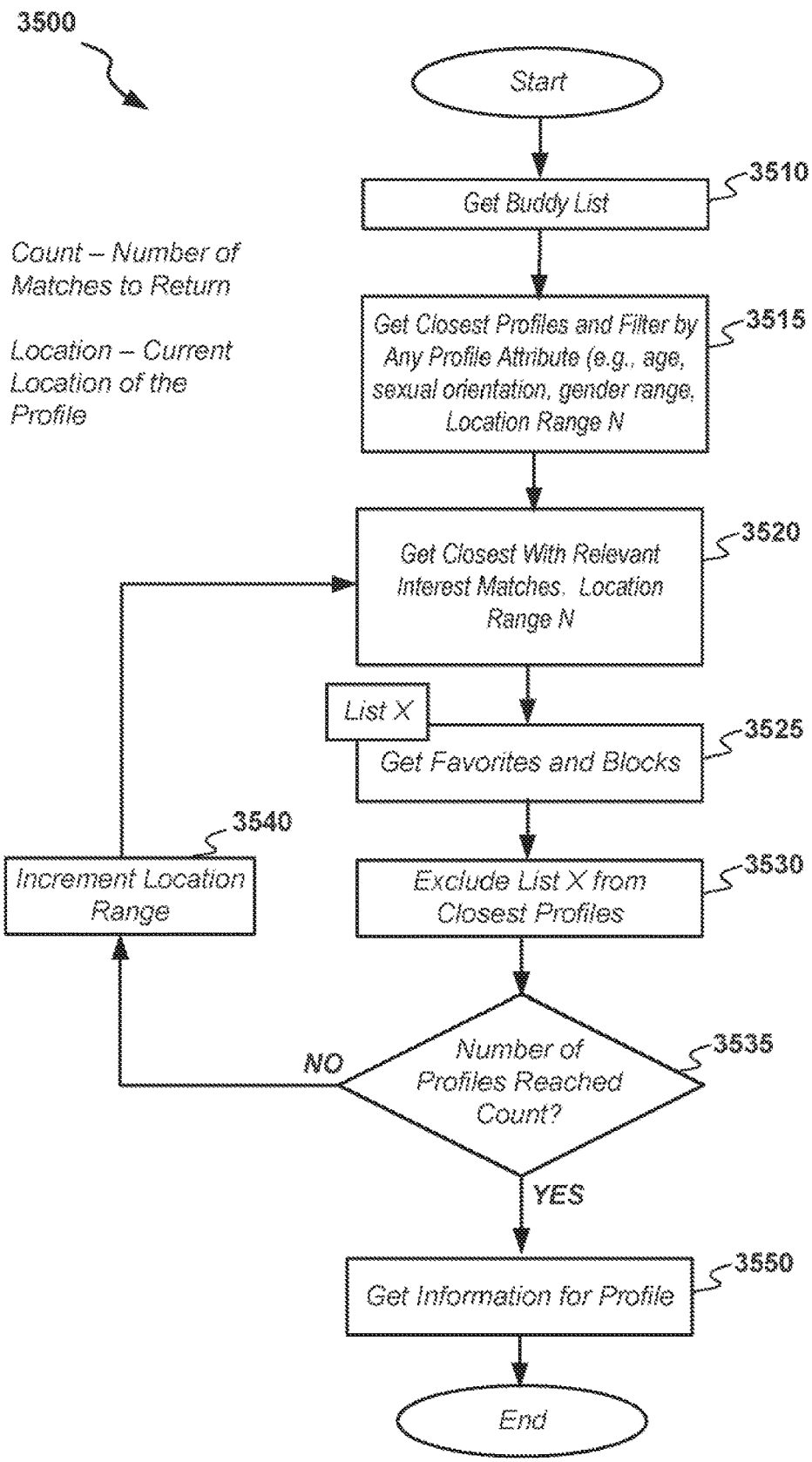
FIG. 35 illustrates details of an embodiment of a process for providing information associated with location and favorites in accordance with aspects of the present invention.

Attention is now directed to FIG. 35, which is a flowchart of a process 3500 performed by the server system 120 in connection with providing information sufficient to enable a user device 142 to generate an interests-based cascade of thumbnail representations of other users. As shown in FIG. 35, the server 120 generates an initial buddy list in response to receipt of a request from a user device 142 (stage 3510). In one embodiment a set of closest profiles is then generated by filtering the initial buddy list based upon any selected profile attribute including, for example, location range relative to a known position of the user device 142, sexual orientation, gender and/or age range (stage 3515). The set of closest profiles is then filtered based upon, for example, relevant interests and location in order to obtain a filtered set of closest profiles (stage 3520). Next, a "List X" of the user's favorites and blocks (i.e., other users which the user does not wish to appear in any user interface cascade) may then be compiled (stage 3525). The user profiles on the List X are then excluded from the filtered set of closest profiles (stage 3530). If the number of profiles in the filtered set of closest profiles has reached a predefined count (stage 3535), then information concerning the profiles is retrieved from the central data store 240 (stage 3550); otherwise, a filtering parameter such as, for example, location range is incremented or broadened (stage 3540) in order to increase the number profiles within the set of closest profiles produced by the filtering stage 3520. Stages 3520, 3525, 3530 and 3535 (to the extent necessary) are then repeated in the manner described above until the profile count condition (stage 3535) is satisfied.

Figure 36:
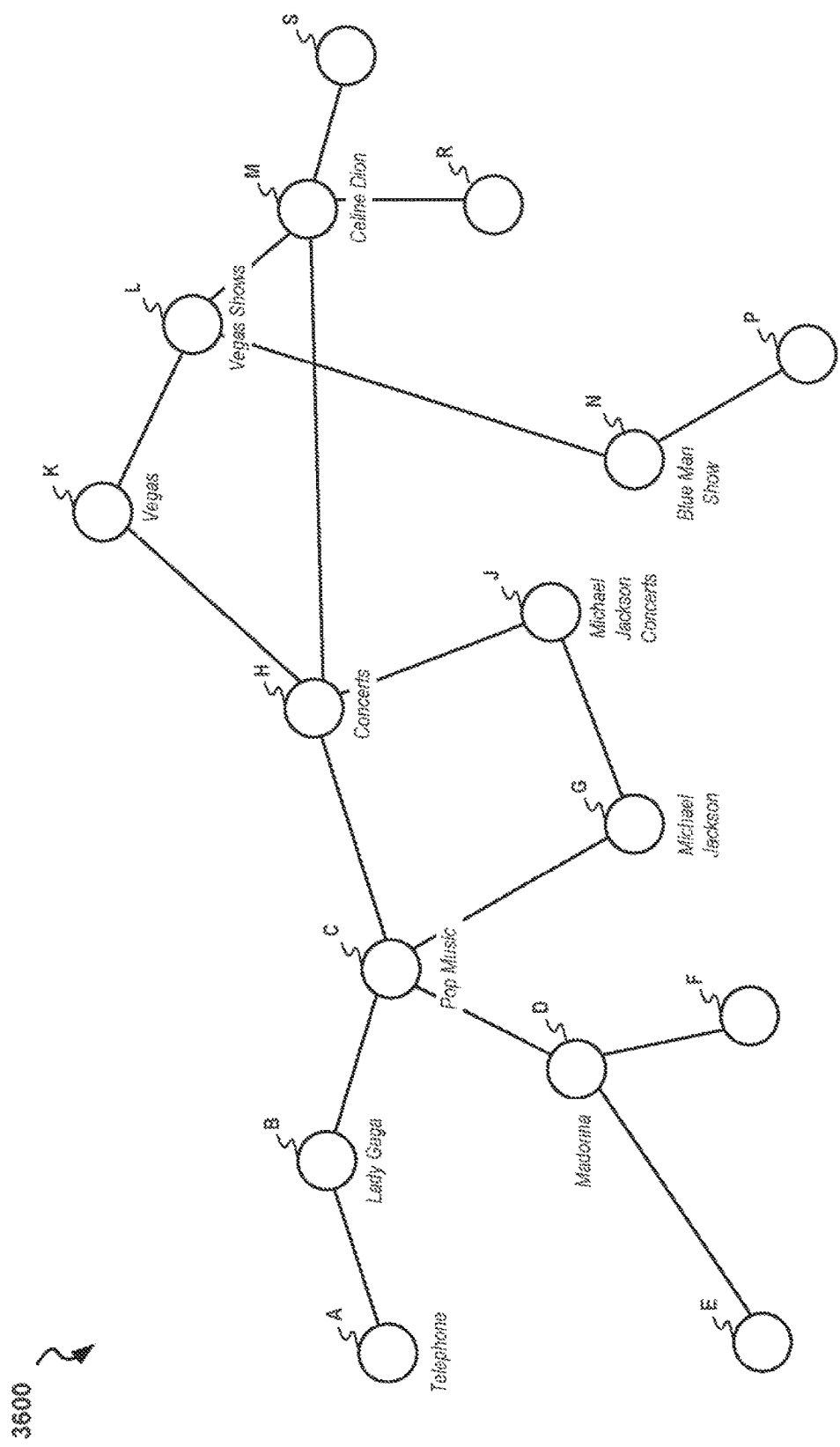
FIG. 36 illustrates details of an example relationship network based on interests in accordance with aspects of the present invention;]

Turning now to FIG. 36, there is shown an exemplary network of data stores and potential relationships therebetween.

Figure 37:
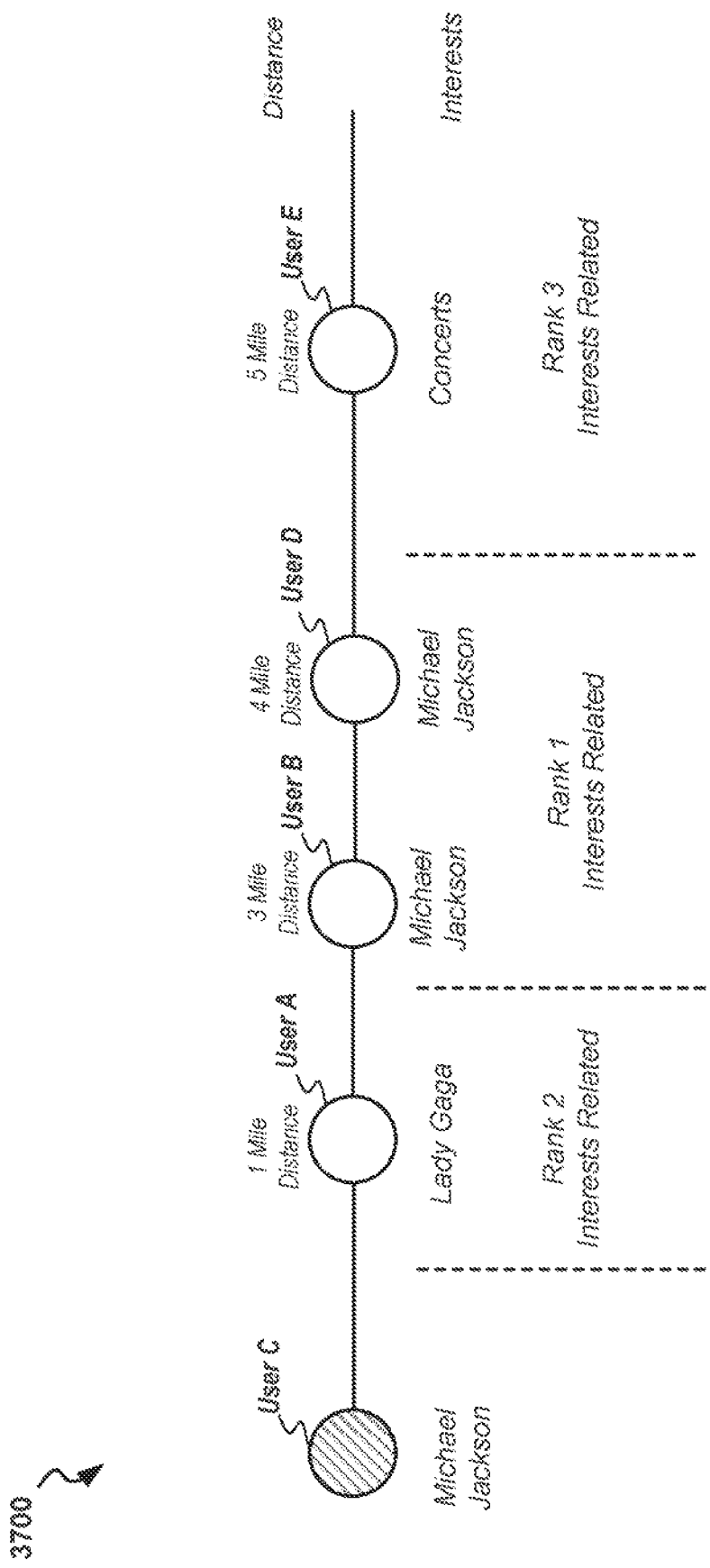
FIG. 37 illustrates details of an example relationship determination based on distance that may be used for cascading displays in accordance with aspects of the present invention.

Attention is now directed to FIG. 37, which illustrates generation of a ranked cascade of other system users ("Users") in relationship to a searching system user (i.e., "User C") based primarily upon a distance between the User C and each of the other Users. As shown in FIG. 37, User B and User D share an interest in "Michael Jackson" with User C and thus are classified in a "Rank 1" classification based upon such shared interests and the distance of each from User C. As shown, User A is located substantially closer to User C than is User E, and thus User A is deemed to be included in a "Rank 2" classification while User E is included in a Rank 3 classification (notwithstanding the similarity in the interests of both User A and User E).

Figure 38:
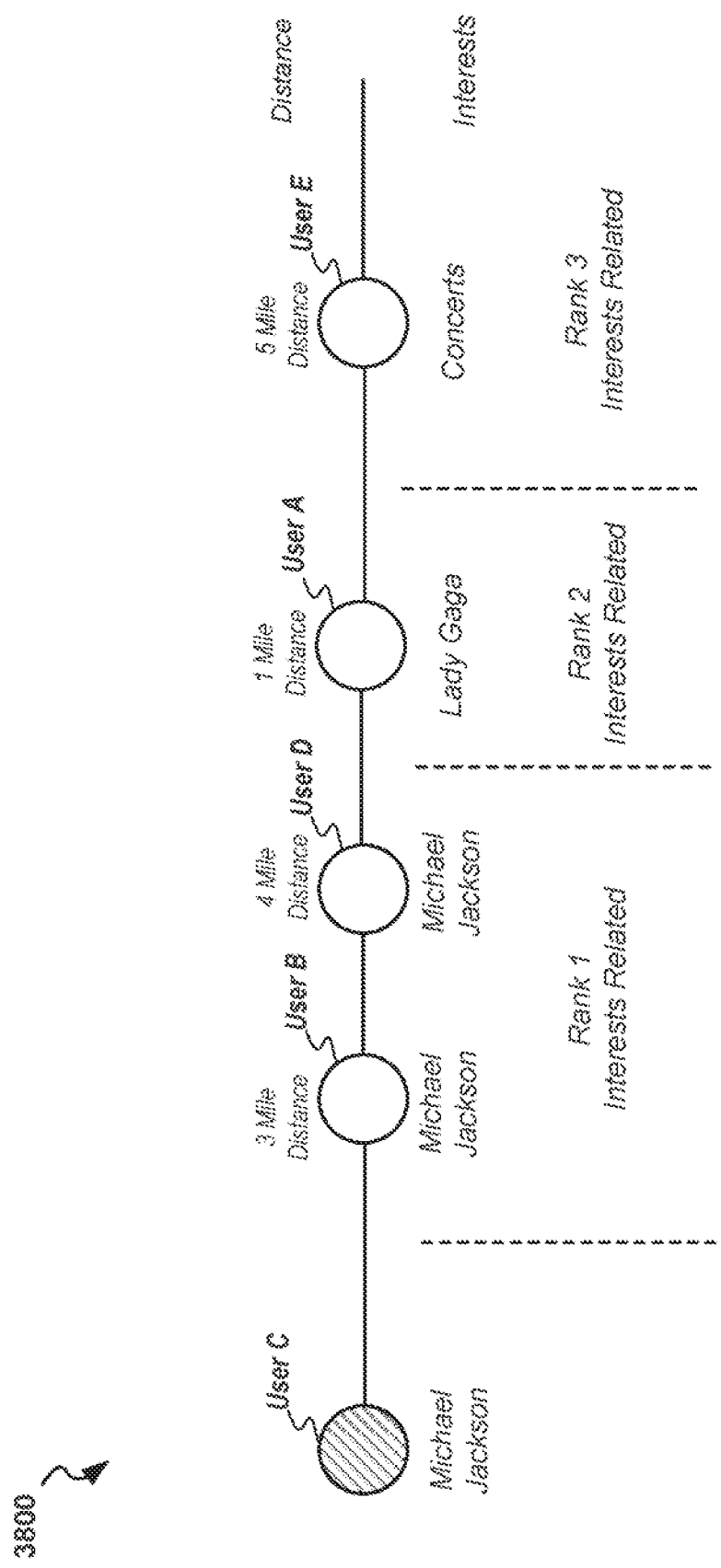
FIG. 38 illustrates details of an example relationship determination based on interests that may be used for generating cascaded displays in accordance with aspects of the present invention.

FIG. 38 illustrates creation of a ranked cascade of Users in relation to the User C based primarily upon the similarity in interests between User C and the other Users. As shown, Users B and D share the interest of User C in Michael Jackson and are classified in "Rank 1" notwithstanding the relatively large distances between User C and Users B and D. Conversely, User A is relatively closer to User C but does not have interests as closely aligned to the interests of User C as do Users B and D; accordingly, User A is classified in "Rank 2".

Figure 39:
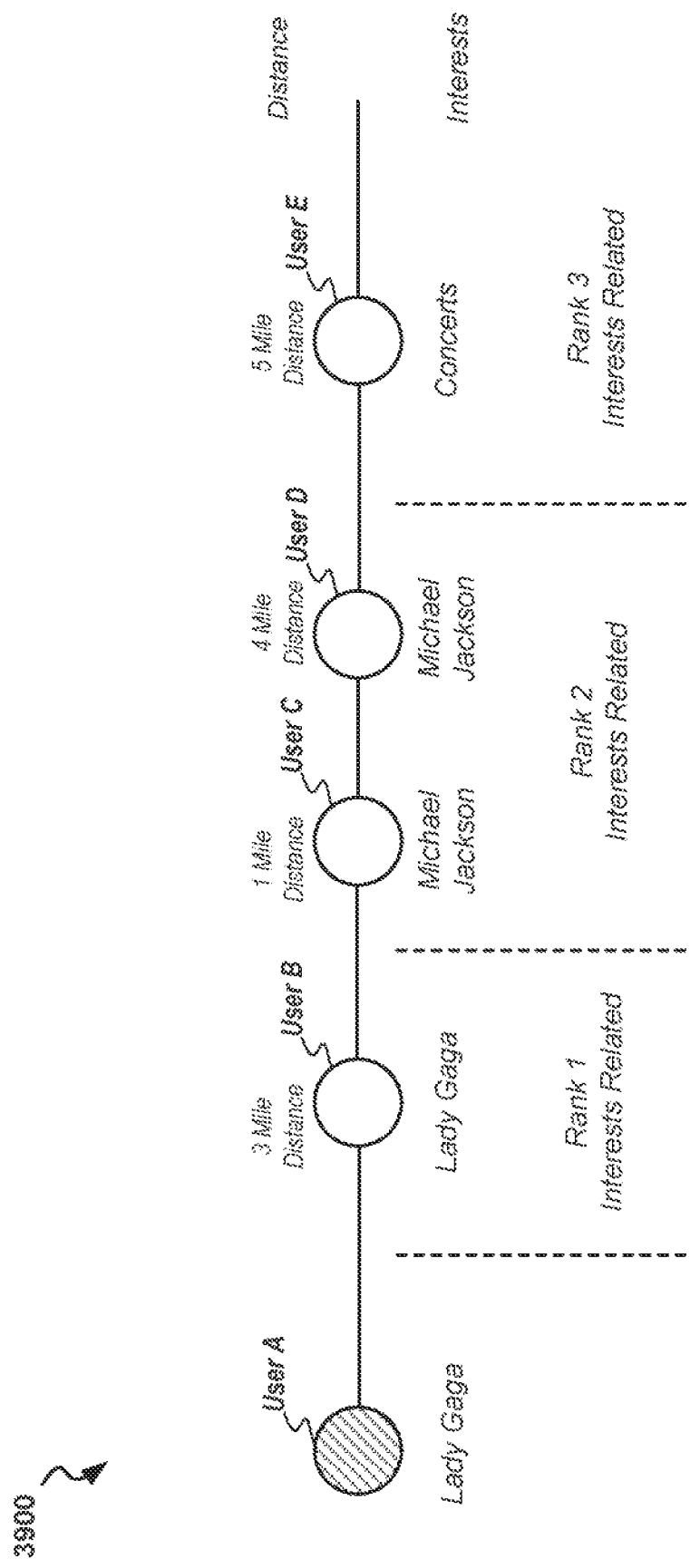
FIG. 39 illustrates details of an example relationship determination based on distance and interests that may be used for generating cascaded displays in accordance with aspects of the present invention.

Turning now to FIG. 39, which illustratively represents cascade generation as a function of distance and interests. In one embodiment a User is able to effect geolocation searches with respect to presumed interests. For example, if a User searches for "Lady Gaga", the other Users deemed most relevant will be located relatively close the searching User and will have at least some similarity in interests. This is reflected by FIG. 39, in which User B was classified in "Rank 1" relative to User A in view of their identical interest in Lady Gaga and since User B was located within 3 miles of User A (i.e., was closer to User B than all other Users except User C).

In addition to enabling a user of a device 142 to search for other system users having similar interests which may be nearby, in one embodiment the system 100 permits users to set various location preferences and receive push notifications when certain specific requirements have been satisfied. For example, a particular user could request to receive a push notification from the server 120 when another user which likes Indian food is within 100 meters of the particular user. Such preferences may be specified in, for example, user profiles maintained within the central data store 240.

Figure 40:
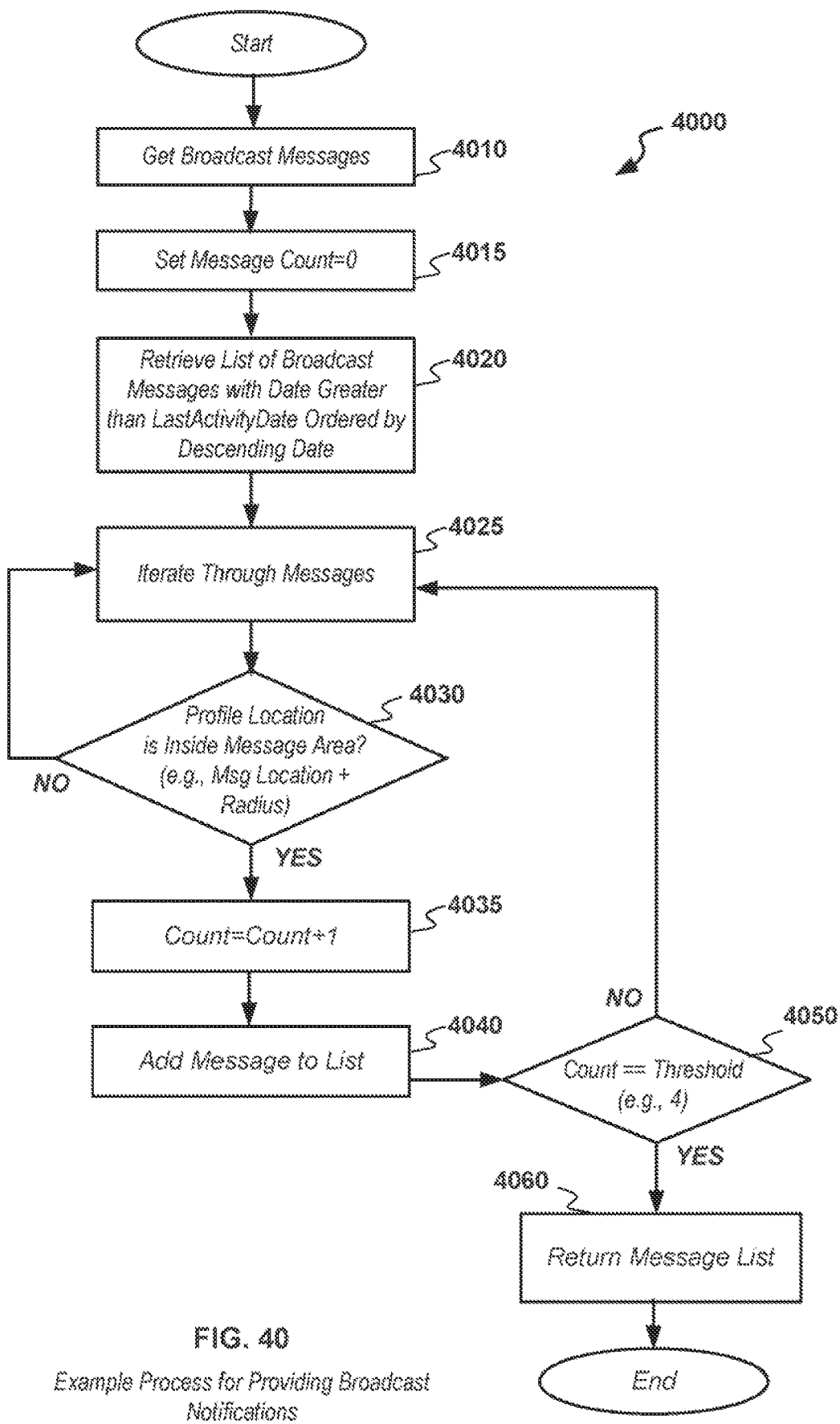
FIG. 40 illustrates details of an embodiment of a process for providing broadcast notifications in accordance with aspects of the present invention.

Referring now to FIG. 40, there is illustrated a flowchart depicting a process 400 effected by the server 120 for providing location-based broadcast message notifications to user devices 1142. As shown, broadcast messages are retrieved in a stage 4010. A message count is then set to 0 (stage 4015). Next, a list, ordered by descending date, of Broadcast Messages having a Date Greater than a LastActivityDate are retrieved (stage 4020). In a stage 4025, the server 120 iterates through the messages. With respect to each message, it is determined whether a profile location associated with a user device 142 is within a message area (stage 4030). If yes, the existing count is incremented by one (stage 4035); if no, processing returns to stage 4024. After the count has been incremented (stage 4035), the message is added to the list of Broadcast Messages (stage 4040). If the count is equal to a threshold value (stage 4050), then the message list is returned (stage 4060); otherwise, processing returns to stage 4025.

Figure 41:
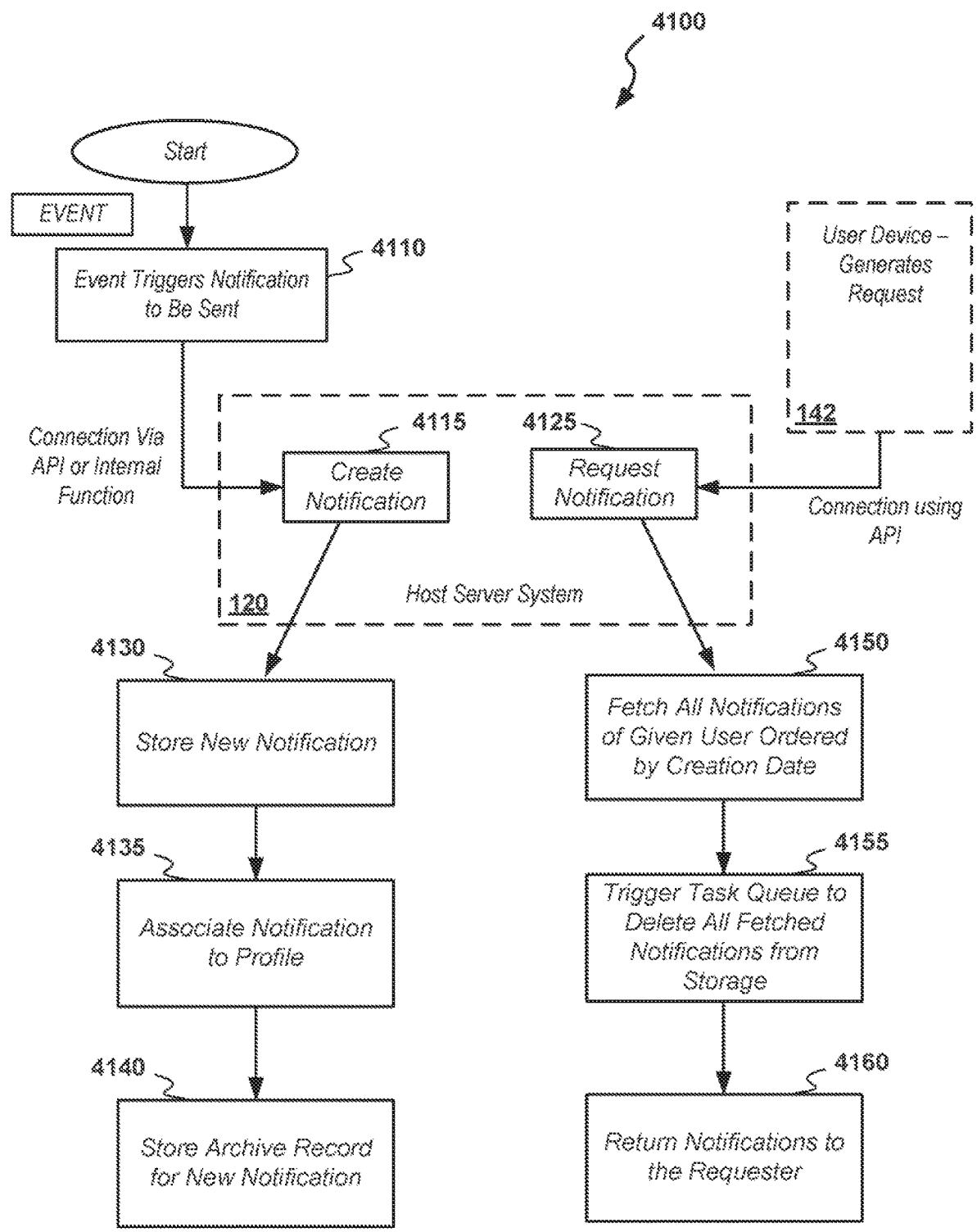
FIG. 41 illustrates details of an embodiment of a process for providing notifications in accordance with aspects of the present invention.

Turning now to FIG. 41, a flowchart representative of a process 4100 performed by the server system 120 in order to create and provide notifications to specific user devices 142. Notifications provide indications to users of a devices 142 that a specific event has occurred. Each notification may include information relating to a title, a message body, a source and a notification type. In one embodiment, a user device 142 requests all pending notifications for such device each time the application 288 is launched and the user of device 142 logs in.

Referring to FIG. 41, the process 4100 for sending a notification may be triggered in response to the occurrence of an event (stage 4110). In response to such occurrence, a notification is created (stage 4115) within the host server system 120. The new notification is stored (stage 4130) and associated with a notification profile (stage 4135). An archive record for the new notification is then stored (stage 4140).

As shown in FIG. 41, the process 4100 for sending a notification may be triggered by a user device 142 generating a request (stage 4110). In response, the server 120 generates a request notification (stage 4125). This causes all notifications for such user device 142 to be fetched as a function of creation date (stage 4150). Next, a task queue is triggered to delete all fetched notifications from storage (stage 4155). These notifications are then returned to the requesting user device 142.

FIG. 42 depicts a pair of exemplary notification data structures. In particular, FIG. 42 shows a data structure 4210 for a notification and a data structure 4220 for an archive notification.

Figure 43:
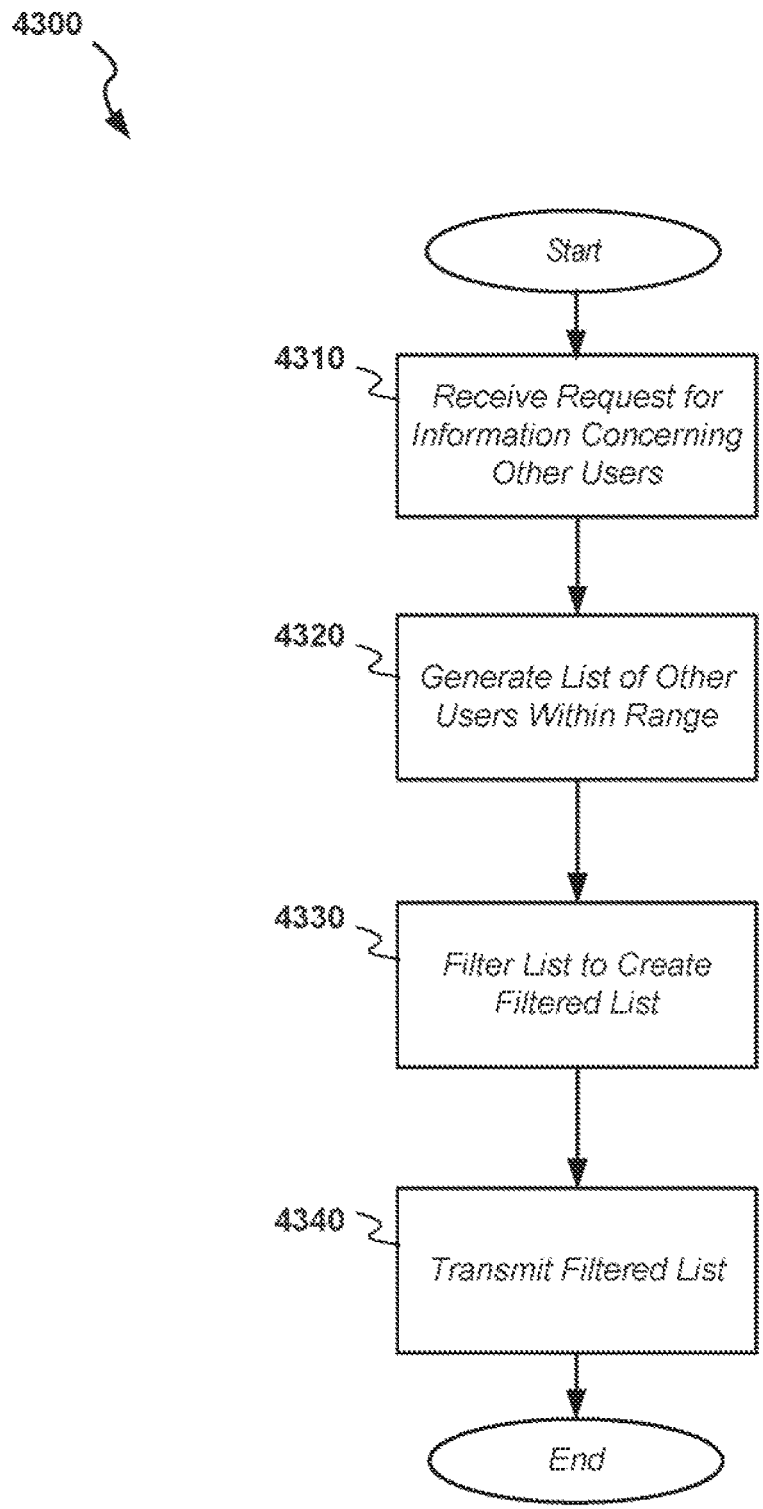
FIG. 43 illustrates details of an embodiment of a process for providing location based interaction at a host server system in accordance with aspects of the present invention.

Attention is now directed to FIG. 43, which illustrates an exemplary server-based process 4300 for providing location-based interaction. In a stage 4310, a request is received at the server 120 for information concerning other users. A list of other users within range of the requesting user is then generated (stage 4320). At stage 4330, the list is filtered to create a filtered list of users. The filtered list may then be transmitted by the server 120 to a requesting user device 142 (stage 4340).

Figure 44:
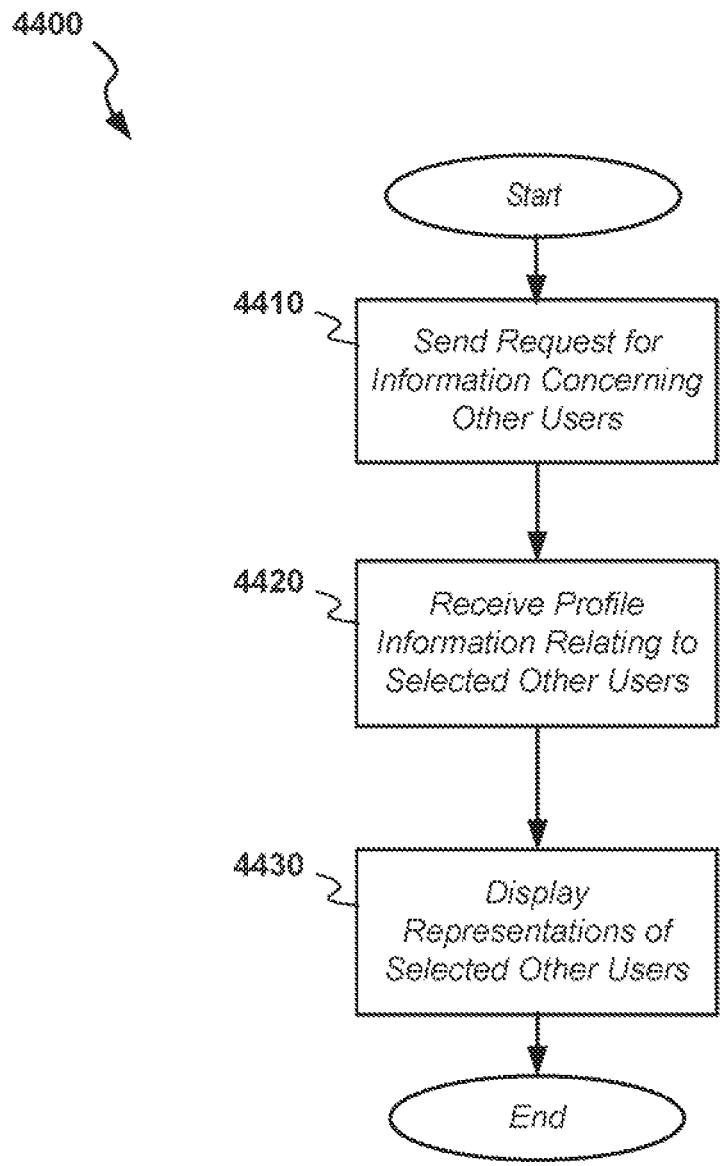
FIG. 44 illustrates details of an embodiment of a process for providing location based interaction at a client device in accordance with aspects of the present invention.

Turning now to FIG. 44, there is shown an exemplary process 4400 for providing location-based interaction from a client application. The process 4400 is initiated by sending, from a user device executing the client application, a request for information concerning other users (stage 4410). In a stage 4420, profile information relating to selected other users is received. A cascade of representations of the selected other users is then displayed on the user device 142 (stage 4430).

Figure 45:
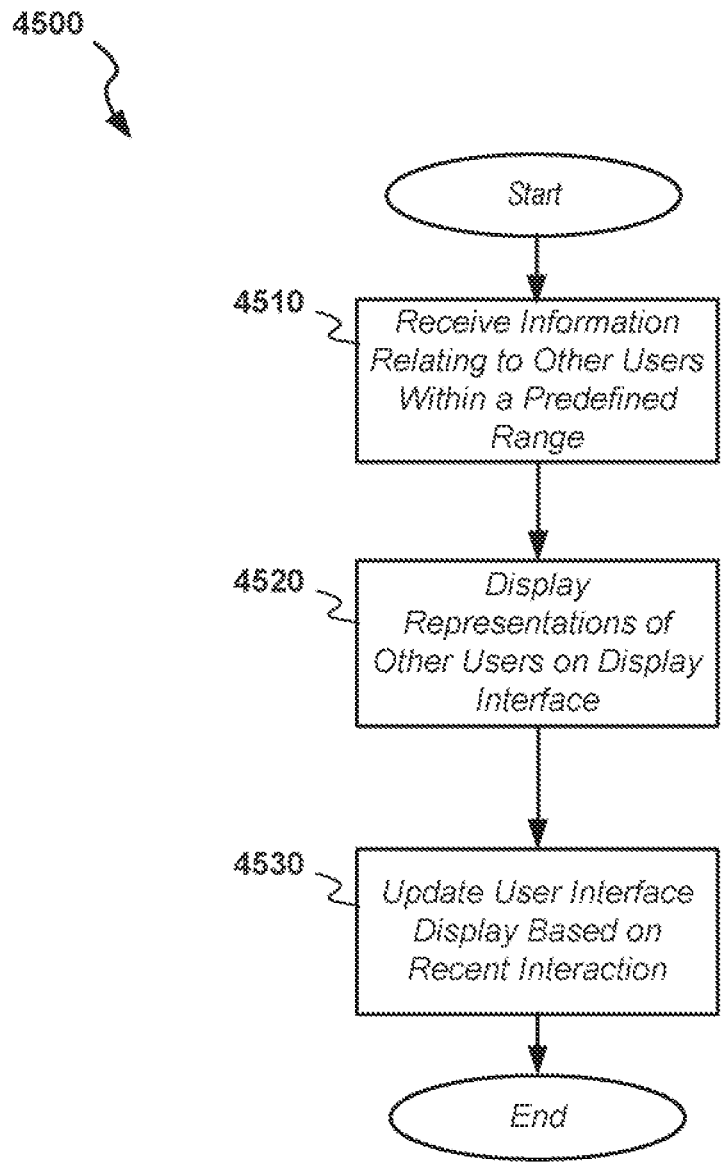
FIG. 45 illustrates details of an embodiment of a process for providing location based interaction from a client application based on recent interaction with other users.

FIG. 45 illustrates an exemplary process 4500 for providing location-based interaction from a client application based on recent interaction. The process 4500 is initiated upon receiving information relating to other users within a predefined range of a user device 142 executing the client application (stage 4510). Representations of the other users are then displayed on the user interface of the user device 142 (stage 4520). The user interface is then updated based upon recent interaction (stage 4530)

Figure 46:
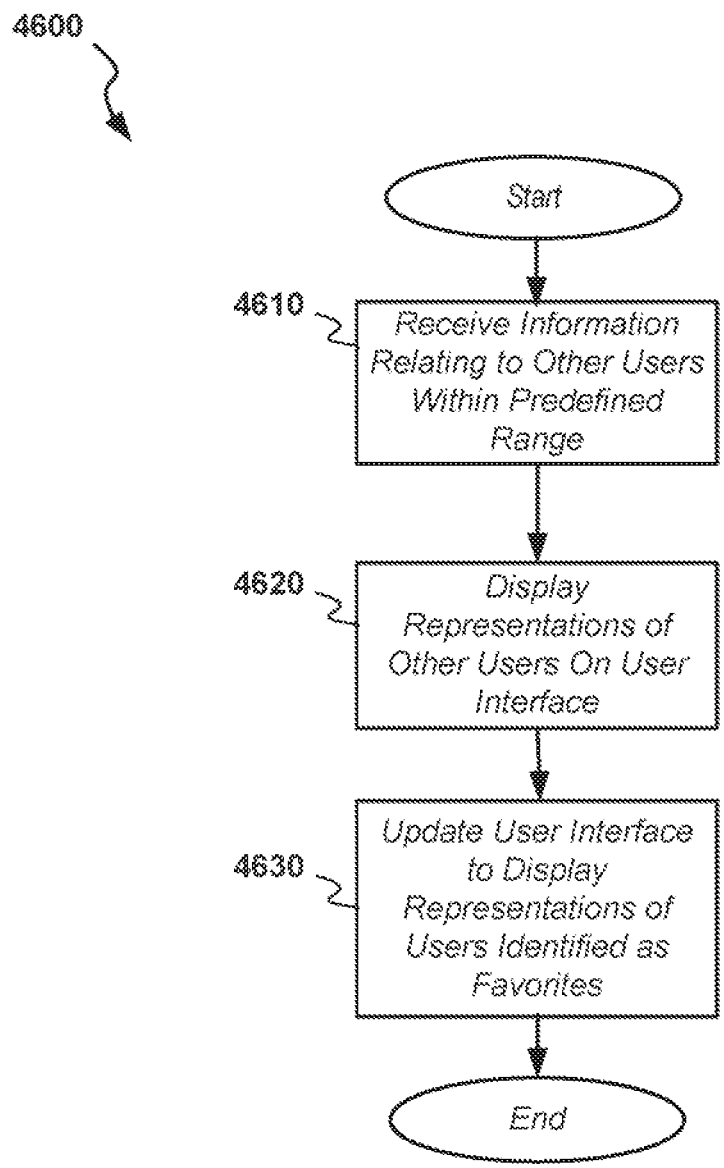
FIG. 46 illustrates details of an embodiment of a process for providing location based interaction from a client application based on favorites in accordance with aspects of the present invention.

Attention is now directed to FIG. 46, which illustrates an exemplary process 4600 for providing location-based interaction from a client application based upon favorites. At stage 4610, information relating to other users within a predefined range of a user device executing the client application is received at the user device. Representations of the other users are then displayed on the user interface of the user device 142 (stage 4630). The user interface is then updated to display representations of users identified as favorites (stage 4630).

Figure 47:
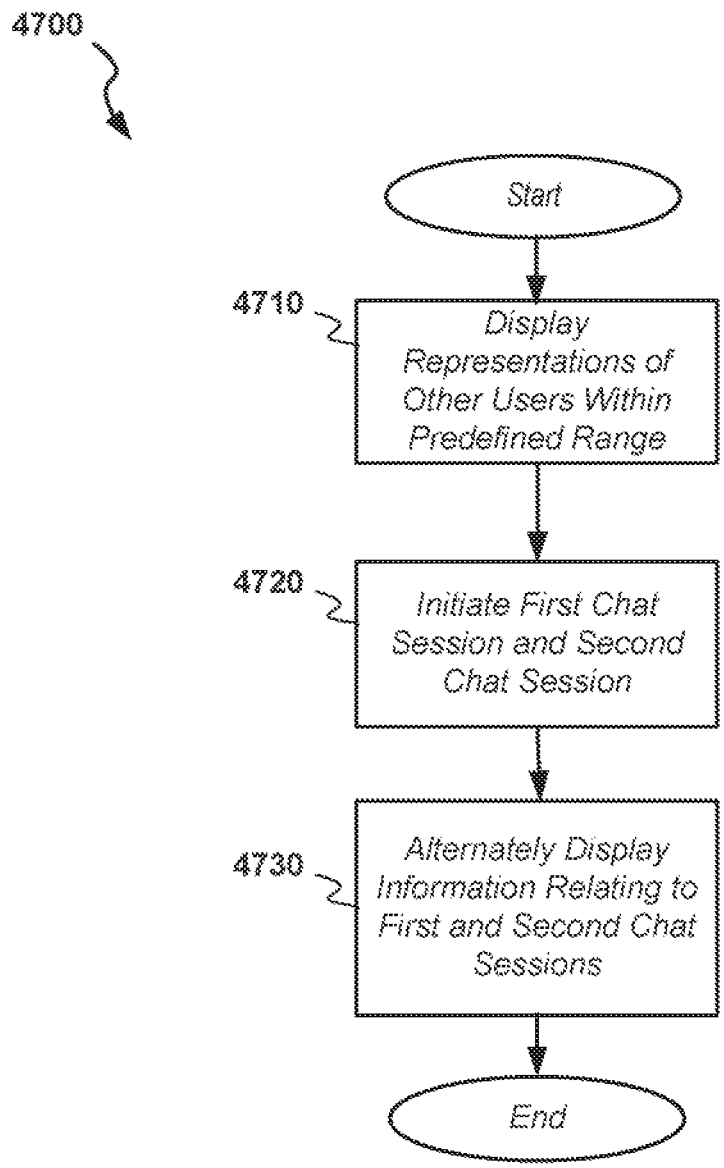
FIG. 47 illustrates details of an embodiment of a process for providing location based interaction from a client application based on favorites in accordance with aspects of the present invention.

Turning to FIG. 47, there is illustrated an exemplary process 4700 for providing location-based interaction from a client application based on favorites. In a stage 4710, representations of other users within a predefined range of a user device executing the client application are displayed on a user interface of the user device. A first chat session and a second chat session are then initiated through the user device (stage 4720). Information relating to the first and second chat sessions is then alternately displayed on the user interface of the user device (stage 4730).

In some configurations, the apparatus or system includes means for performing various functions as described herein.

In one aspect, the aforementioned means may be a module including a processor or processors and associated memory in which embodiments of the invention reside, such as are shown in the preceding drawings and which are configured to perform the functions recited by the aforementioned means. The may be, for example, modules or apparatus residing in client devices, host server systems, and/or other network devices such as are shown and/or described herein. In another aspect, the aforementioned means may be a module or apparatus configured to perform the functions recited by the aforementioned means.

In one or more exemplary embodiments, the functions, methods and processes described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, computer program products comprising computer-readable media including all forms of computer-readable medium except, to the extent that such media is deemed to be non-statutory, transitory propagating signals.

It is understood that the specific order or hierarchy of steps or stages in the processes and methods disclosed are examples of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps or stages of a method, process or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The disclosure is not intended to be limited to the aspects shown herein, but is to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure. Thus, the disclosure is not intended to be limited to the aspects shown herein but is to be accorded the widest scope consistent with the principles and novel features disclosed herein.

What is claimed is:

1. A system for facilitating location-based social interaction comprising:
    one or more servers being configured to:
        receive, from a location-based social interaction application installed on a portable electronic device of a requesting user of an online service for facilitating location-based social interaction, a request for information concerning users of the online service located within a range of a location of the requesting user;
        generate a list of the users located within the range of the location;
        filter, based upon filtering criteria, the list in order to create a filtered list of the users; and
        transmit, to the portable electronic device, profile information relating to the filtered list of the users;
    wherein:
        the location-based social interaction application is configured to utilize the profile information to generate a user interface having a cascade that includes representations corresponding to the filtered list of the users; and
        at least a portion of the representations included on the cascade correspond to a subset of users that are selected as being of potential interest to the requesting user.

2. The system of claim 1, wherein the subset of users that are selected as being of potential interest to the requesting user are identified, at least in part, based on consideration of: a) a first factor that considers the location of the requesting user and locations of the users; and b) a second factor that is used to identify or select the subset of users that are of potential interest to the requesting user.

3. The system of claim 2, wherein the subset of users corresponds to a grouping of users that are located within a predefined distance of the requesting user and that are predicted to be of interest to the requesting user.

4. The system of claim 1, wherein representations included on the cascade are updated over time based on information collected by the one or more servers for the requesting user and the users.

5. The system of claim 4, wherein the location-based social interaction application is configured to periodically contact the one or more servers to update the location of the user and to obtain updated location information corresponding to the users that are with the range of the location corresponding to the user.

6. The system of claim 1, wherein the subset of users that are selected as being of potential interest to the requesting user are identified, at least in part, on stored interest information for the requesting user and the users.

7. The system of claim 1, wherein the representations included on the cascade, including the representations corresponding to the subset of users that are selected as being of potential interest to the requesting user, are selectable to enable the requesting user to view additional profile information relating to the subset of users.

8. The system of claim 1, wherein the location-based social interaction application enables the requesting user to establish a private messaging chat with the subset of users that are selected as being of potential interest to the requesting user.

9. A method implemented via execution of computing instructions by one or more processing devices and stored on one or more non-transitory computer-readable devices, the method comprising:
    receiving, from a location-based social interaction application installed on a portable electronic device of a requesting user of an online service for facilitating location-based social interaction, a request for information concerning users of the online service located within a range of a location of the requesting user;

generating a list of the users located within the range of the location;

filtering, based upon filtering criteria, the list in order to create a filtered list of the users; and transmitting, to the portable electronic device, profile information relating to the filtered list of the users;

wherein:

the location-based social interaction application is configured to utilize the profile information to generate a user interface having a cascade that includes representations corresponding to the filtered list of the users; and at least a portion of the representations included on the cascade correspond to a subset of users that are selected as being of potential interest to the requesting user.

10. The method of claim 9, wherein the subset of users that are selected as being of potential interest to the requesting user are identified, at least in part, based on consideration of: a) a first factor that considers the location of the requesting user and locations of the users; and b) a second factor that is used to identify or select the subset of users that are of potential interest to the requesting user.

11. The method of claim 10, wherein the subset of users corresponds to a grouping of users that are located within a predefined distance of the requesting user and that are predicted to be of interest to the requesting user.

12. The method of claim 9, wherein representations included on the cascade are updated over time based on information collected by the one or more servers for the requesting user and the users.

13. The method of claim 12, wherein the location-based social interaction application is configured to periodically contact the one or more servers to update the location of the user and to obtain updated location information corresponding to the users that are with the range of the location corresponding to the user.

14. The method of claim 9, wherein the subset of users that are selected as being of potential interest to the requesting user are identified, at least in part, on stored interest information for the requesting user and the users.

15. The method of claim 9, wherein the representations included on the cascade, including the representations corresponding to the subset of users that are selected as being of potential interest to the requesting user, are selectable to enable the requesting user to view additional profile information relating to the subset of users.

16. The system of claim 9, wherein the location-based social interaction application enables the requesting user to establish a private messaging chat with the subset of users that are selected as being of potential interest to the requesting user.

* * * * *